United States Patent
Moreton et al.

(10) Patent No.: US 6,906,716 B2
(45) Date of Patent: *Jun. 14, 2005

(54) INTEGRATED TESSELLATOR IN A GRAPHICS PROCESSING UNIT

(75) Inventors: Henry P. Moreton, Woodside, CA (US); Justin Legakis, Davis, CA (US); Douglas H. Rogers, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 3 days.

This patent is subject to a terminal disclaimer.

(21) Appl. No.: 10/418,364

(22) Filed: Apr. 17, 2003

(65) Prior Publication Data

US 2004/0085313 A1 May 6, 2004

Related U.S. Application Data

(63) Continuation of application No. 09/718,890, filed on Nov. 21, 2000, now Pat. No. 6,597,356, which is a continuation-in-part of application No. 09/655,105, filed on Sep. 5, 2000, now Pat. No. 6,704,010, which is a continuation-in-part of application No. 09/655,103, filed on Sep. 5, 2000, now Pat. No. 6,504,537, which is a continuation-in-part of application No. 09/652,866, filed on Aug. 31, 2000, now Pat. No. 6,624,811.

(51) Int. Cl.[7] .............................................. G06T 17/20
(52) U.S. Cl. .................... 345/423; 345/421; 345/426; 345/427; 345/505; 345/506; 345/519
(58) Field of Search .............................. 345/421, 423, 345/426, 427, 505, 506, 519

(56) References Cited

U.S. PATENT DOCUMENTS

| | | |
|---|---|---|
| 5,179,647 A | 1/1993 | Chang |
| 5,694,143 A | 12/1997 | Fielder et al. |
| 5,808,619 A | 9/1998 | Choi et al. |
| 5,838,337 A | 11/1998 | Kimura et al. |
| 5,880,736 A | 3/1999 | Peercy et al. |
| 5,949,424 A | 9/1999 | Cabral et al. |
| 5,974,168 A | 10/1999 | Rushmeier et al. |
| 5,977,997 A | 11/1999 | Vainsencher |
| 6,000,027 A | 12/1999 | Pawate et al. |
| 6,198,488 B1 | 3/2001 | Lindholm et al. |
| 6,211,883 B1 | 4/2001 | Goel |
| 6,304,265 B1 | 10/2001 | Harris et al. |

FOREIGN PATENT DOCUMENTS

| | | |
|---|---|---|
| EP | 0690430 A2 | 1/1996 |
| EP | 0690430 A3 | 7/1996 |
| WO | WO 98/28695 | 7/1998 |
| WO | WO 99/52040 | 10/1999 |

OTHER PUBLICATIONS

Marc Olano and Trey Greer, "Triangle Scan Conversion Using 2D Homogeneous Coordinates," 1997, Siggraph/Eurographics Workshop.

*Primary Examiner*—Kimbinh T. Nguyen
(74) *Attorney, Agent, or Firm*—Cooley Godward LLP

(57) ABSTRACT

An integrated graphics pipeline system is provided for graphics processing. Such system includes a tessellation module that is positioned on a single semiconductor platform for receiving data for tessellation purposes. Tessellation refers to the process of decomposing either a complex surface such as a sphere or surface patch into simpler primitives such as triangles or quadrilaterals, or a triangle into multiple smaller triangles. Also included on the single semiconductor platform is a transform module adapted to transform the tessellated data from a first space to a second space. Coupled to the transform module is a lighting module which is positioned on the single semiconductor platform for performing lighting operations on the data received from the transform module. Also included is a rasterizer coupled to the lighting module and positioned on the single semiconductor platform for rendering the data received from the lighting module.

20 Claims, 69 Drawing Sheets

| Command | Transform Stall | Lighting Stall | Description |
|---|---|---|---|
| FE2XF_CMD_NOP | | | No operation. Can be used as a spacer between commands |
| FE2XF_CMD_VERTEX | read | read | Vertex data. |
| FE2XF_CMD_PASSTHR | | | Passthrough. Transform and lighting pass the data through. |
| FE2XF_CMD_RDVAB | | | Read the VAB contects when context switching. |
| FE2XF_CMD_LDMODE | | | Load new mode bits. |
| FE2XF_CMD_LDXFCTX | write | | Load transform context memory data. |
| FE2XF_CMD_RDXFCTX | read | | Read transform context memory data. |
| FE2XE_CMD_LDLTCTX | | write | Load lighting context memory data. |
| FE2XF_CMD_RDLTCTX | | read | Read lighting context memory data. |
| FE2XF_CMD_LDLTC0 | | write | Load lighting context0 memory data. |
| FE2XF_CMD_RDLTC0 | | read | Read lighting context0 memory data. |
| FE2XF_CMD_LDLTC1 | | write | Load lighting context1 memory data. |
| FE2XF_CMD_RDLTC1 | | read | Read lighting context1 memory data. |
| FE2XF_CMD_LDLTC2 | | write | Load lighting context2 memory data. |
| FE2XF_CMD_RDLTC2 | | read | Read lighting context2 memory data. |
| FE2XF_CMD_LDLTC3 | | write | Load lighting context3 memory data. |
| FE2XF_CMD_RDLTC3 | | read | Read lighting context3 memory data. |
| FE2XF_CMD_SYNC | read+write | read+write | Similar to NOP, but is not allowed to be processed in parallel. |

Figure 2A

| Mode Bit | Bits | Description |
| --- | --- | --- |
| T0 | 1 | Texture 0 enable |
| TXF0 | 1 | Texture 0 matrix transform enable |
| TDV0 | 1 | Texture 0 w divide enable |
| T0S | 3 | Texture 0 texgen s control |
| T0T | 3 | Texture 0 texgen t control |
| T0U | 3 | Texture 0 texgen r control |
| T0Q | 2 | Texture 0 texgen q control |
| T1 | 1 | Texture 1 enable |
| TXF1 | 1 | Texture 1 matrix transform enable |
| TDV1 | 1 | Texture 1 w divide enable |
| T1S | 3 | Texture 1 texgen s control |
| T1T | 3 | Texture 1 texgen t control |
| T1U | 3 | Texture 1 texgen r control |
| T1Q | 2 | Texture 1 texgen q control |
| ETY | 1 | Eye type infinite(0) or local(1) |
| LIT | 1 | Lighting enable |
| NRM | 1 | Normal normalize enable |
| FOG | 1 | Fog enable |
| LIS | 16 | Light status (8 lights by 2 bits each, 0:off,1:infinite,2:local, 3: spotlight) |
| FG | 2 | Foggen control (0: off, 1: radial, 2: plane) |
| LAT | 1 | Light attenuation control (0: invert, 1: no invert) |
| CII | 1 | Specular color input enable |
| CIO | 1 | Specular color output enable |
| CM | 4 | Color material control (1: emissive, 2:ambient, 4: diffuse, 8: specular) |
| PP | 1 | Point parameter enable |
| SKIN | 1 | Skinning enable |
| VPAS | 1 | Vertex pass enable |

Figure 3

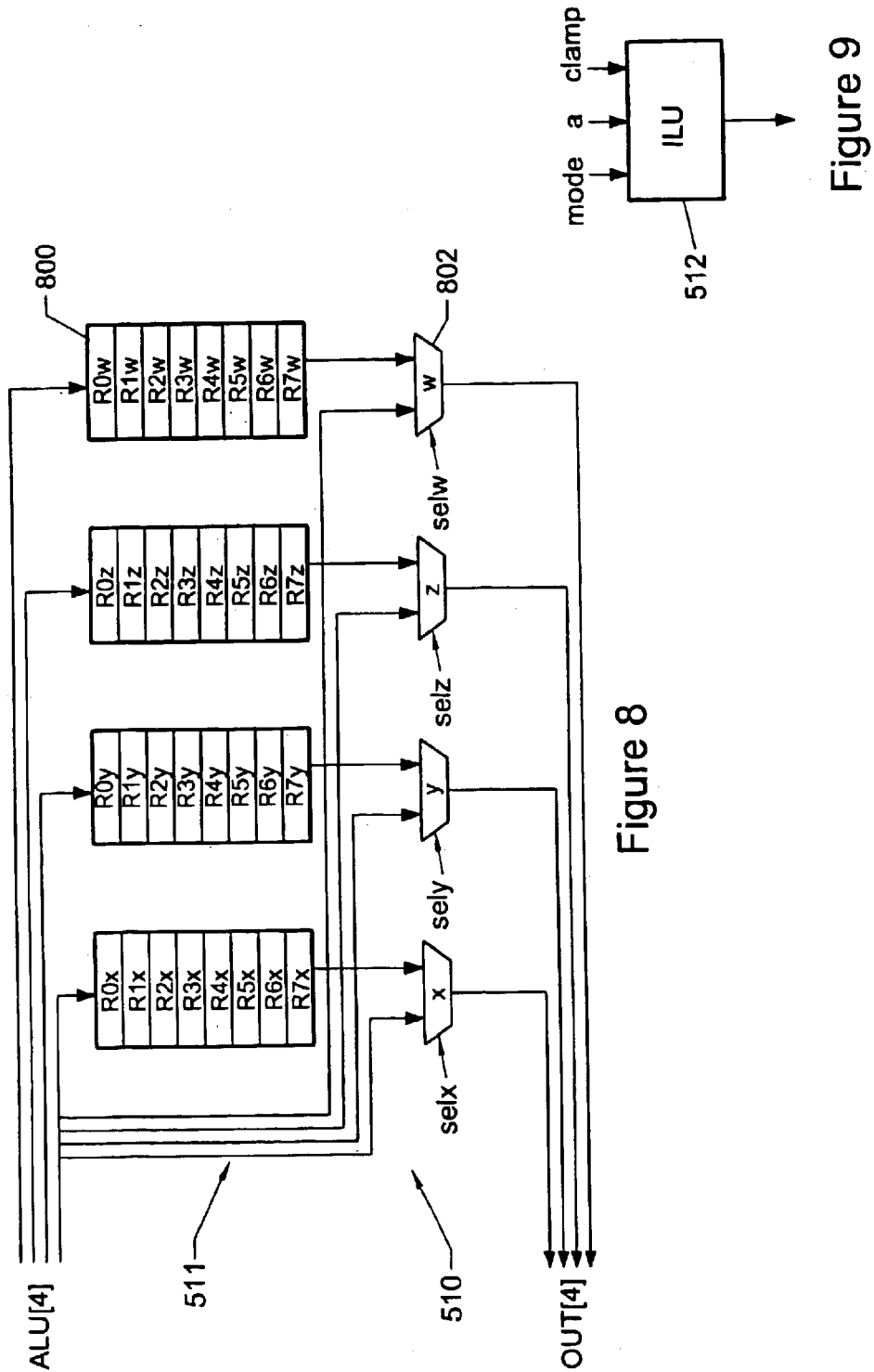

| Address | Target | Action | Description |
|---|---|---|---|
| TPOS | TBUFFER | T[0] = ALU | Position |
| TT0 | TBUFFER | T[3] = ALU | Texture0 |
| TT1 | TBUFFER | T[4] = ALU | Texture1 |
| WEV | WBUFFER,VBUFFER | W[0] = ALU, V[0].y = ALU.w | Eye vector |
| WLV0 | WBUFFER,VBUFFER | W[1] = ALU, V[1].y = ALU.w | Light0 direction vector |
| WLV1 | WBUFFER,VBUFFER | W[2] = ALU, V[2].y = ALU.w | Light1 direction vector |
| WLV2 | WBUFFER,VBUFFER | W[3] = ALU, V[3].y = ALU.w | Light2 direction vector |
| WLV3 | WBUFFER,VBUFFER | W[4] = ALU, V[4].y = ALU.w | Light3 direction vector |
| WLV4 | WBUFFER,VBUFFER | W[5] = ALU, V[5].y = ALU.w | Light4 direction vector |
| WLV5 | WBUFFER,VBUFFER | W[6] = ALU, V[6].y = ALU.w | Light5 direction vector |
| WLV6 | WBUFFER,VBUFFER | W[7] = ALU, V[7].y = ALU.w | Light6 direction vector |
| WLV7 | WBUFFER,VBUFFER | W[8] = ALU, V[8].y = ALU.w | Light7 dirction vector |
| WSL0 | WBUFFER | W[9] = ALU | Spotlight0 cos |
| WSL1 | WBUFFER | W[10] = ALU | Spotlight1 cos |
| WSL2 | WBUFFER | W[11] = ALU | Spotlight2 cos |
| WSL3 | WBUFFER | W[12] = ALU | Spotlight3 cos |
| WSL4 | WBUFFER | W[13] = ALU | Spotlight4 cos |
| WSL5 | WBUFFER | W[14] = ALU | Spotlight5 cos |
| WSL6 | WBUFFER | W[15] = ALU | Spotlight6 cos |
| WSL7 | WBUFFER | W[16] = ALU | Spotlight7 cos |
| VED | VBUFFER | V[0].x = 1.0, V[0].z = ALU.w | Eye radial distance vector |
| VLD0 | VBUFFER | V[1].x = 1.0, V[1].z = ALU.w | Light0 distance vector |
| VLD1 | VBUFFER | V[2].x = 1.0, V[2].z = ALU.w | Light1 distance vector |
| VLD2 | VBUFFER | V[3].x = 1.0, V[3].z = ALU.w | Light2 distance vector |
| VLD3 | VBUFFER | V[4].x = 1.0, V[4].z = ALU.w | Light3 distance vector |
| VLD4 | VBUFFER | V[5].x = 1.0, V[5].z = ALU.w | Light4 distance vector |
| VLD5 | VBUFFER | V[6].x = 1.0, V[6].z = ALU.w | Light5 distance vector |
| VLD6 | VBUFFER | V[7].x = 1.0, V[7].z = ALU.w | Light6 distance vector |
| VLD7 | VBUFFER | V[8].x = 1.0, V[8].z = ALU.w | Light7 distance vector |
| VC0 | VBUFFER,TBUFFER | V[9] = ALU, T[1] = ALU | Diffuse color |
| VC1 | VBUFFER,TBUFFER | V[10] = ALU, T[2] = ALU | Specular color |
| VNRM | VBUFFER | V[11] = ALU | Normal vector |
| VED2 | VBUFFER | V[12] = ALU | Eye planar distance vector |
| TVW_NOP | | | No valid output. |

Figure 10

| Microcode Field | Bits | Location | Delay | Description |
|---|---|---|---|---|
| oa | 6 | 0:5 | 2 | Output buffer write address |
| rra | 3 | 6:8 | 0 | RLU read address |
| rwm | 4 | 9:12 | 2 | RLU write mask |
| rwa | 3 | 13:15 | 2 | RLU write address |
| ilu | 2 | 16:17 | 2 | ILU operation |
| alu | 4 | 18:21 | 1 | ALU operation |
| ais | 2 | 22:23 | 1 | ALU sign control |
| aia | 1 | 24 | 1 | ALU input A mux |
| mlu | 3 | 25:27 | 0 | MLU operation |
| mib | 2 | 28:29 | 0 | MLU input B mux |
| mia | 2 | 30:31 | 0 | MLU input A mux |
| va | 3 | 32:34 | 0 | Input buffer read address |
| ce | 1 | 35 | 0,2 | Context memory read/write |
| ca | 6 | 36:41 | 0,2 | Context memory address |
| mr | 2 | 42:43 | 0 | MLU input vector rotate |

Figure 11

| Name | Register | Description |
|---|---|---|
| Z | IFLAG | Clear flag. Sets IFLAG and MFLAG to 0. |
| C | IFLAG | Spotlight cone flag. Set if vertex is outside spotlight cone. |
| S | IFLAG | Specular2 flag. Set if specular contribution is negative. |
| D | IFLAG | Diffuse flag. Set if diffuse term is negative. |
|   | MFLAG |   |
| U | MFLAG | Spotlight cone attenuation flag. Set if spotlight cone attenuation is negative |
| T | MFLAG | Specular flag. Set if specular contribution is negative |
| R | MFLAG | Range flag. Set if vertex is too far away from the light. |

Figure 21

| Microcode Field | Bits | Location | Delay | Description |
|---|---|---|---|---|
| oa | 3 | 0:2 | 2 | Output address |
| rwe | 1 | 3 | 2 | RLU write enable |
| rwa | 2 | 4:5 | 2 | RLU write address |
| R23 | 1 | 6 | 0 | RLU(MLU) read address |
| R01 | 1 | 7 | 1 | RLU(ALU) read address |
| aia | 1 | 8 | 1 | ALU input A mux |
| alu | 2 | 9:10 | 1 | ALU operation |
| mib | 2 | 11:12 | 0 | MLU input B mux |
| mia | 2 | 13:14 | 0 | MLU input A mux |
| mlu | 2 | 15:16 | 0 | MLU operation |
| mwa | 5 | 17:21 | 0 | MLU WBUFFER read address |
| awa | 5 | 22:26 | 1 | ALU WBUFFER read address |
| va | 4 | 27:30 | 0 | VBUFFER read address |
| os | 2 | 31:32 | 2 | LLU output address |
| frm | 6 | 33:38 | 2 | Flag register mask |
| mfe | 1 | 39 | 2 | MFLAG write enable |
| mfa | 2 | 40:41 | 2 | MFLAG write address |
| ife | 1 | 42 | 2 | IFLAG write enable |
| ifa | 2 | 43:44 | 2 | IFLAG write address |
| fia | 2 | 45:46 | 2 | FLU input A mux |
| flu | 3 | 47:49 | 2 | FLU operation |
| M1c | 1 | 50 | 2 | MAC1 input C mux |
| M1b | 2 | 51:52 | 2 | MAC1 input B mux |
| M1a | 2 | 53:54 | 2 | MAC1 input A mux |
| M0c | 2 | 55:56 | 2 | MAC0 input C mux |
| M0b | 2 | 57:58 | 2 | MAC0 input B mux |
| M0a | 2 | 59:60 | 2 | MAC0 input A mux |
| ce | 3 | 61:63 | 0,2 | Context memory read/write enable |
| ca | 6 | 64:69 | 0,2 | Context memory address |
| C3a | 4 | 70:73 | 2 | Context3 memory address |
| C2a | 4 | 74:77 | 2 | Context2 memory address |
| C1a | 5 | 78:82 | 2 | Context1 memory address |
| C0a | 2 | 83:84 | 2 | Context0 memory address |

Figure 22

(See Figure 29-2)

*Boustrophedonic Footprint Sequence over a Triangle*

Swaths: 1-101, then 102-137, then 138-217, then 218-246

INTEGRATED TESSELLATOR IN A GRAPHICS PROCESSING UNIT

RELATED APPLICATIONS

The present application is a continuation application of application entitled "Integrated Tessellator in a Graphics Processing Unit" which was filed Nov. 21, 2000 under Ser. No. 09/718,890 now U.S. Pat. No. 6,597,356, which is a continuation-in-part of applications entitled "System, Method and Article of Manufacture for Decomposing Surfaces using Guard Curves and Reversed Stitching" which was filed Aug. 31, 2000 under Ser. No. 09/652,866 now U.S. Pat. No. 6,624,811; "System, Method and Article of Manufacture for Fractional Tessellation during Graphics Processing" which was filed Sep. 5, 2000 under Ser. No. 09/655,103 now U.S. Pat. No. 6,504,537; and "System, Method and Article of Manufacture for Rendering Triangular Patches using Hardware Equipped for Handling Quadrilateral Patches" which was filed Sep. 5, 2000 under Ser. No. 09/655,105 now U.S. Pat. No. 6,704,010, and which are all incorporated herein by reference in their entirety. The present application is further related to an application entitled "A Transform, Lighting and Rasterization System Embodied on a Single Semiconductor Platform" which was filed Dec. 6, 1999 under Ser. No. 09/454,516; and which is incorporated herein by reference in its entirety.

FIELD OF THE INVENTION

The present invention relates generally to graphics processors and, more particularly, to graphics pipeline systems including tessellation, transform, lighting and rasterization modules.

BACKGROUND OF THE INVENTION

Three dimensional graphics are central to many applications. For example, computer aided design (CAD) has spurred growth in many industries where computer terminals, cursors, CRT's and graphics terminals are replacing pencil and paper, and computer disks and tapes are replacing drawing vaults. Most, if not all, of these industries have a great need to manipulate and display three-dimensional objects. This has lead to widespread interest and research into methods of modeling, rendering, and displaying three-dimensional objects on a computer screen or other display device. The amount of computations needed to realistically render and display a three-dimensional graphical object, however, remains quite large and true realistic display of three-dimensional objects have largely been limited to high end systems. There is, however, an ever-increasing need for inexpensive systems that can quickly and realistically render and display three dimensional objects.

One industry that has seen a tremendous amount of growth in the last few years is the computer game industry. The current generation of computer games is moving to three-dimensional graphics in an ever increasing fashion. At the same time, the speed of play is being driven faster and faster. This combination has fueled a genuine need for the rapid rendering of three-dimensional graphics in relatively inexpensive systems. In addition to gaming, this need is also fueled by e-commerce applications, which demand increased multimedia capabilities.

Rendering and displaying three-dimensional graphics typically involves many calculations and computations. For example, to render a three dimensional object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to two-dimensional coordinates that can be displayed on a flat display device. Along the way, vertices may be rotated, scaled, eliminated or clipped because they fall outside the viewable area, lit by various lighting schemes, colorized, and so forth. Thus the process of rendering and displaying a three-dimensional object can be computationally intensive and may involve a large number of vertices.

A general system that implements such a pipelined system is illustrated in Prior Art FIG. 1. In this system, a data source 10 generates a stream of expanded vertices, often interpreted as triangles. The data source may also produce higher level descriptions such as spheres, cylinders, or general curved surfaces. These higher level primitives/descriptions may be approximated by a plurality of triangles before processing by the remainder of the graphics pipeline.

Initially, the vertices are tessellated by a tessellation module 9. Tessellation refers to the process of decomposing a complex surface such as a sphere into simpler primitives such as triangles or quadrilaterals. These tessellated vertices are then passed through a pipelined graphic system 12 via vertex memory 13. Thereafter, the vertices are transformed and lit by a transformation module 14 and a lighting module 16, respectively, and further clipped and set-up for rendering by a rasterizer 18, thus generating rendered primitives that are displayed on a display device 20.

During operation, the tessellation module 9 is adapted to use patches or other higher level descriptions to calculate vertices and form triangles. The transform module 14 may be used to perform scaling, rotation, and projection of a set of three dimensional vertices from their local or model coordinates to the two dimensional window that will be used to display the rendered object. The lighting module 16 sets the color and appearance of a vertex based on various lighting schemes, light locations, ambient light levels, materials, and so forth. The rasterization module 18 rasterizes or renders vertices that have previously been transformed and/or lit. The rasterization module 18 renders the object to a rendering target which can be a display device or intermediate hardware or software structure that in turn outputs the rendered data.

When manufacturing graphics processing systems, there is a general need to increase the speed of the various graphics processing components, while minimizing costs. In general, integration is often employed to increase the speed of a system. Integration refers to the incorporation of different processing modules on a single integrated circuit. With such processing modules communicating in a microscopic semiconductor environment, as opposed to external buses, speed is vastly increased.

Such increase in speed can contribute to overcoming many shortcomings in current graphic pipeline implementations. For example, the quality of computer graphics is currently limited by the ability of the graphic pipeline to execute transform operations. In particular, transform performance dictates how finely software developers may tessellate three-dimensional objects created, how many objects are put in a scene, and how sophisticated the three-dimensional world itself can be. This creates a classic performance-versus-quality trade-off for the software developer because finer tessellation will result in more polygons and slower performance, but with the reward of higher quality.

Integration is often limited, however, by a cost of implementing and manufacturing multiple processing modules on a single chip. In the realm of graphics processing, any attempt to integrate the various modules for increased speed would be cost prohibitive. The reason for this increase in cost is that the required integrated circuit would be of a size that is simply too expensive to be feasible.

This size increase is due mainly to the complexity of the various engines. High performance transform and lighting engines alone are very intricate and are thus expensive to implement on-chip, let alone implement with any additional functionality. Further, conventional rasterizers are multifaceted with the tasks of clipping, rendering, etc. making any cost-effective attempt to combine such module with the transform and lighting modules nearly impossible.

There is therefore a need for tessellation, transform, lighting, and rasterization modules having a design that allows cost-effective integration.

DISCLOSURE OF THE INVENTION

An integrated graphics pipeline system is provided for graphics processing. Such system includes a tessellation module that is positioned on a single semiconductor platform for receiving data for tessellation purposes. Tessellation refers to the process of decomposing either a complex surface such as a sphere or surface patch into simpler primitives such as triangles or quadrilaterals, or a triangle into multiple smaller triangles. Further included on the single semiconductor platform is a transform module adapted to transform the tessellated data from a first space to a second space. Coupled to the transform module is a lighting module which is also positioned on the single semiconductor platform for performing lighting operations on the data received from the transform module. Also included is a rasterizer coupled to the lighting module and positioned on the single semiconductor platform for rendering the data received from the lighting module.

With the foregoing integration, improved performance is achieved thus overcoming many of the shortcomings of non-integrated systems. For example, the combined tessellation and transform integration affords improved quality by way of finer tessellations. Applications can thus take advantage of this and other capabilities by invoking the corresponding feature associated with the single semiconductor platform via a standard interface.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 2A is a chart illustrating the various commands that may be received by VAB in accordance with one embodiment of the present invention;

FIG. 3 illustrates the mode bits associated with VAB in accordance with one embodiment of the present invention;

FIG. 8 is a schematic diagram of the register file of the transform module of FIG. 5;

FIG. 9 is a schematic diagram of the inverse logic unit (ILU) of the transform module of FIG. 5;

FIG. 10 is a chart of the output addresses of output converter of the transform module of FIG. 5 in accordance with one embodiment of the present invention;

FIG. 11 is an illustration of the micro-code organization of the transform module of FIG. 5 in accordance with one embodiment of the present invention;

FIG. 21 is an illustration of the flag register associated with the lighting module of FIG. 16 in accordance with one embodiment of the present invention;

FIG. 22 is an illustration of the micro-code fields associated with the lighting module of FIG. 16 in accordance with one embodiment of the present invention;

DESCRIPTION OF THE PREFERRED EMBODIMENTS

Figure 1:
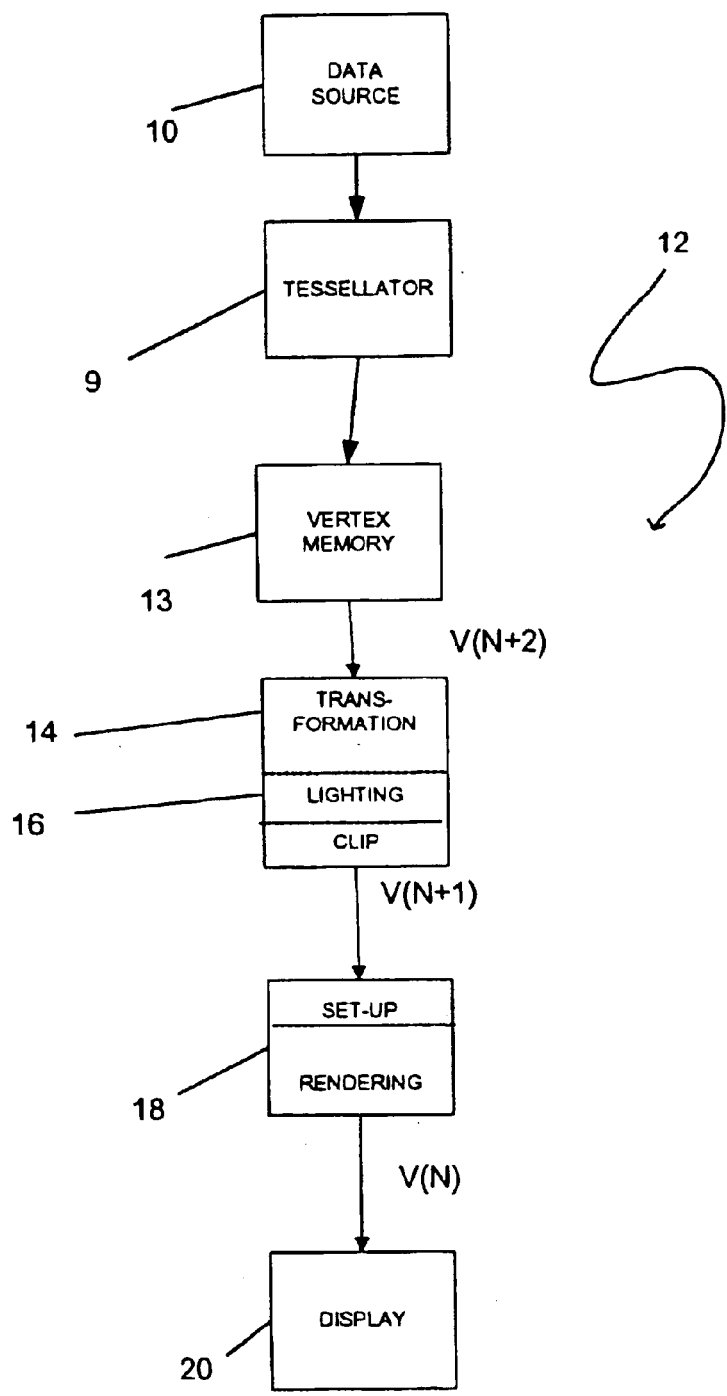
FIG. 1 illustrates a prior art method of computer graphics processing.
Figure 1A:
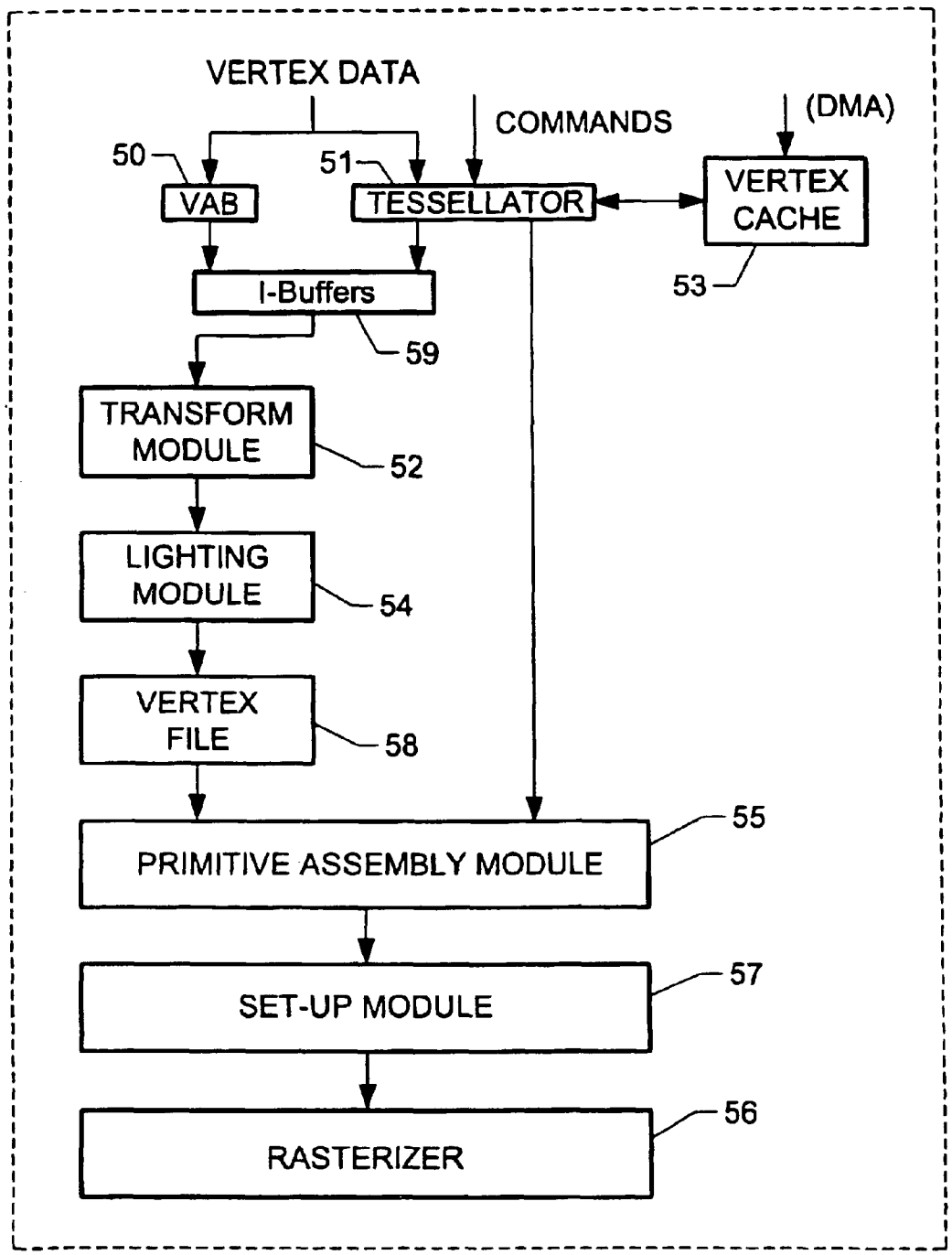
FIG. 1A is a flow diagram illustrating the various components of one embodiment of the present invention implemented on a single semiconductor platform.

FIG. 1 shows the prior art. FIG. 1A is a flow diagram illustrating the various components of one embodiment of the present invention. FIG. 1A illustrates a single-chip implementation of a graphics processing pipeline which incorporates a tessellation module 51. As shown, the tessellation module 51 receives as input data, i.e. vertex data, geometric descriptions, etc., and commands. Further, a vertex cache 53 populated using direct memory access (DMA) capabilities is provided which also feeds the tessellation module 51. When the tessellation module 51 is enabled, tessellated data is outputted from the tessellation module 51 to I-Buffers 59 which also receive data, i.e. vertex data, from a vertex attribute buffer (VAB) 50. Such I-Buffers 59 work to feed a transform module 52 and lighting module 54. The transform and lighting modules subsequently feed output to a vertex file 58. Also shown in FIG. 1A is a primitive assembly module 55 which communicates with the vertex file 58 and the tessellation module 51 for assembling primitives in preparation for rendering. Finally, a set-up module 57 and a rasterizer 56 receive input from the primitive assembly module 55 for rendering purposes.

In one embodiment, each of the foregoing modules is situated on a single semiconductor platform in a manner that will be described hereinafter in greater detail. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation.

During operation, the tessellation module 51 is adapted to use patches or any other higher level descriptions, i.e. primitives, etc., to calculate vertices. The vertex cache 53 may be used to store geometric descriptions such as patch coefficients for use and reuse by the tessellation module 51. The VAB 50 is included for gathering and maintaining a plurality of vertex attribute states such as position, normal, colors, texture coordinates, etc.

Attribute settings to be affected by the tessellation module 51 may be defined by any desired application program interface. The VAB 50 is the source for those vertex components not provided by the tessellation module 51. These components may be constant across the tessellated primitive.

When tessellation is commenced, the contents of the VAB 50 are used to update the I-Buffers 59 with the current vertex attributes that are not to be provided by the tessellation module 51. The tessellation module 51 then writes the remainder of the vertex components into the I-Buffers 59, which are then read by the transform module 52. More information regarding the I-Buffers 59 will be set forth during reference to FIG. 4.

As such, completed vertices are processed by the transform module 52 and then sent to the lighting module 54. The transform module 52 generates vectors for the lighting module 54 to light. The output of the lighting module 54 is stored in the vertex file 58. The vertex file 58, in turn, feeds vertices to the primitive assembly module 55 to form triangles and quads (decomposed into 2 triangles) for use by the set-up module 57. The set-up module 57 then conducts calculations for setting up primitives in preparation for rasterization. It should be noted that, in one interpretation, the set-up module 57 may be construed as handling the duties of the primitive assembly module 55.

As shown in FIG. 1A, the tessellation module 51 is capable of directing the primitive assembly module 54 to form triangles. In operation, the tessellation module 51 is thereby able to optimize vertex reuse, as will be set forth hereinafter in greater detail.

Thereafter, the rasterization module 56 carries out rasterization of the primitives. It should be noted that the transform and lighting modules 52 and 54 might only stall on the command level such that a command is always finished once started. Further information regarding the foregoing components will be set forth hereinafter in greater detail.

With the foregoing integration, improved performance is achieved thus overcoming many of the shortcomings of non-integrated systems. Applications may take advantage of the various hardware features of the present invention by invoking such features via a standard interface.

Such an interface may give developers a single set of APIs (application programming interfaces) that provides such developers With improved access to the features of the hardware set forth herein. This may be accomplished by the use of a hardware abstraction layer that uses software drivers to communicate between application software and the various hardware features set forth in the present description. As a result, developers can write a single version of a product that utilizes the interface without worrying about the specifics of the various hardware features of the present invention.

The interface may further provide developers with tools that take advantage of the various hardware features set forth in the present description. It may automatically determine the hardware capabilities, and set the parameters of the application to match. Still yet, the interface may contain a library of components that developers can draw on to create the underlying elements of an application. This library simplifies the development process by giving programmers a large group of pre-existing interfaces and elements to use in their products.

The components that make up the interface thus provide a flexible platform that is designed to get the most out of advances in technology. An example of such components includes special drivers that can be generated in association with the hardware of the present invention, and which ensure that one gets the most out of the advances set forth herein.

As such, a standardized programming interface is provided for application developers to interface with the various hardware features set forth in the present description. Further, a method is thereby provided to expose the functionality of the hardware to application developers in a standardized way. Such standardized programming interface may provide a more unified and readily supportable way for making applications and hardware work together. One example of an interface with features similar to those set forth hereinabove includes MICROSOFT DIRECTX.

In one embodiment, the present invention includes a hardware implementation that at least partially employs Open Graphics Library (OpenGL®) and D3D™ transform and lighting pipelines. OpenGL® is the computer industry's standard application program interface (API) for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

The various features associated with the modules shown in FIG. 1A will now be set forth. The specific manner in which the tessellation module 51 and other related components operate will be set forth later in the present description beginning with reference to Table 19.

Figure 2:
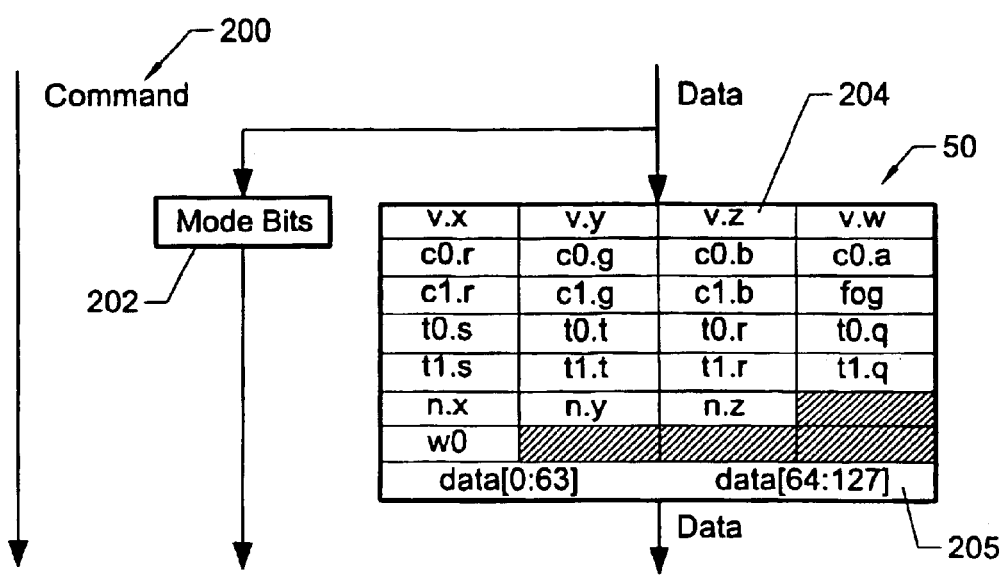
FIG. 2 is a schematic diagram of a vertex attribute buffer (VAB) in accordance with one embodiment of the present invention.

FIG. 2 is a schematic diagram of VAB 50 in accordance with one embodiment of the present invention. As shown, VAB 50 passes command bits 200 while storing data bits 204 representative of attributes of a vertex and mode bits 202. In use VAB 50 receives the data bits 204 of vertices and drains the same.

The VAB 50 is adapted for receiving and storing a plurality of possible vertex attribute states via the data bits 204. In use after such data bits 204, or vertex data, is received and stored in VAB 50, the vertex data is outputted from VAB 50 to a graphics-processing module, namely the transform module 52. Further, the command bits 200 are passed by VAB 50 for determining a manner in which the vertex data is inputted to VAB 50 in addition to other processing which will be described in greater detail with reference to FIG. 2A. Such command bits 200 are received from a command bit source such as a microcontroller, CPU, data source or any other type of source which is capable of generating command bits 200.

Further, mode bits 202 are passed which are indicative of the status of a plurality of modes of process operations. As such, mode bits 202 are adapted for determining a manner in which the vertex data is processed in the subsequent graphics-processing modules. Such mode bits 202 are received from a command bit source such as a microcontroller, CPU, data source or any other type of source which is capable of generating mode bits 202.

It should be noted that the various functions associated with VAB 50 may be governed by way of dedicated hardware, software or any other type of logic. In various embodiments, 64, 128, 256 or any other number of mode bits 202 may be employed.

The VAB 50 also functions as a gathering point for the 64 bit data that needs to be converted into a 128-bit format. The VAB 50 input is 64 bits/cycle and the output is 128 bits/cycle. In other embodiments, VAB 50 may function as a gathering point for 128-bit data, and VAB 50 input may be 128 bits/cycle or any other combination. The VAB 50 further has reserved slots for a plurality of vertex attributes that are all EEEE 32 bit floats. The number of such slots may vary per the desires of the user. Table 1 illustrates exemplary vertex attributes employed by the present invention.

TABLE 1

| Position: | x, y, z, w |
|---|---|
| Diffuse Color: | r, g, b, a |
| Specular Color: | r, g, b |
| Fog: | f |
| Texture0: | s, t, r, q |
| Texture1: | s, t, r, q |
| Normal: | nx, ny, nz |
| Skin Weight: | w |

During operation, VAB 50 may operate assuming that the x,y data pair is written before the z,w data pair since this allows for defaulting the z,w pair to (0.0,1.0) at the time of the x,y write. This may be important for default components in OpenGL® and D3D™. It should be noted that the position, texture0, and texture1 slots default the third and fourth components to (0.0,1.0). Further, the diffuse color slot defaults the fourth component to (1.0) and the texture slots default the second component to (0.0).

The VAB 50 includes still another slot 205 used for assembling the data bits 204 that may be passed into or through the transform and lighting module 52 and 54, respectively, without disturbing the data bits 204. The data bits 204 in the slot 205 can be in a floating point or integer format. As mentioned earlier, the data bits 204 of each vertex has an associated set of mode bits 202 representative of the modes affecting the processing of the data bits 204. These mode bits 202 are passed with the data bits 204 through the transform and lighting modules 52 and 54, respectively, for purposes that will be set forth hereinafter in greater detail.

In one embodiment, there may be 18 valid VAB, transform, and lighting commands received by VAB 50. FIG. 2A is a chart illustrating the various commands that may be received by VAB 50 in accordance with one embodiment of the present invention. It should be understood that all load and read context commands, and the passthrough command shown in the chart of FIG. 2A transfer one data word of up to 128 bits or any other size.

Each command of FIG. 2A may contain control information dictating whether each set of data bits 204 is to be written into a high double word or low double word of one VAB address. In addition, a 2-bit write mask may be employed for providing control to the word level. Further, there may be a launch bit that informs VAB controller that all of the data bits 204 are present for a current command to be executed.

Each command has an associated stall field that allows a look-up to find information on whether the command is a read command in that it reads context memory or is a write command in that it writes context memory. By using the stall field of currently executing commands, the new command may be either held off in case of conflict or allowed to proceed.

In operation, VAB 50 can accept one input data word up to 128 bits (or any other size) per cycle and output one data word up to 128 bits (or any other size) per cycle. For the load commands, this means that it may take two cycles to load the data into VAB 50 to create a 128-bit quad-word and one cycle to drain it. For the scalar memories in the lighting module 54, it is not necessary to accumulate a full quad-word, and these can be loaded in one cycle/address. For one vertex, it can take up to 14 cycles to load the 7 VAB slots while it only takes 7 cycles to drain them. It should be noted, however, that it is only necessary to update the vertex state that changes between executing vertex commands. This means that, in one case, the vertex position may be updated taking 2 cycles, while the draining of the vertex data takes 7 cycles. It should be noted that only 1 cycle may be required in the case of the x,y position.

Figure 2B:
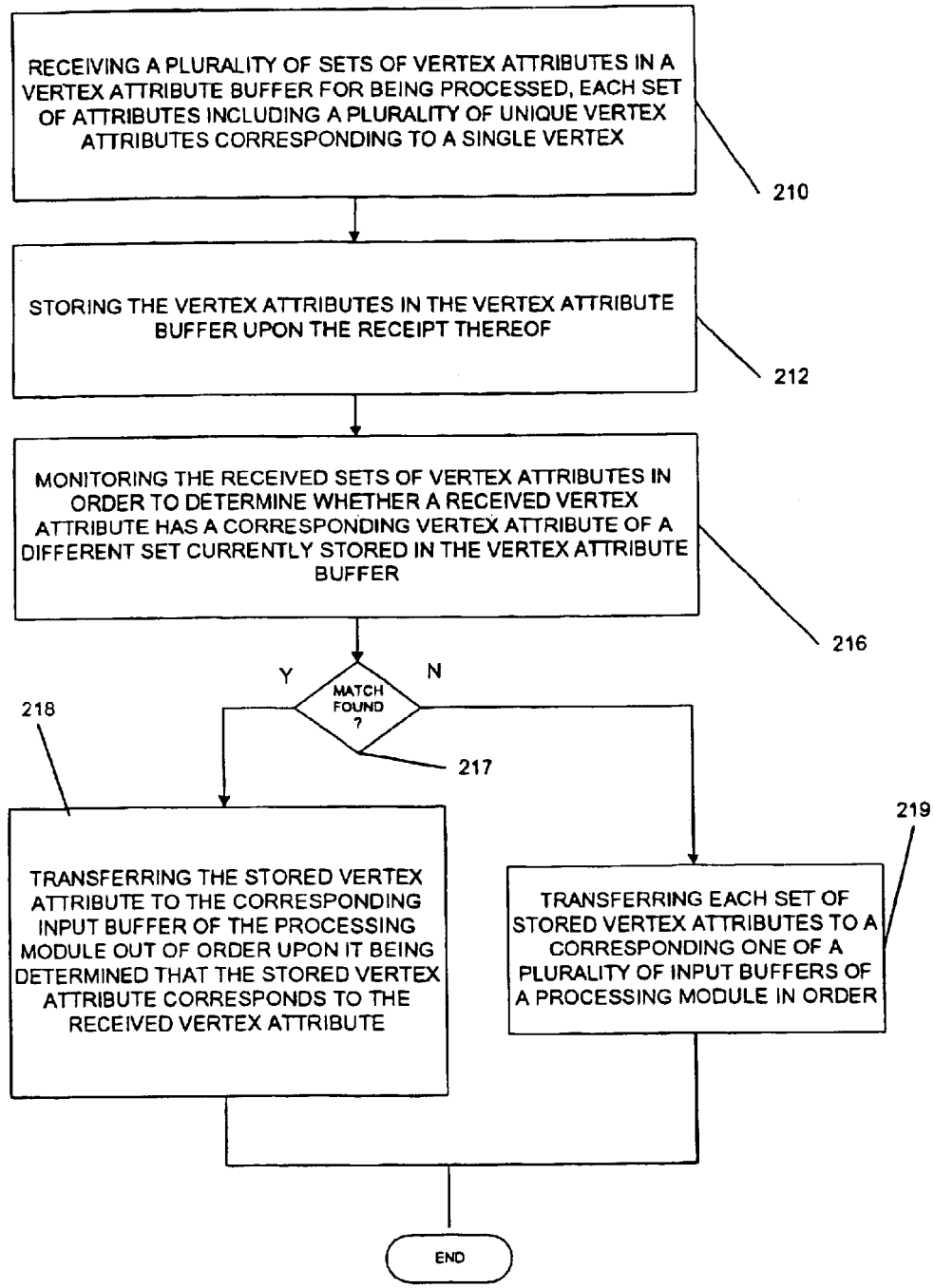
FIG. 2B is a flow chart illustrating a method of loading and draining vertex attributes to and from VAB in accordance with one embodiment of the present invention.

FIG. 2B is a flow chart illustrating one method of loading and draining vertex attributes to and from VAB 50 during graphics-processing. Initially, in operation 210, at least one set of vertex attributes is received in VAB 50 for being processed. As mentioned earlier, each set of vertex attributes may be unique, and correspond to a single vertex.

In use the vertex attributes are stored in VAB 50 upon the receipt thereof in operation 212. Further, each set of stored vertex attributes is transferred to a corresponding one of a plurality of input buffers of the transform module 52. The received set of vertex attributes is also monitored in order to determine whether a received vertex attribute has a corresponding vertex attribute of a different set currently stored in VAB 50, as indicated in operation 216.

Upon it being determined that a stored vertex attribute corresponds to the 15 received vertex attribute in decision 217, the stored vertex attribute is outputted to the corresponding input buffer of the transform module 52 out of order. See operation 218. Immediately upon the stored vertex attribute being outputted, the corresponding incoming vertex attribute may take its place in VAB 50. If no correspondence is found, however, each set of the stored vertex attributes may be transferred to the corresponding input buffer of the transform module 52 in accordance with a regular predetermined sequence. Note operation 219.

It should be noted that the stored vertex attribute might not be transferred in the aforementioned manner if it has an associated launch command. Further, in order for the foregoing method to work properly, the bandwidth of an output of VAB 50 must be at least the bandwidth of an input of VAB 50.

Figure 2C:
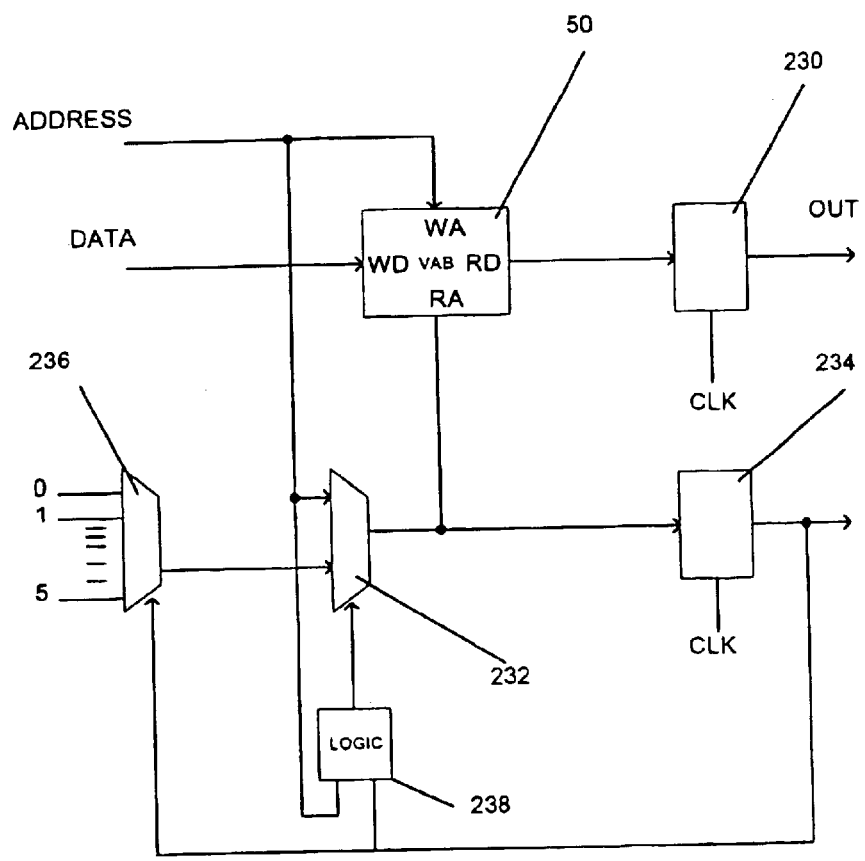
FIG. 2C is a schematic diagram illustrating the architecture of the present invention employed to implement the operations of FIG. 2B.

FIG. 2C is a schematic diagram illustrating the architecture of the present invention employed to implement the operations of FIG. 2B. As shown, VAB 50 has a write data terminal WD, a read data terminal RD, a write address terminal WA, and a read address RA terminal. The read data terminal is coupled to a first clock-controlled buffer 230 for outputting the data bits 204 from VAB 50.

Also included is a first multiplexer 232 having an output coupled to the read address terminal of VAB 50 and a second clock-controlled buffer 234. A first input of the first multiplexer 232 is coupled to the write address terminal of VAB 50 while a second input of the first multiplexer 232 is coupled to an output of a second multiplexer 236. A logic module 238 is coupled between the first and second multiplexers 232 and 236, the write address terminal of VAB 50, and an output of the second clock-controlled buffer 234.

In use the logic module 238 serves to determine whether an incoming vertex attribute is pending to drain in VAB 50. In one embodiment, this determination may be facilitated by monitoring a bit register that indicates whether a vertex attribute is pending or not. If it is determined that the incoming vertex attribute does have a match currently in VAB 50, the logic module 238 controls the first multiplexer 232 in order to drain the matching vertex attribute so that the incoming vertex attribute may be immediately stored in its place. On the other hand, if it is determined that the incoming vertex attribute does not have a match currently in VAB 50, the logic module 238 controls the first multiplexer 232 such that VAB 50 is drained and the incoming vertex attribute is loaded sequentially or in some other predetermined order, per the input of the second multiplexer 236 which may be updated by the logic module 238.

As a result, there is no requirement for VAB 50 to drain multiple vertex attributes before a new incoming vertex attribute may be loaded. The pending vertex attribute forces out the corresponding VAB counterpart if possible, thus allowing it to proceed. As a result, VAB 50 can drain in an arbitrary order. Without this capability, it would take 7 cycles to drain VAB 50 and possibly 14 more cycles to load it. By overlapping the loading and draining, higher performance is achieved. It should be noted that this is only possible if an input buffer is empty and VAB 50 can drain into input buffers of the transform module 52.

FIG. 3 illustrates the mode bits associated with VAB 50 in accordance with one embodiment of the present invention. The transform/light mode information is stored in a register via mode bits 202. Mode bits 202 are used to drive the sequencers of the transform module 52 and lighting module 54 in a manner that will be become apparent hereinafter. Each vertex has associated mode bits 202 that may be unique, and can therefore execute a specifically tailored program sequence. While, mode bits 202 may generally map directly to the graphics API, some of them may be derived.

In one embodiment, the active light bits (LIS) of FIG. 3 may be contiguous. Further, the pass-through bit (VPAS) is unique in that when it is turned on, the vertex data is passed through with scale and bias, and no transforms or lighting is done. Possible mode bits 202 used when VPAS is true are the texture divide bits (TDV0,1), and foggen bits (used to extract fog value in D3D™). VPAS is thus used for pre-transformed data, and TDV0,1 are used to deal with a cylindrical wrap mode in the context of D3D™.

Figure 4:
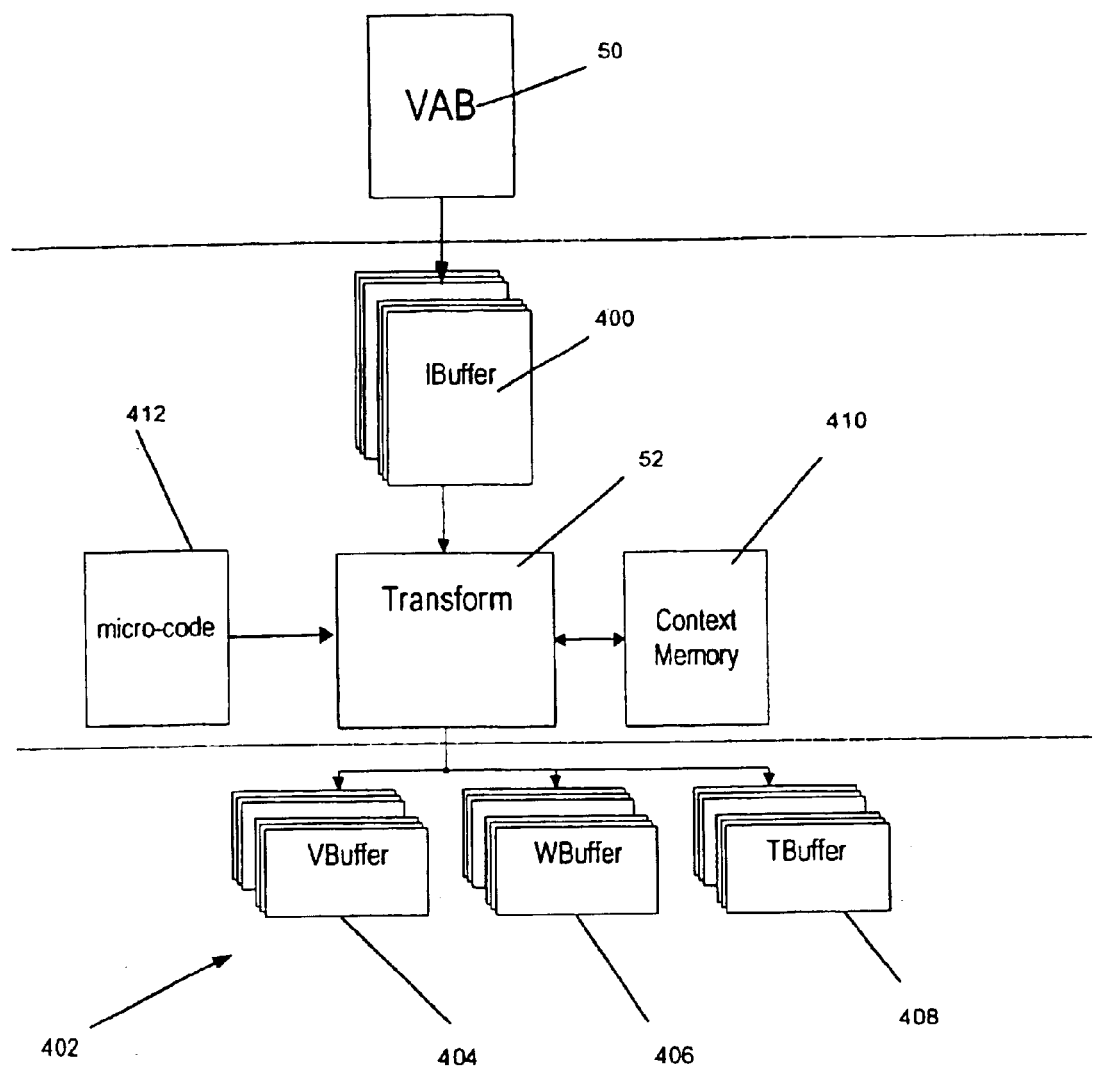
FIG. 4 illustrates the transform module of the present invention.

FIG. 4 illustrates the transform module of one embodiment of the present invention. As shown, the transform module 52 is connected to VAB 50 by way of 6 input buffers 400. In one embodiment, each input buffer 400 might be 7*128b in size. The 6 input buffers 400 each is capable of storing 7 quad words. Such input buffers 400 follow the same layout as VAB 50, except that the pass data is overlapped with the position data.

In one embodiment, a bit might be designated for each attribute of each input buffer 400 to indicate whether data has changed since the previous instance that the input buffer 400 was loaded. By this design, each input buffer 400 might be loaded only with changed data.

The transform module 52 is further connected to 6 output vertex buffers 402 in the lighting module 54. The output buffers include a first buffer 404, a second buffer 406, and a third buffer 408. As will become apparent hereinafter, the contents, i.e. position, texture coordinate data, etc., of the third buffer 408 are not used in the lighting module 54. The first buffer 404 and second buffer 406 are both, however, used for inputting lighting and color data to the lighting module 54. Two buffers are employed since the lighting module is adapted to handle two read inputs. It should be noted that the data might be arranged so as to avoid any problems with read conflicts, etc.

Further coupled to the transform module 52 is context memory 410 and micro-code ROM memory 412. The transform module 52 serves to convert object space vertex data into screen space, and to generate any vectors required by the lighting module 54. The transform module 52 also does processes skinning and texture coordinates. In one embodiment, the transform module 52 might be a 128-bit design processing 4 floats in parallel, and might be optimized for doing 4 term dot products.

Figure 4A:
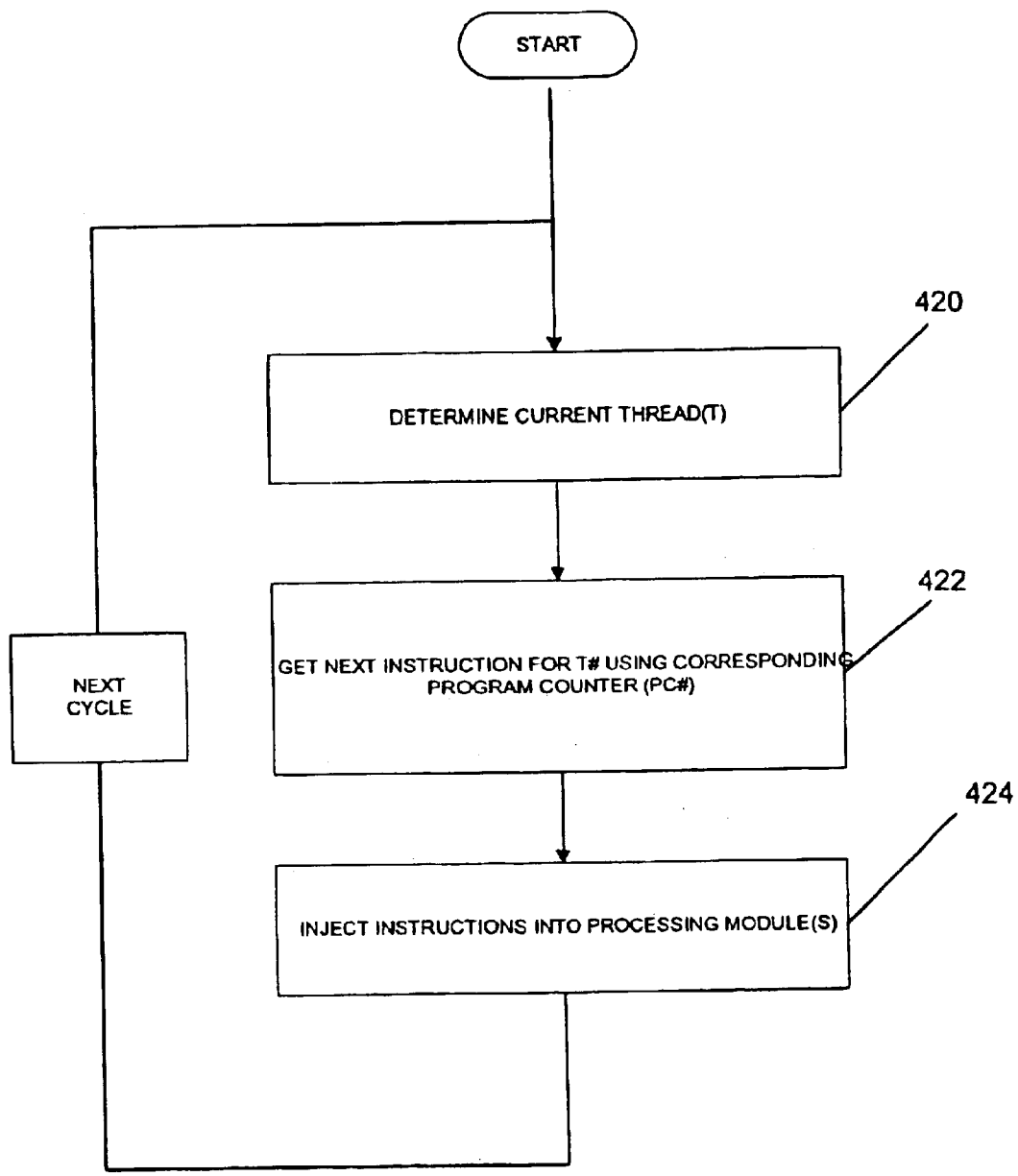
FIG. 4A is a flow chart illustrating a method of running multiple execution threads in accordance with-one embodiment of the present invention.

FIG. 4A is a flow chart illustrating a method of executing multiple threads in the transform module 52 in accordance w one embodiment of the present invention. In operation, the transform module 52 is capable of processing 3 vertices in parallel via interleaving. To this end, 3 commands can be simultaneously executed in parallel unless there are stall conditions between the commands such as writing and subsequently reading from the context memory 410. The 3 execution threads are independent of each other and can be any command since all vertices contain unique corresponding mode bits 202.

As shown in FIG. 4A, the method of executing multiple threads includes determining a current thread to be executed in operation 420. This determination might be made by identifying a number of cycles that a graphics-processing module requires for completion of an operation, and tracking the cycles. By tracking the cycles, each thread can be assigned to a cycle, thus allowing determination of the current thread based on the current cycle. It should be noted, however, that such determination might be made in any desired manner that is deemed effective.

Next, in operation 422, an instruction associated with a thread to be executed during a current cycle is retrieved using a corresponding program counter number. Thereafter, the instruction is executed on the graphics-processing module in operation 424.

In one example of use, the instant method includes first accessing a first instruction, or code segment, per a first program counter. As mentioned earlier, such program counter is associated with a first execution thread. Next, the first code segment is executed in the graphics-processing module. As will soon become apparent, such graphics-processing module might take the form of an adder, a multiplier, or any other functional unit or combination thereof.

Since the graphics-processing module requires more than one clock cycle to complete the execution, a second code segment might be accessed per a second program counter immediately one clock cycle after the execution of the first code segment. The second program counter is associated with a second execution thread, wherein each of the execution threads process a unique vertex.

To this end, the second code segment might begin execution in the graphics-processing module prior to the completion of the execution of the first code segment in the graphics-processing module. In use the graphics-processing module requires a predetermined number of cycles for every thread to generate an output. Thus, the various steps of the present example might be repeated for every predetermined number of cycles.

This technique offers numerous advantages over the prior art. Of course, the functional units of the present invention are used more efficiently. Further, the governing code might be written more efficiently when the multiple threading scheme is assumed to be used.

For example, in the case where the graphics-processing module includes a multiplier that requires three clock cycles to output an answer, it would be necessary to include two no operation commands between subsequent operations such as a=b*c and d=e*a, since "a" would not be available until after the three clock cycles. In the present embodiment, however, the code might simply call d=e*a immediately subsequent a=b*c, because it can be assumed that such code will be executed as one of three execution threads that are called once every three clock cycles.

Figure 4B:
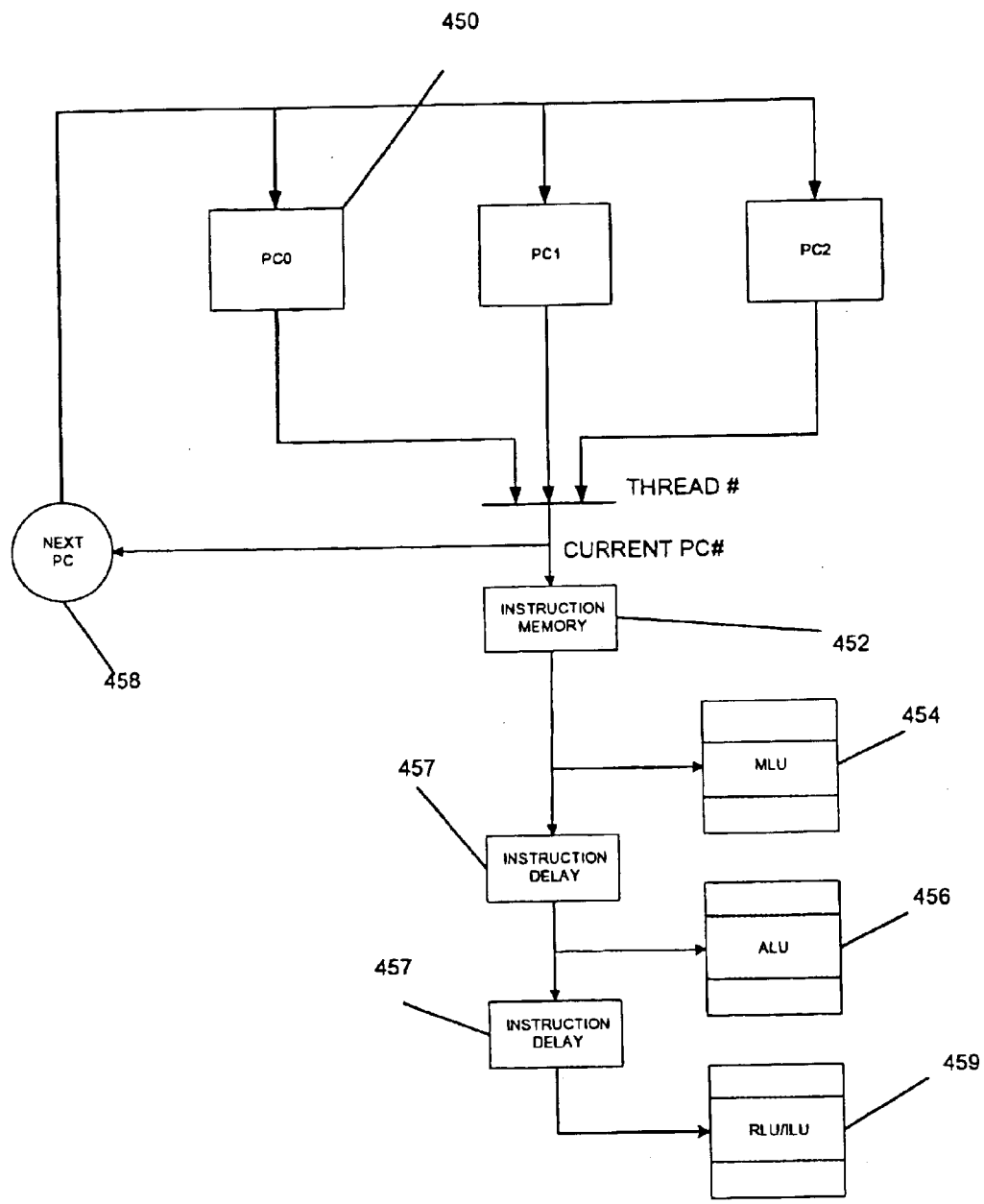
FIG. 4B is a flow diagram illustrating a manner in which the method of FIG. 4A is carried out in accordance with one embodiment of the present invention.

FIG. 4B is a flow diagram illustrating a manner in which the method of FIG. 4A is carried out. As shown, each execution thread has an associated program counter 450 that is used to access instructions, or code segments, in instruction memory 452. Such instructions might then be used to operate a graphics-processing module such as an adder 456, a multiplier 454, and/or an inverse logic unit or register 459.

In order to accommodate a situation where at least two of the foregoing processing modules are used in tandem, at least one code segment delay 457 is employed between the graphics-processing modules. In the case where a three-thread framework is employed, a three-clock cycle code segment delay 457 is used. In one embodiment, the code segment delay 457 is used when a multiplication instruction is followed by an addition instruction. In such case, the addition instruction is not executed until three clock cycles after the execution of the multiplication instruction in order to ensure that time has elapsed which is sufficient for the multiplier 456 to generate an output.

After the execution of each instruction, the program counter 450 of the current execution thread is updated and the program counter of the next execution thread is called by module 458 in a round robin sequence to access an associated instruction. It should be noted that the program counters might be used in any fashion including, but not limited to incrementing, jumping, calling and returning, performing a table jump, and/or dispatching. Dispatching refers to determining a starting point of code segment execution based on a received parameter. Further, it important to understand that the principles associated with the present multiple thread execution framework might also be applied to the lighting module 54 of the graphics-processing pipeline of the present invention.

In the case where a three-thread framework is employed, each thread is allocated one input buffer and one output buffer at any one time. This allows loading of three more commands with data while processing three commands. The input buffers and output buffers are assigned in a round robin sequence in a manner that will be discussed later with reference to FIGS. 27 and 28.

The execution threads are thus temporally and functionally interleaved. This means that each function unit is pipelined into three stages and each thread occupies one stage at any one time. In one embodiment, the three-threads might be set to always execute in the same sequence, i.e. zero then one then three. Conceptually, the threads enter a function unit at t=clock modulo-three. Once a function unit starts work, it takes three cycles to deliver the result (except the ILU that takes six), at which time the same thread is again active.

Figure 5:
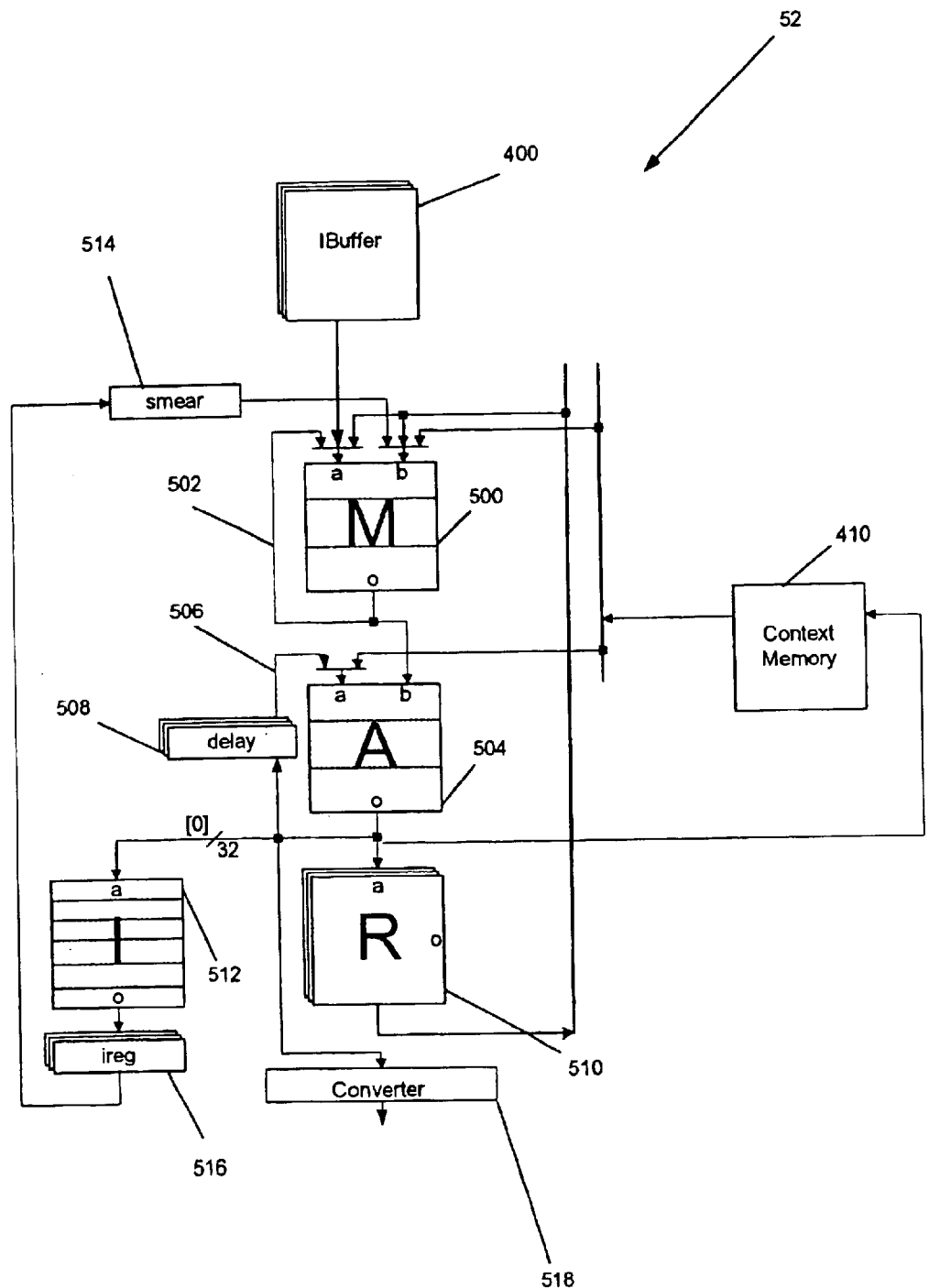
FIG. 5 illustrates the functional units of the transform module of FIG. 4 in accordance with one embodiment of the present invention.

FIG. 5 illustrates the functional units of the transform module 52 of FIG. 4 in accordance with one embodiment of the present invention. As shown, included are input buffers 400 that are adapted for being coupled to VAB 50 for receiving vertex data therefrom.

A memory logic unit (MLU) 500 has a first input coupled to an output of input buffers 400. As an option, the output of MLU 500 might have a feedback loop 502 coupled to the first input thereof.

Also provided is an arithmetic logic unit (ALU) 504 having a first input coupled to an output of MLU 500. The output of ALU 504 further has a feedback loop 506 connected to the second input thereof Such feedback loop 502 may further have a delay 508 coupled thereto. Coupled to an output of ALU 504 is an input of a register unit 510. It should be noted that the output of register unit 510 is coupled to the first and second inputs of MLU 500.

An inverse logic unit (ILU) 512 is provided including an input coupled to the output of ALU 504 for performing an inverse or an inverse square root operation. In an alternate embodiment, ILU 512 might include an input coupled to the output of register unit 510.

Further included is a conversion, or smearing, module 514 coupled between an output of ILU 512 and a second input of MLU 500. In use the conversion module 514 serves to convert scalar vertex data to vector vertex data. This is accomplished by multiplying the scalar data by a vector so that the vector operators such as the multiplier and/or adder may process it. For example, a scalar A, after conversion, may become a vector (A,A,A,A). In an alternate embodiment, the smearing module 514 might be incorporated into the multiplexers associated with MLU 500, or any other component of the present invention. As an option, a register 516 might be coupled between the output of ILU 512 and an input of the conversion unit 514. Further, such register 516 might be threaded.

Memory 410 is coupled to the second input of MLU 500 and the output of ALU 504. In particular, memory 410 has a read terminal coupled to the second input of MLU 500. Further, memory 410 has a write terminal coupled to the output of ALU 504.

The memory 410 has stored therein a plurality of constants and variables for being used in conjunction with the input buffer 400, MLU 500, ALU 504, register unit 510, ILU 512, and the conversion module 514 for processing the vertex data. Such processing might include transforming object space vertex data into screen space vertex data, generating vectors, etc.

Finally, an output converter 518 is coupled to the output of ALU 504. The output converter 518 serves for being coupled to a lighting module 54 via output buffers 402 to output the processed vertex data thereto. All data paths except for the ILU might be designed to be 128 bits wide or other data path Widths may be used.

Figure 6:
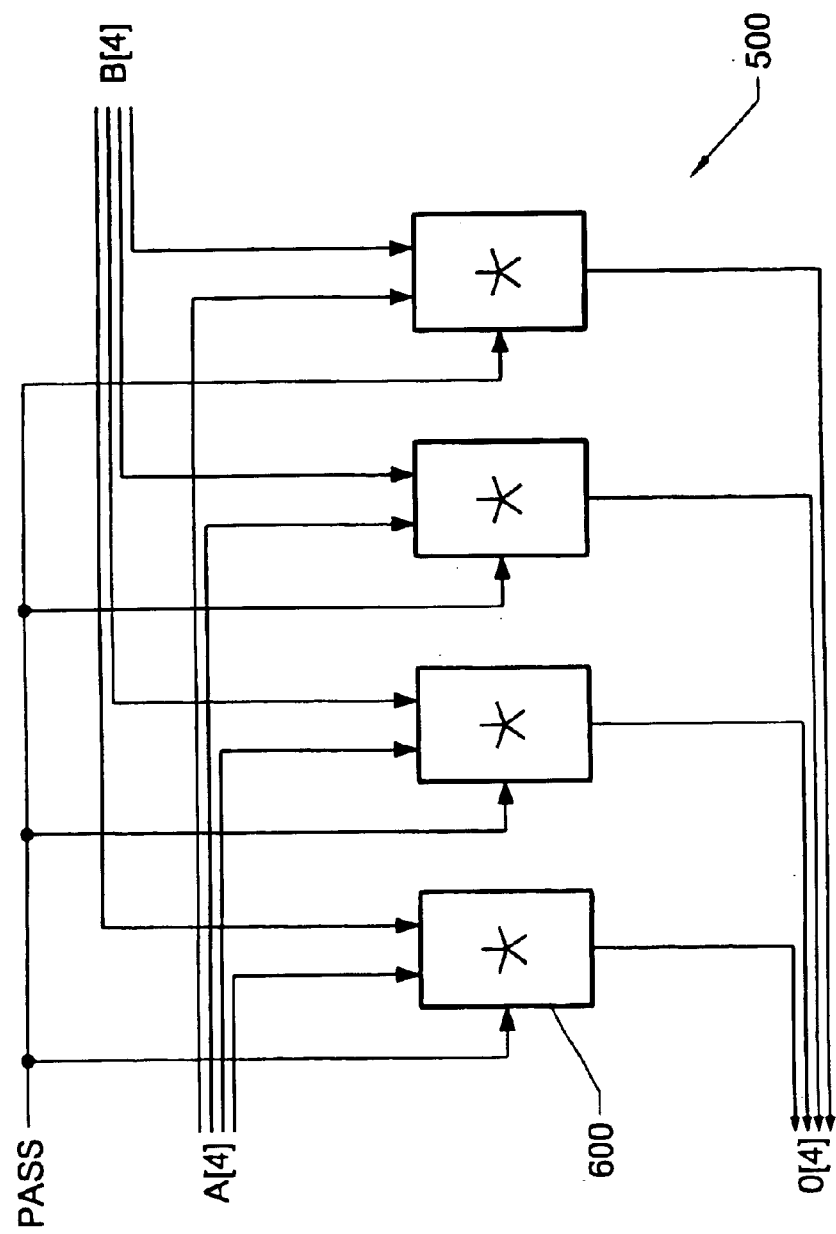
FIG. 6 is a schematic diagram of the multiplication logic unit (MLU) of the transform module of FIG. 5.

FIG. 6 is a schematic diagram of MLU 500 of the transform module 52 of FIG. 5 in accordance with one embodiment of the present invention. As shown, MLU 500 of the transform module 52 includes four multipliers 600 that are coupled in parallel.

MLU 500 of transform module 52 is capable of multiplying two four component vectors in three different ways, or pass one four component vector. MLU 500 is capable of performing multiple operations. Table 2 illustrates such operations associated with MLU 500 of transform module 52.

TABLE 2

| | |
|---|---|
| CMLU_MULT | o[0] = a[0] * b[0], o[1] = a[1] * b[1], o[2] = a[2] * b[2], o[3] = a[3] * b[3] |
| CMLU_MULA | o[0] = a[0] * b[0], o[1] = a[1] * b[1], o[2] = a[2] * b[2], o[3] = a[3] |
| CMLU_MULB | o[0] = a[0] * b[0], o[1] = a[1] * b[1], o[2] = a[2] * b[2], o[3] = b[3] |
| CMLU_PASA | o[0] = a[0], o[1] = a[1], o[2] = a[2], o[3] = a[3] |
| CMLU_PASB | o[0] = b[0], o[1] = b[1], o[2] = b[2], o[3] = b[3] |

Possible A and B inputs are shown in Table 3.

TABLE 3

| | |
|---|---|
| MA_M | MLU |
| MA_V | Input Buffer |
| MA_R | RLU (shared with MB_R) |
| MB_I | ILU |
| MB_C | Context Memory |
| MB_R | RLU (shared with MA_R) |

Table 4 illustrates a vector rotate option capable of being used for cross products.

TABLE 4

| | |
|---|---|
| MR_NONE | No change |
| MR_ALBR | Rotate A[XYZ] vector left, B[XYZ] vector right |
| MR_ARBL | Rotate A[XYZ] vector right, B[XYZ] vector left |

Figure 7:
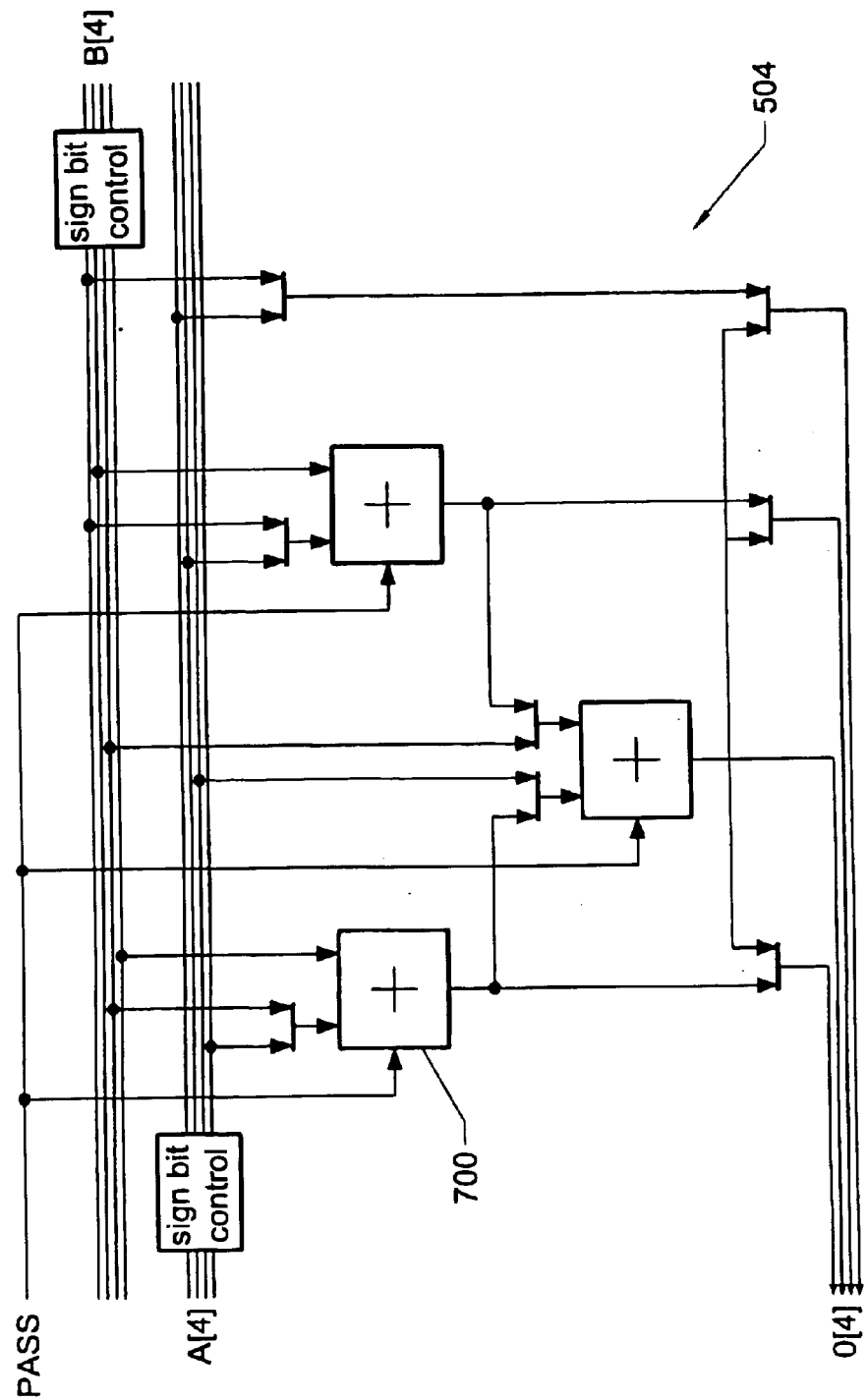
FIG. 7 is a schematic diagram of the arithmetic logic unit (ALU) of the transform module of FIG. 5.

FIG. 7 is a schematic diagram of ALU 504 of transform module 52 of FIG. 5 in accordance with one embodiment of the present invention. As shown, ALU 504 of transform module 52 includes three adders 700 coupled in parallel/series. In use ALU 504 of transform module 52 can add two three component vectors, pass one four component vector, or smear a vector component across the output. Table 5 illustrates various operations of which ALU 504 of transform module 52 is capable.

TABLE 5

| | |
|---|---|
| CALU_ADDA | o[0] = a[0] + b[0], o[1] = a[1] + b[1], o[2] = a[2] + b[2], o[3] = a[3] |
| CALU_ADDB | o[0] = a[0] + b[0], o[1] = a[1] + b[1], o[2] = a[2] + b[2], o[3] = b[3] |
| CALU_SUM3B | o[0123] = b[0] + b[1] + b[2] |
| CALU_SUM4B | o[0123] = b[0] + b[1] + b[2] + b[3] |
| CALU_SMRB0 | o[0123] = b[0] |
| CALU_SMRB1 | o[0123] = b[1] |
| CALU_SMRB2 | o[0123] = b[2] |
| CALU_SMRB3 | o[0123] = b[3] |
| CALU_PASA | o[0] = a[0], o[1] = a[1], o[2] = a[2], o[3] = a[3] |
| CALU_PASB | o[0] = b[0], o[1] = b[1], o[2] = b[2], o[3] = b[3] |
| CALU_SMRB2 | o[0123] = b[2] |
| CALU_SMRB3 | o[0123] = b[3] |
| CALU_PASA | o[0] = a[0], o[1] = a[1], o[2] = a[2], o[3] = a[3] |
| CALU_PASB | o[0] = b[0], o[1] = b[1], o[2] = b[2], o[3] = b[3] |

Table 6 illustrates the A and B inputs of ALU 504 of transform module 52.

TABLE 6

| | |
|---|---|
| AA_A | ALU (one instruction delay) |
| AA_C | Context Memory |
| AB_M | MLU |

It is also possible to modify the sign bits of the A and B input by effecting no change, negation of B, negation of A, absolute value A,B. It should be noted that when ALU 504 outputs scalar vertex data, this scalar vertex data is smeared across the output in the sense that each output represents the scalar vertex data. The pass control signals of MLU 500 and ALU 504 are each capable of disabling all special value handling during operation.

FIG. 8 is a schematic diagram of the vector register file 510 of transform module 52 of FIG. 5 in accordance with one embodiment of the present invention. As shown, the vector register file 510 includes four sets of registers 800 each having an output connected to a first input of a corresponding multiplexer 802 and an input coupled to a second input of the corresponding multiplexer 802.

In one embodiment of the present invention, the vector register file 510 is threaded. That is, there are three copies of the vector register file 510 and each thread has its own copy. In one embodiment, each copy contains eight registers, each of which might be 128 bits in size and store four floats. The vector register file 510 is written from ALU 504 and the output is fed back to MLU 500. The vector register file 510 has one write and one read per cycle.

In operation, it is also possible to individually mask a write operation to each register component. The vector register file 510 exhibits zero latency when the write address is the same as the read address due to a bypass path 511 from the input to the output. In this case, unmasked components would be taken from the registers and masked components would be bypassed. The vector register file 510 is thus very useful for building up vectors component by component, or for changing the order of vector components in conjunction with the ALU SMR operations (See Table 5). Temporary results might be also stored in the vector register file 510.

FIG. 9 is a schematic diagram of ILU 512 of transform module 52 of FIG. 5 in accordance with one embodiment of the present invention. As shown, ILU 512 of transform module 52 is capable of generating a floating-point reciprocal (1/D) and a reciprocal square root (I/D^(½)). To carry out such operations, either one of two iterative processes might be executed on a mantissa. Such processes might be executed with any desired dedicated hardware, and are shown below:

| Reciprocal (1/D) | Reciprocal Square-root $(1/D^{\wedge}(1/2))$ |
|---|---|
| 1) table look up for $x_n$ (seed) $x_n$ | $x_{n+1} = (1/2) * x_n(3 - x_n^2 * D)$ table look up for $x_n$ (seed) $x_n * x_n$ |
| 2) 1st iteration: multiply-add $2 - x_n * D$ | 1st iteration: multiply-add $3 - x_n^2 * D$ |
| 3) 1st iteration: multiply $x_n(2 - x_n * D)$ | 1st iteration: multiply $(1/2) * x_n(3 - x_n^2 * D)$ |
| 4) 2nd iteration: no-op pass $x_n + 1$ | 2nd iteration: square $x_{n+1}^2$ |
| 5) 2nd iteration: multiply-add $2 - x_{n+1} * D$ | 2nd iteration: multiply-add $3 - x_{n+1}^2 * D$ |
| 6) 2nd iteration: multiply $x_{n+1}(2 - x_{n+1} * D)$ | 2nd iteration: multiply $(1/2) * x_{n+1}(3 - x_{n+1}^2 * D)$ |

$x_n + 1 = x_n(2 - x_n * D)$

As shown, the two processes are similar, affording a straightforward design. It should be noted that the iterations might be repeated until a threshold precision is met.

In operation, ILU 512 performs two basic operations including an inverse operation and inverse square root operation. Unlike the other units, it requires six cycles to generate the output. The input is a scalar, and so is the output. As set forth earlier, the threaded holding register 516 at ILU 512 output is relied upon to latch the result until the next time a valid result is generated. Further, the scalar output is smeared into a vector before being fed into MLU 500. The inverse unit 512 uses look-up tables and a two pass Newton-Raphson iteration to generate IEEE (Institute of Electrical and Electronics Engineers) outputs accurate to within about 22 mantissa bits. Table 7 illustrates the various operations that might be performed by ILU 512 of transform module 52.

TABLE 7

| | |
|---|---|
| CILU_INV | o = 1.0/a |
| GILU_ISQ | o = 1.0/sqrt(a) |
| GILU_CINV | o = 1.0/a (with range clamp) |
| CILU_NOP | no output |

The foregoing range clamp inversion operation of Table 7 might be used to allow clipping operations to be handled by rasterization module 56. Coordinates are transformed directly into screen space that can result in problems when the homogeneous clip space w is near 0.0. To avoid multiplying by 1.0/0.0 in the perspective divide, the 1/w calculation is clamped to a minimum and a maximum exponent.

In use the context memory 410 as shown in FIG. 5 reads and writes only using quad-words. The memory can be read by MLU 500 or ALU 504 each cycle, and can be written by ALU 504. Only one memory read is allowed per cycle. If a read is necessary, it is done at the start of an instruction and then pipelined down to ALU 504 three cycles later. Context memory 410 need not necessarily be threaded.

FIG. 10 is a chart of the output addresses of output converter 518 of transform module 52 of FIG. 5 in accordance with one embodiment of the present invention. The output converter 518 is responsible for directing the outputs to proper destinations, changing the bit precision of data, and some data swizzling to increase performance. All data destined for lighting module 54 is rounded to a 22 bit floating point format organized as S1E8M13 (one sign, eight exponent, 13 mantissa bits). The destination buffers 402 as shown in FIG. 4 in lighting module 54 are threaded.

Data swizzling is useful when generating vectors. Such technique allows the generation of a distance vector (1,d, d*d) without penalty when producing a vector. The distance vector is used for fog, point parameter and light attenuation. This is done with an eye vector and light direction vectors. Table 8 illustrates the various operations associated with such vectors. It should be noted that, in the following table, squaring the vector refers to $d^2=dot[(x,y,z), (x,y,z)]$, and storing $d^2$ in the w component of (x,y,z).

TABLE 8

1. Square the vector (x, y, z, d * d) (output d * d to VBUF, 1.0 to VBUF)
2. Generate inverse sqrt of d * d (1/d)
3. Normalize vector (x/d, y/d, z/d, d) (output x/d, y/d, z/d to WBUF, d to VBUF)

It should be noted that the math carried out in the present invention might not always be IEEE compliant. For example, it might be assumed that "0" multiplied by any number renders "0." This is particularly beneficial when dealing with the equations such as $d=d^2*1/(d^2)^{1/2}$, where d=0. Without making the foregoing assumption, such equation would afford an error, thus causing problems in making related computations.

FIG. 11 is an illustration of the micro-code organization of transform module 52 of FIG. 5 in accordance with one embodiment of the present invention. The transform module micro-code might be arranged into 15 fields making up a total width of 44 bits. Fields might be delayed to match the data flow of the units. MLU 500 operations are executed at a delay of zero, ALU operations are executed at a delay of one, and RLU, output operations are executed at a delay of two. Each delay is equivalent to three cycles.

Figure 12:
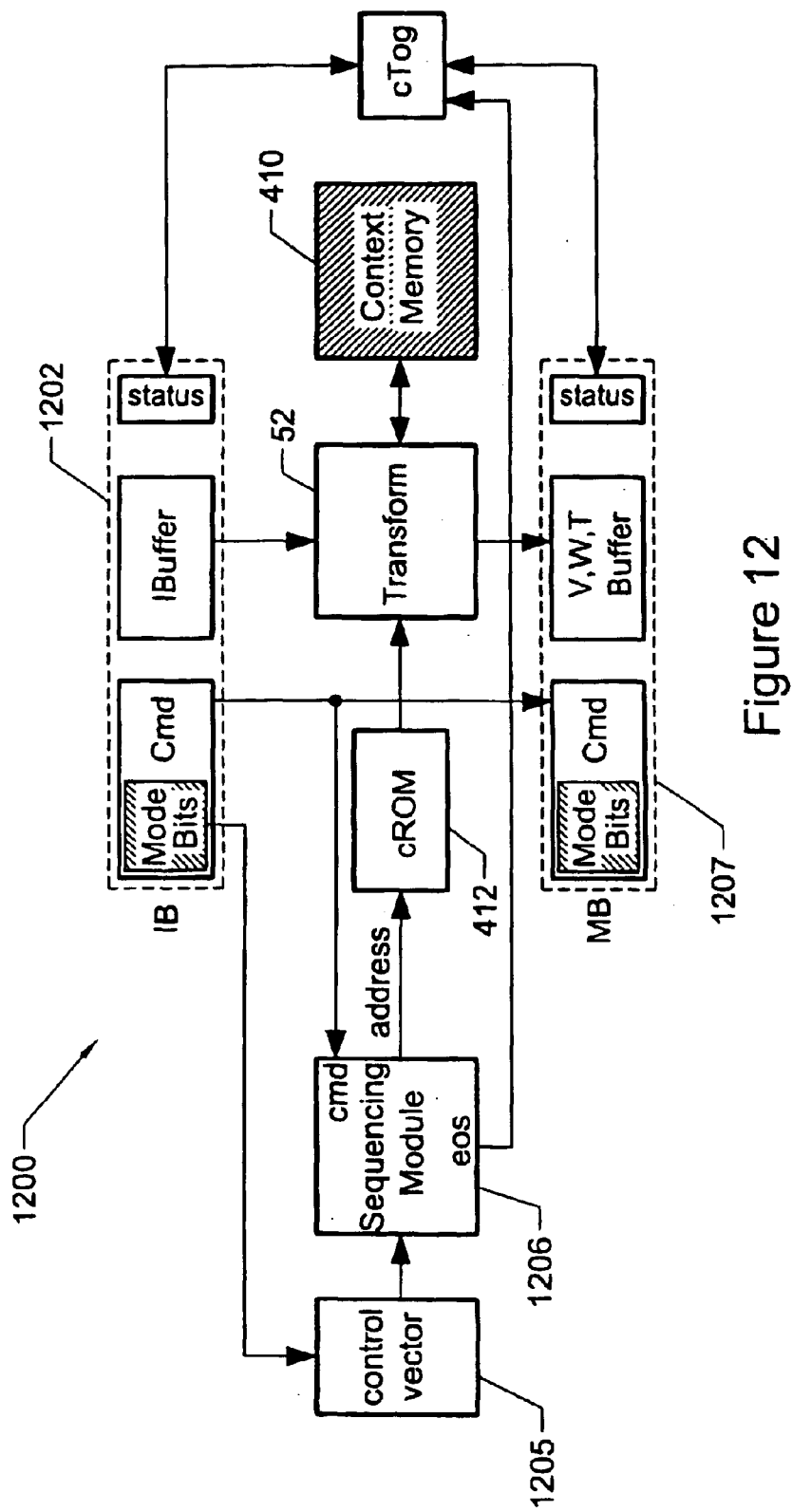
FIG. 12 is a schematic diagram of the sequencer of the transform module of FIG. 5 in accordance with one embodiment of the present invention.

FIG. 12 is a schematic diagram of sequencer 1200 of transform module 52 of FIG. 5 in accordance with one embodiment of the present invention. As shown in FIG. 12, sequencer 1200 of transform module 52 includes a buffer 1202 adapted for receiving the mode bits from VAB 50 that are indicative of the status of a plurality of modes of process operations.

Also included is memory 412 capable of storing code segments that each are adapted to carry out the process operations in accordance with the status of the modes. A sequencing module 1206 is coupled between memory 412 and a control vector module 1205 which is in turn coupled to buffer 1202 for identifying a plurality of addresses in memory 412 based on a control vector derived from mode bits 202. The sequencing module 1206 is further adapted for accessing the addresses in memory 412 for retrieving the code segments that might be used to operate transform module 52 to transfer data to an output buffer 1207.

Figure 13:
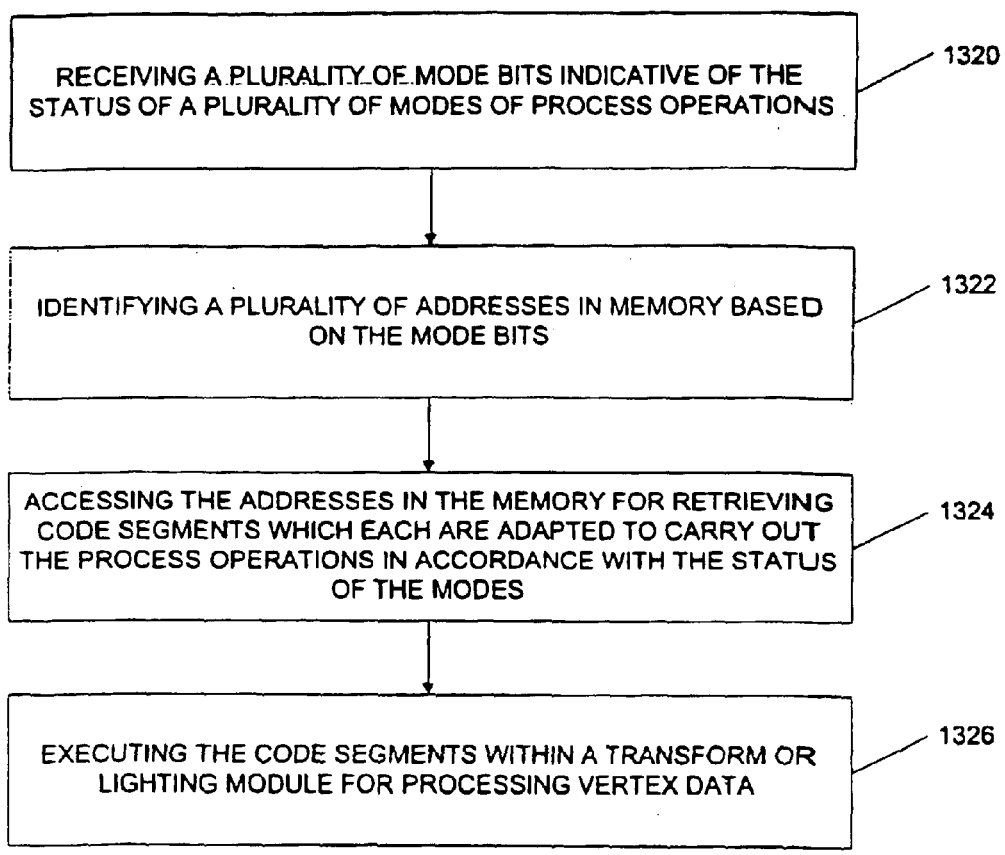
FIG. 13 is a flowchart delineating the various operations associated with use of the sequencer of the transform module of FIG. 12.

FIG. 13 is a flowchart delineating the various operations associated with use of sequencer 1200 of transform module 52 of FIG. 12. As shown, sequencer 1200 is adapted for sequencing graphics-processing in a transform or lighting operation. In operation 1320, mode bits 202 are first received which are indicative of the status of a plurality of modes of process operations. In one embodiment, mode bits 202 might be received from a software driver.

Then, in operation 1322, pluralities of addresses are then identified in memory based on mode bits 202. Such addresses are then accessed in the memory in operation 1324 for retrieving code segments that each are adapted to carry out the process operations in accordance with the status of the modes. The code segments are subsequently executed with a transform or lighting module for processing vertex data. Note operation 1326.

Figure 14:
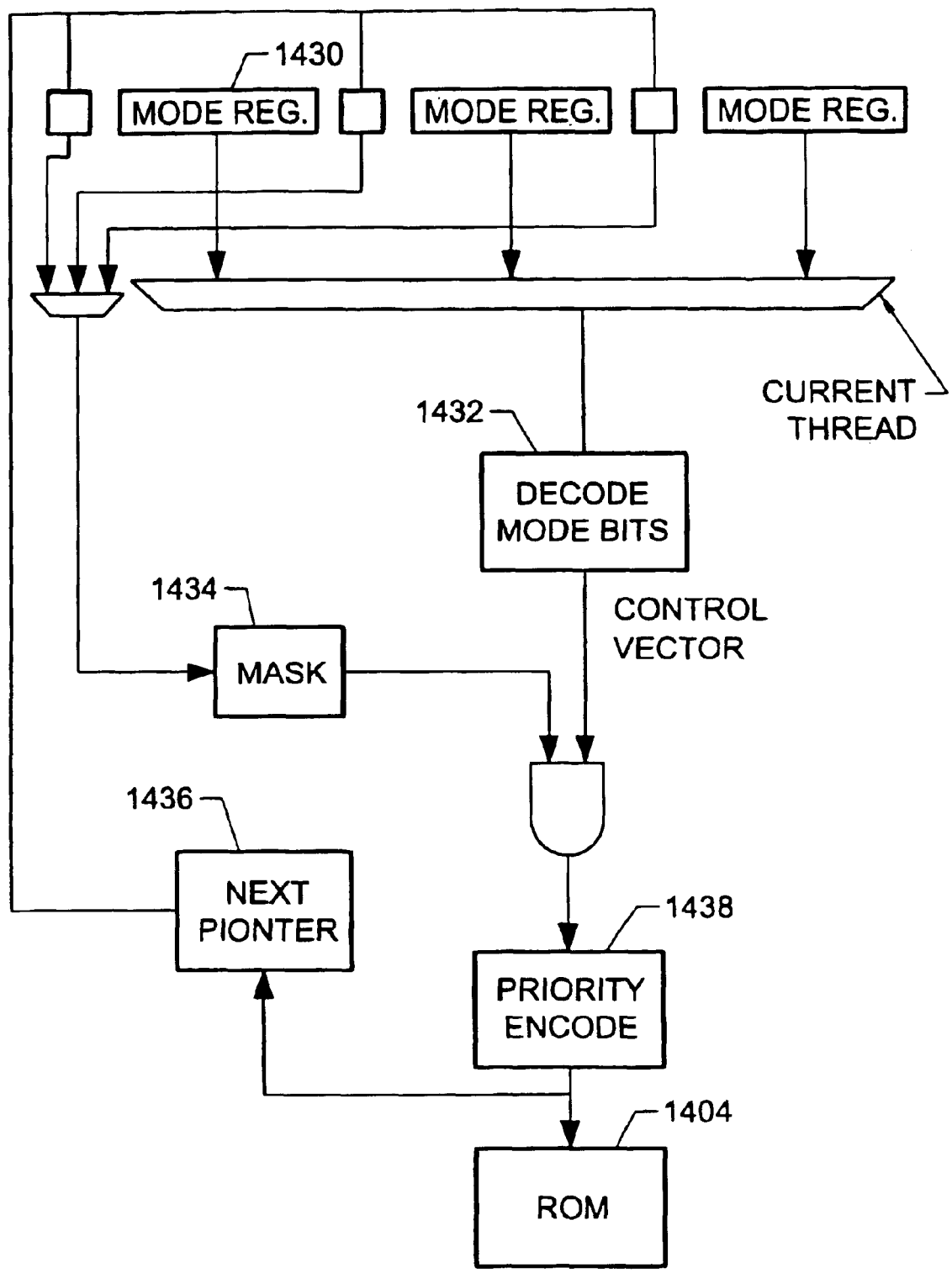
FIG. 14 is a flow diagram delineating the operation of the sequencing component of the sequencer of the transform module of FIG. 12.

FIG. 14 is a flow diagram delineating the operation of the sequencing module 1206 of sequencer 1200 of transform module 52 of FIG. 12. As shown, a plurality of mode registers 1430 each include a unique set of mode bits 202 which in turn correspond to a single vertex. It should be noted that mode registers 1430 are polled in a round robin sequence in order to allow the execution of multiple execution threads in the manner set forth earlier during reference to FIGS. 4A and 4B.

Once the current execution thread is selected, a corresponding group of mode bits 202 are decoded in operation 1432. Upon mode bits 202 being decoded in operation 1432, a control vector is afforded which includes a plurality of bits each of which indicate whether a particular code segment is to be accessed in ROM 1404 for processing the corresponding vertex data.

Upon determining whether a code segment should be accessed in ROM 1404 and executed, a pointer operation 1436 increments the current thread pointer to start the next execution thread to obtain a second group mode bits 202 to continue a similar operation. This might be continued for each of the threads in a round robin sequence.

Once the control vector has been formed for a particular group of mode bits 202, a priority encoder operation 1438 determines, or identifies, a next "1" or enabled, bit of the control vector. If such a bit is found, the priority encoder operation 1438 produces an address in ROM 1404 corresponding to the enabled bit of the control vector for execution purposes.

Upon returning to the initial group of mode bits 202 after handling the remaining threads, and after the mode bits have been decoded and the control vector is again available, a masking operation 1434 might be used to mask the previous "1", or enabled, bit that was identified earlier. This allows analysis of all remaining bits after mask operation 1434.

The foregoing process might be illustrated using the following tables. Table 9 shows a plurality of equations that might be executed on subject vertex data.

TABLE 9

R = (a           )
R = (a +        d*e )
R = (a + b*c +     f)
R = (a + b*c + d*e )
R = 1.0/(a           )
R = 1.0/(a +        d*e )
R = 1.0/(a + b*c +     f)
R = 1.0/(a + b*c + d*e )

As shown, there are four possibilities of products that might be summed in addition to an inverse operation (a, b*c, d*e, f, and 1/x). Next, mode fields might be defined. Table 10 illustrates a pair of mode fields, mode.y and mode.z, each having assigned thereto a predetermined set of the operations of Table 9.

TABLE 10 mode.y[4] 0: R = a
         1: R = a + d*e
         2: R = a + b*c + f
         3: R = a + b*c + d*e
mode.z[2] 0: R = R
         1: R = 1.0/R Thereafter, each of the operations might be positioned in memory with an associated address. Table 11 illustrates a plurality of memory addresses each having an associated operation. Also shown is a set of control vector definitions.

TABLE 11

ROM[0]: R = a
ROM[1]: R = R + b*c
ROM[2]: R = R + d*e
ROM[3]: R = R + f
ROM[4]: R = 1.0/R
cv[0] = 1;
cv[1] = (mode.y==2 || mode.y==3) ? 1 : 0;
cv[2] = (mode.y==1 || mode.y==3) ? 1 : 0;
cv[3] = (mode.y==2) ? 1:0;
cv[4] = (mode.z==1) ? 1:0;

Table 12 illustrates the execution of an example.

TABLE 12

R = a+d*e corresponds to:
              mode.y = 1;
              mode.z = 0;

which in turn affords the following control vector:

cv[0] = 1;
cv[1] = 0;
cv[2] = 1;
cv[3] = 0;
cv[4] = 0;
execution

-continued first cycle:
    cv[0] is TRUE so execute ROM[0]
    more TRUE values in control vector, so do not terminate
    program
second cycle:
    cv[1] is FALSE so keep looking
    cv[2] is TRUE so execute ROM[2]
    no more TRUE values in control vector, so terminate
    program As such, sequencer 1200 of transform module 52 steps through a threaded control vector which is derived from threaded mode bits 202, and executes every ROM address whose corresponding control vector bit is set to "TRUE". The control vector has the same length as the ROM. The sequencer 1200 is capable of stepping through an arbitrary control vector at the rate of one "1", or enabled bit per a predetermined number of cycles. Commands that do not use mode bits 202 might be executed by on-the-fly micro-code generation due to the simplicity thereof.

By representing such statuses by way of a unique string of mode bits 202, it is unnecessary to execute a plurality of if-then clauses in the graphics-processing hardware to determine the statuses of the various operations. Improved performance is thereby afforded. Conceptually, it is as if the if clauses in a program language had been moved to sequencer 1200 which in turn instantly skips instructions with a "FALSE" condition, as indicated by mode bits 202.

As indicated earlier, code segments are stored in the ROM which are capable of handling the various statuses of the operations identified by the mode bits. In one embodiment a separate code segment might be retrieved for handling each operation indicated by the mode bits. In the alternative, a single comprehensive code segment might be written for handling each or some combinations of operations that are possible. It should be noted, however, that generating such large code segments for each combination of operations requires additional code space, and it therefore might be beneficial to modularize the code segments for only commonly used combinations of operations.

Since mode bits 202 do not change once the vertex commences execution, the control vector generation might only have to be done once per vertex before entering the sequencer. Exceptions to this might arise in some cases, however, such as lighting where operations might be repeated. When the last vertex instruction is found, an end of sequence (EOS) signal might be asserted. This in turn might be used to change the status of the input and output buffers, and to allow the start of the next command in a manner that will be set forth during reference to FIGS. 28A and 28B. It should be noted that the EOS signal is pipeline delayed for release of the destination buffer similar to the manner in which the instructions are handled. See FIG. 4B.

Figure 14A:
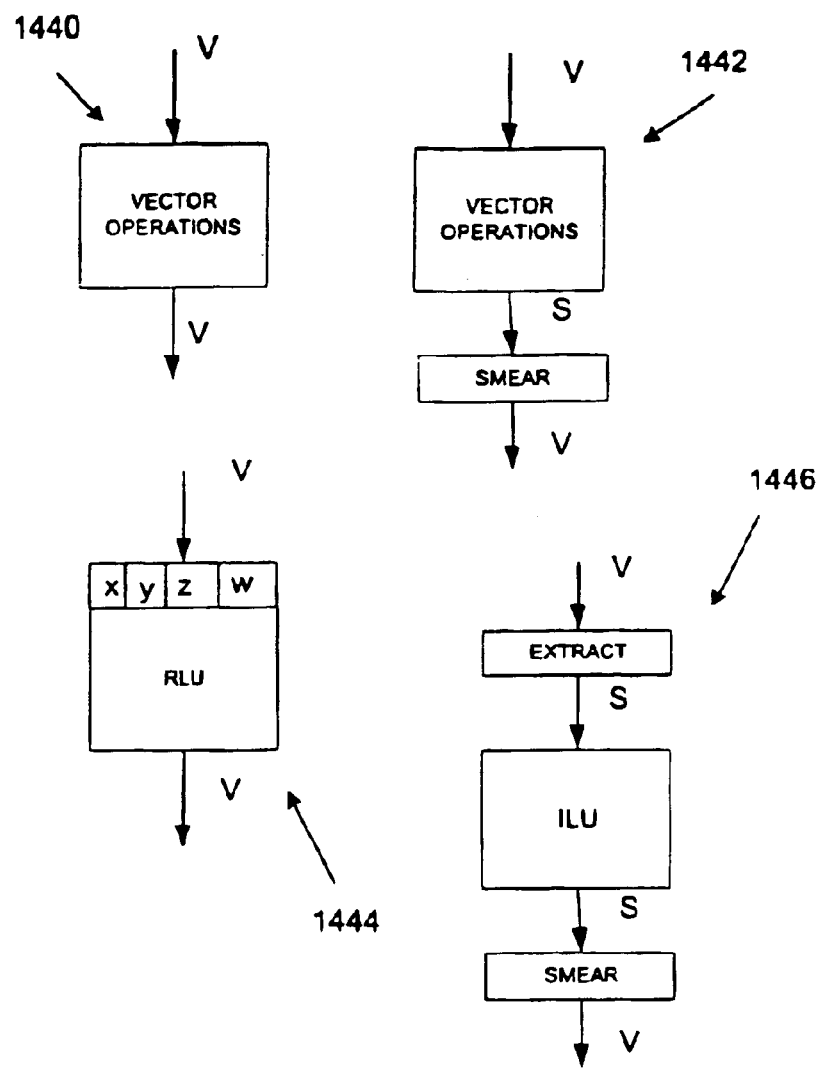
FIG. 14A is a flow diagram illustrating the components of the present invention employed for handling scalar and vector components during graphics-processing.

FIG. 14A is a flow diagram illustrating the various functional components of the present invention employed for integrating the handling of scalar and vector vertex data during graphics-processing. As shown, one functional aspect 1440 includes inputting vector vertex data into a processing module, i.e. adder, multiplier, etc., for outputting vector vertex data. In another functional aspect 1442, vector vertex data is processed by a vector processing module, i.e. adder, multiplier, etc., which outputs scalar vertex data that is in turn converted, or smeared, again into vector vertex data.

In yet another functional aspect 1444, vector vertex data is masked, thereby converted to scalar vertex data, after which it is stored in memory, i.e. register logic unit, for the purpose of generating vector vertex data. In still yet another functional aspect 1446, scalar vertex data is extracted by a vector processing module, i.e. adder, multiplier, etc., which in turn is processed by a scalar processing module, i.e. inverse logic unit, which renders scalar vertex data. This scalar vertex data is converted again into vector vertex data.

Figure 14B:
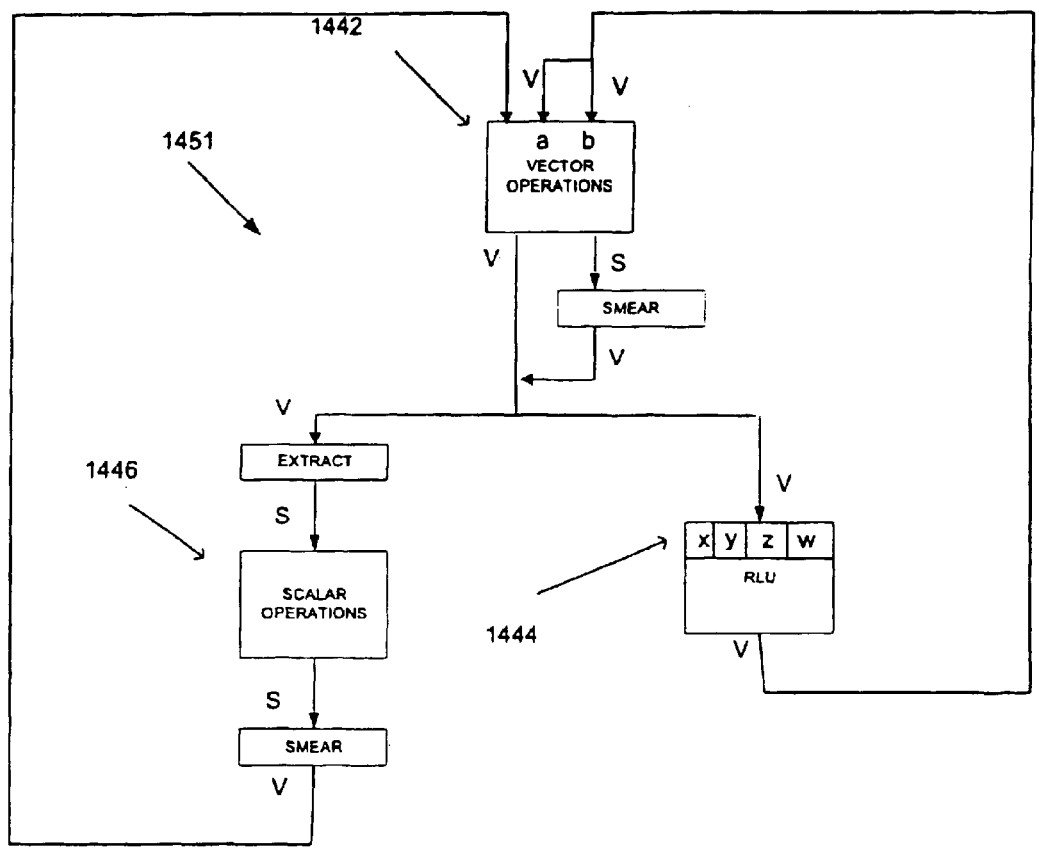
FIG. 14B is a flow diagram illustrating one possible combination 1451 of the functional components of the present invention shown in FIG. 14A which corresponds to the transform module of FIG. 5.
Figure 14C:
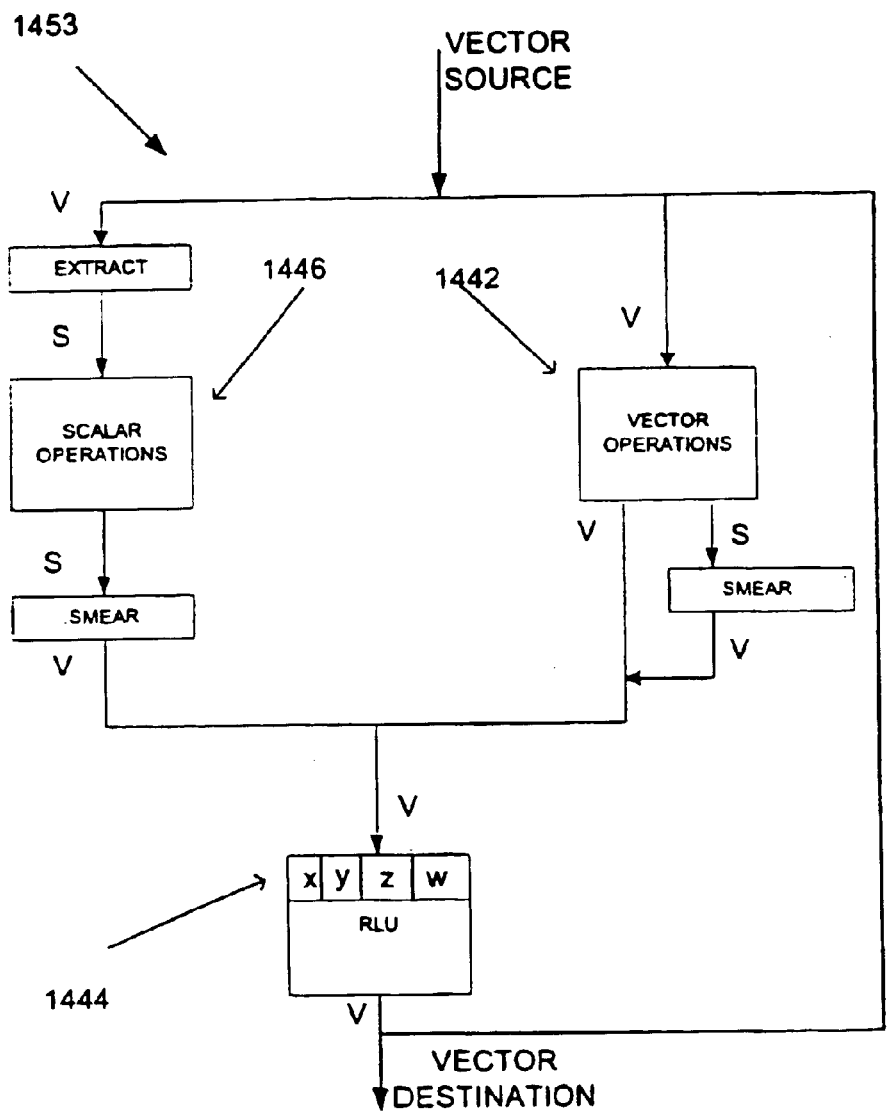
FIG. 14C is a flow diagram illustrating another possible combination 1453 of the functional components of the present invention shown in FIG. 14A.

FIG. 14B is a flow diagram illustrating one possible combination 1451 of the functional components of the present invention shown in FIG. 14A which corresponds to transform module 52 of FIG. 5. It should be noted that functional aspects 1444 and 1446 might have delays associated therewith in a manner similar to that set forth earlier during reference to FIG. 4B. FIG. 14C is a flow diagram illustrating yet another possible combination 1453 of the functional components of the present invention shown in FIG. 14A.

Multiplexers might accomplish the extraction of the scalar vertex data from the vector vertex data in the functional modules of FIGS. 14A–14C. Such multiplexers might also be responsible for any data swizzling that might be required before processing by the various functional modules. In one embodiment, the multiplexers might be capable of passing and rotating vector vertex data, and rely on other graphics-processing modules such as an ALU for other processing. In yet another embodiment, the multiplexers might be capable of arbitrarily rearranging attributes independently without penalty.

Figure 14D:
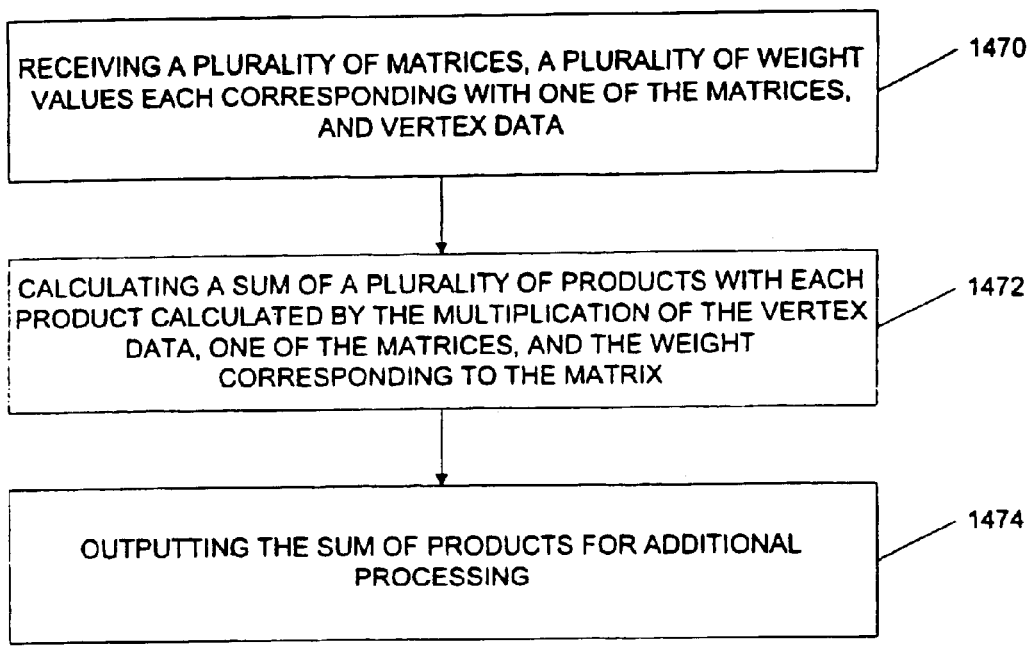
FIG. 14D illustrates a method implemented by the transform module of FIG. 12 for performing a blending operation during graphics-processing in accordance with one embodiment of the present invention.

FIG. 14D illustrates a method in which the transform system is adapted for performing a blending, or skinning operation during graphics-processing in a graphics pipeline via a hardware implementation such as an application specific integrated circuit (ASIC). During processing in the pipeline, in operation 1470, a plurality of matrices, a plurality of weight values each corresponding with one of the matrices, and vertex data are received. It should be noted that an additional set of matrices might be required for normal vertex data.

Subsequently, in operation 1472, a sum of a plurality of products is then calculated with each product being calculated by the multiplication of the vertex data, one of the matrices and the weight corresponding to the matrix. Such sum of products is then outputted in operation 1474 for additional processing.

In summary, the following sum of products might be calculated:

$$v' = \Sigma w_i * M_i * v \text{ for } i=1 \ldots x \quad \text{Equation \#1}$$

where
  v=inputted vertex data
  w=weight value
  M=matrix
  x=number of matrices
  v'=vertex data for output to a processing module $$n' = \Sigma w_i * I_i * n \text{ for } i=1 \ldots x \quad \text{Equation \#2}$$

where
  n=inputted vertex data (normal vector)
  w=weight value
  I=inverted matrix (inverse transpose matrix)
  x=number of inverted matrices
  n'=vertex data for output to a processing module (normal vector)

$$v_s = [O_x, O_y, O_z, \varnothing]' + 1/(v''_{wc}) * [(v''_x), (v''_y), (v''_z), 1]' \quad \text{Equation \#3}$$

where v''=C*v'
  v'=sum of products from Equation #1
  C=[$S_x$, $S_y$, $S_z$, 1]*P
  P=projection matrix
  $v_s$=screen vector for display purposes
  O=viewport offset
  S=viewport scale It should be noted that there are many ways to represent the weights $w_i$ set forth hereinabove. For example, in Equations #1 and #2 above, it might be said that i=1 . . . (x-1), leaving $w_x$ ($w_i$ where i=x) to be calculated by the equation 1-$\Sigma w_i$. By representing the weights $w_i$ in this way, it is ensured that all of the weights w sum to 1.

In one embodiment, the matrices might include model view matrices (M), and the sum of products (v') might be outputted for additional processing by a lighting operation. See Equation #1. This sum of products (v') might also be used to generate another sum of products ($v_s$) for display purposes by using a composite matrix (C). See Equation #3. Still yet, the matrices might include inverse matrices (I) and the vertex data might include normal vector data (n). In such case, the additional processing might include a lighting operation. See Equation #2.

Figure 15:
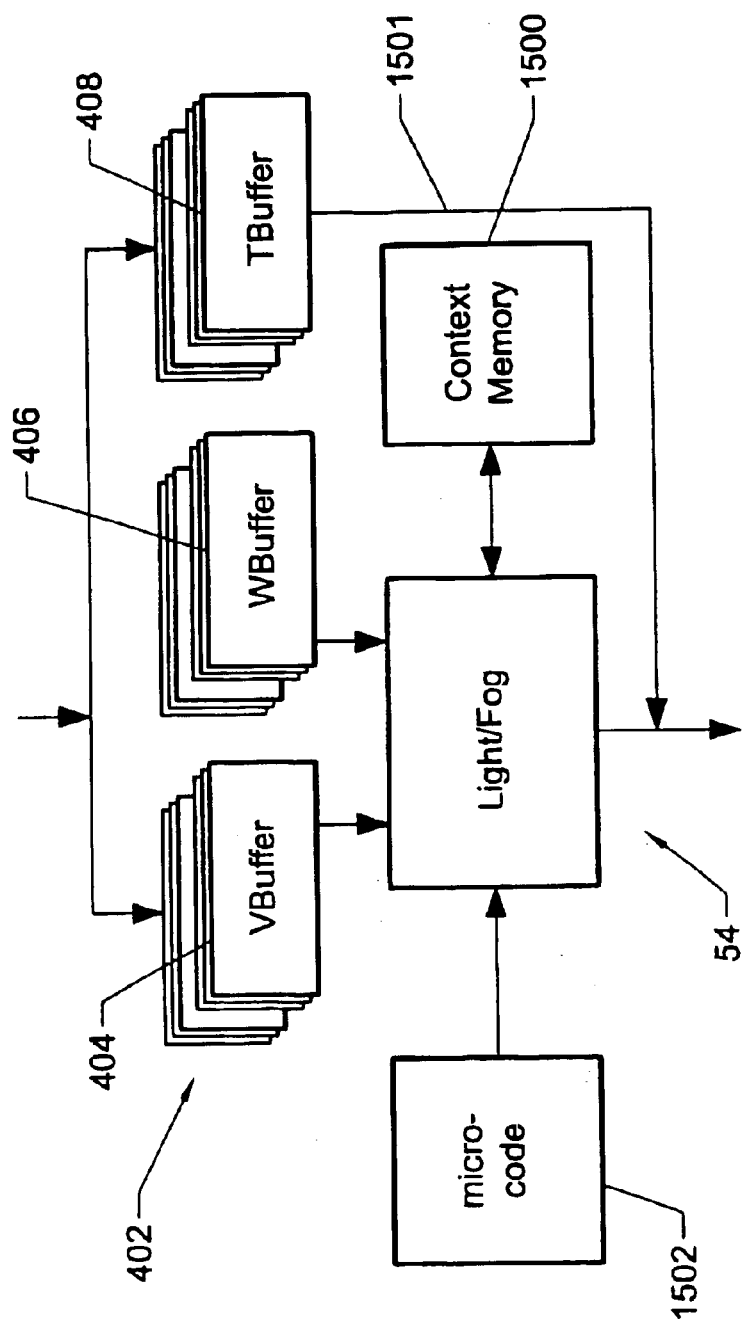
FIG. 15 is a schematic diagram of the lighting module of one embodiment of the present invention.

FIG. 15 is a schematic diagram of lighting module 54 in accordance with one embodiment of the present invention. As shown, lighting module 54 includes buffers 402 to which transform module 52 outputs the vertex data. As shown, buffer 408 bypasses lighting module 54 by way of the pathway 1501. Further coupled to lighting module 54 is a context memory 1500 and micro-code ROM memory 1502.

The lighting module 54 is adapted for handling lighting in addition to fog and point parameters. In use lighting module 54 controls the buffer bypass pathway 1501, and calculates the diffuse, point size, and specular output colors as well as the fog value. It should be noted that lighting module 54 employs the same mode bits 202 as transform module 52.

The lighting module 54 further requires less precision with respect to transform module 52, and therefore processes 22 bit floating point values (1.8.13 format) organized in tri-words. Since the data of third buffer 408 is 128 bits, it utilizes bypass pathway 1501 around lighting module 54. The lighting module 54 is event driven and simultaneously executes three threads in a manner similar to transform module 52 as was set forth earlier with reference to FIGS. 4A and 4B. It should be noted that lighting module 54 might require command launch approval from an outside source.

Figure 16:
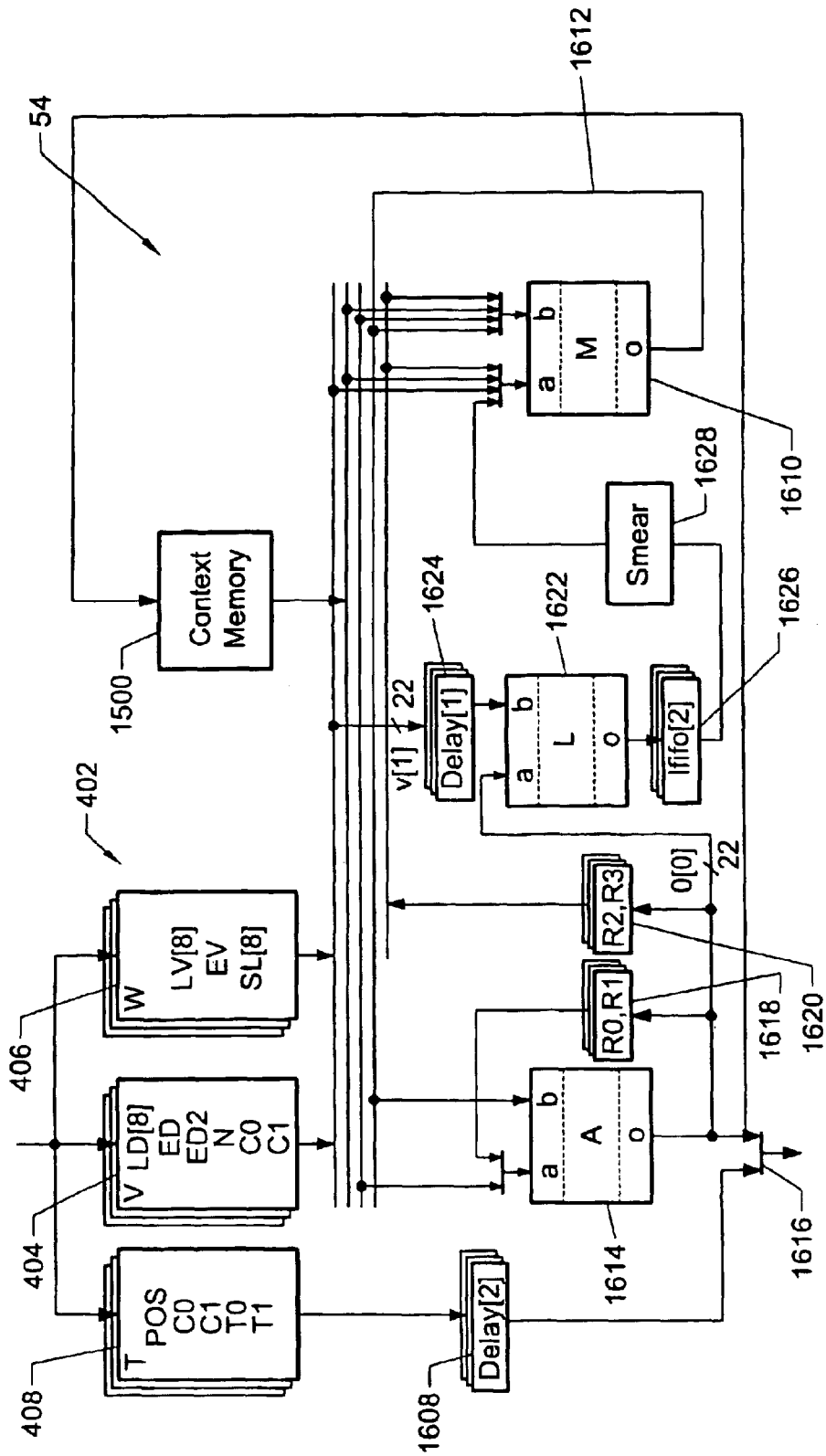
FIG. 16 is a schematic diagram showing the functional units of the lighting module of FIG. 15 in accordance with one embodiment of the present invention.

FIG. 16 is a schematic diagram showing the functional units of lighting module 54 of FIG. 15 in accordance with one embodiment of the present invention. As shown, included are input buffers 402 adapted for being coupled to a transform system for receiving vertex data therefrom. As set forth earlier, input buffers 402 include a first input buffer 404, a second input 406, and a third input buffer 408. An input of first buffer 404, second input buffer 406, and third input buffer 408 are coupled to an output of transform module 52. For bypass purposes, the output of third buffer 408 is coupled to the output of lighting module 54 via a delay 1608.

Further included is a MLU 1610 having a first input coupled to an output of first input buffer 404 and a second input coupled to an output of second input buffer 406. The output of MLU 1610 has a feedback loop 1612 coupled to the second input thereof. An arithmetic logic unit (ALU) 1614 has a first input coupled to an output of second input buffer 406. ALU 1614 further has a second input coupled to an output of MLU 1610. An output of ALU 1614 is coupled to the output of lighting module 54. It should be noted that the output of ALU 1614 and the output of the third input buffer 408 are coupled to the output of lighting module 54 by way of multiplexer 1616.

Next provided is a first register unit 1618 having an input coupled to the output of ALU 1614 and an output coupled to the first input of ALU 1614. A second register unit 1620 has an input coupled to the output of ALU 1614. Also, such second register 1620 has an output coupled to the first input and the second input of MLU 1610.

A lighting logic unit (LLU) 1622 is also provided having a first input coupled to the output of ALU 1614, a second input coupled to the output of the first input buffer 404, and an output coupled to the first input of MLU 1610. It should be noted that the second input of LLU 1622 is coupled to the output of the first input buffer 404 via a delay 1624. Further, the output of LLU 1622 is coupled to the first input of MLU 1610 via a first-in first-out register unit 1626. As shown in FIG. 16, the output of LLU 1622 is also coupled to the first input of MLU 1610 via a conversion module 1628. In operation, such conversion module 1628 is adapted for converting scalar vertex data to vector vertex data in a manner similar to that of transform module 52.

Finally, memory 1500 is coupled to at least one of the inputs of MLU 1610 and the output of arithmetic logic unit 1614. In particular, memory 1610 has a read terminal coupled to the first and the second input of MLU 1610. Further, memory 1500 has a write terminal coupled to the output of ALU 1614.

The memory has stored therein a plurality of constants and variables for being used in conjunction with input buffers 402, MLU 1610, ALU 1614, first register unit 1618, second register unit 1620, and LLU 1622 for processing the vertex data.

Figure 17:
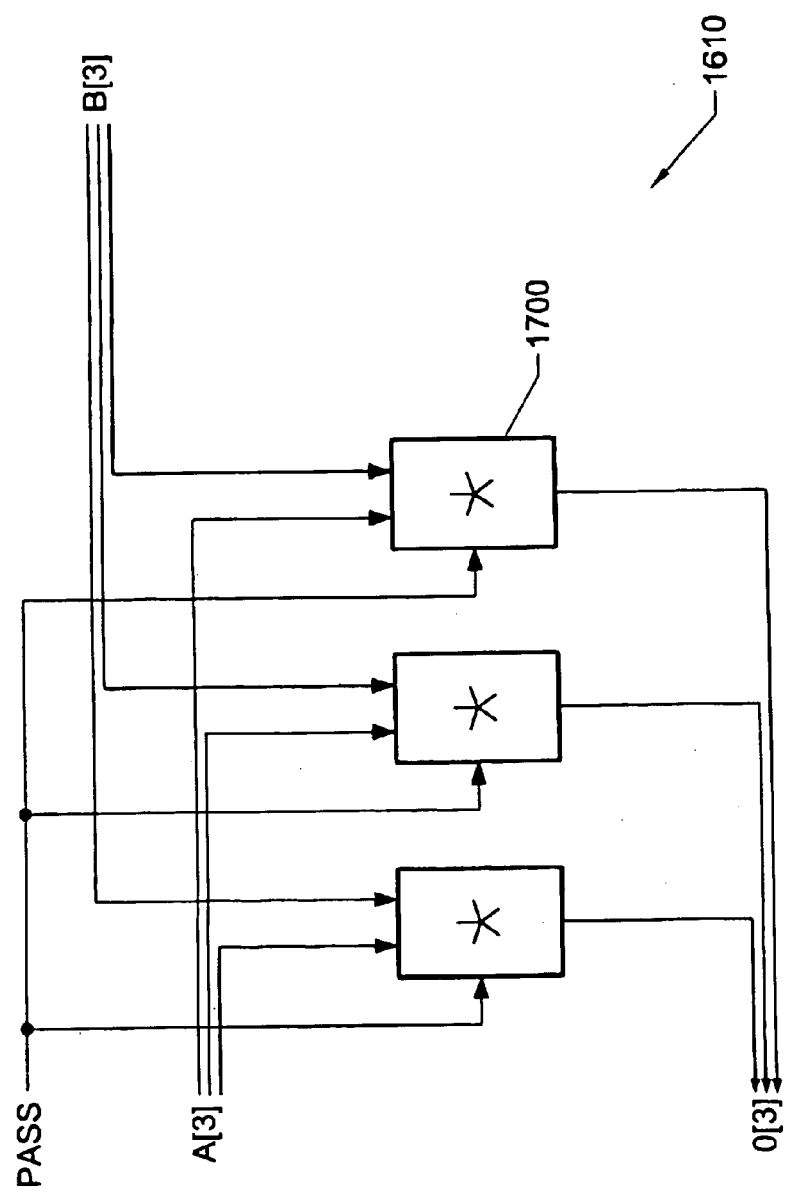
FIG. 17 is a schematic diagram of the multiplication logic unit (MLU) of the lighting module of FIG. 16 in accordance with one embodiment of the present invention.

FIG. 17 is a schematic diagram of MLU 1610 of lighting module 54 of FIG. 16 in accordance with one embodiment of the present invention. As shown, MLU 1610 of lighting module 54 includes three multipliers 1700 in parallel. In operation, the present MLU 1610 is adapted to multiply two three component vectors, or pass one three component vector. The multiplication of the three component vectors might be accomplished by way of a dot product or a parallel multiply. Table 13 illustrates the operations that MLU 1610 of lighting module 54 is capable of performing.

TABLE 13

| ZMLU_MULT | o[0] = a[0]*b[0], o[1] = a[1]*b[1], o[2] = a[2]*b[2] |
| ZMLU_PASA | o[0] = a[0], o[1] = a[1], o[2] = a[2] |
| ZMLU_PASB | o[0] = b[0], o[1] = b[1], o[2] = b[2] |

Table 14 illustrates the possible A and B inputs of MLU 1610 of lighting module 54.

TABLE 14

| MA_V | VBUFFER |
| MA_L | LLU |
| MA_R | RLU[2,3] (shared with MB_R) |
| MA_C | Context memory (shared with MB_C) |
| MB_M | MLU |
| MB_W | WBUFFER |
| MB_R | RLU[2,3] (shared with MA_R) |
| MB_C | Context memory (shared with MA_C) |

Figure 18:
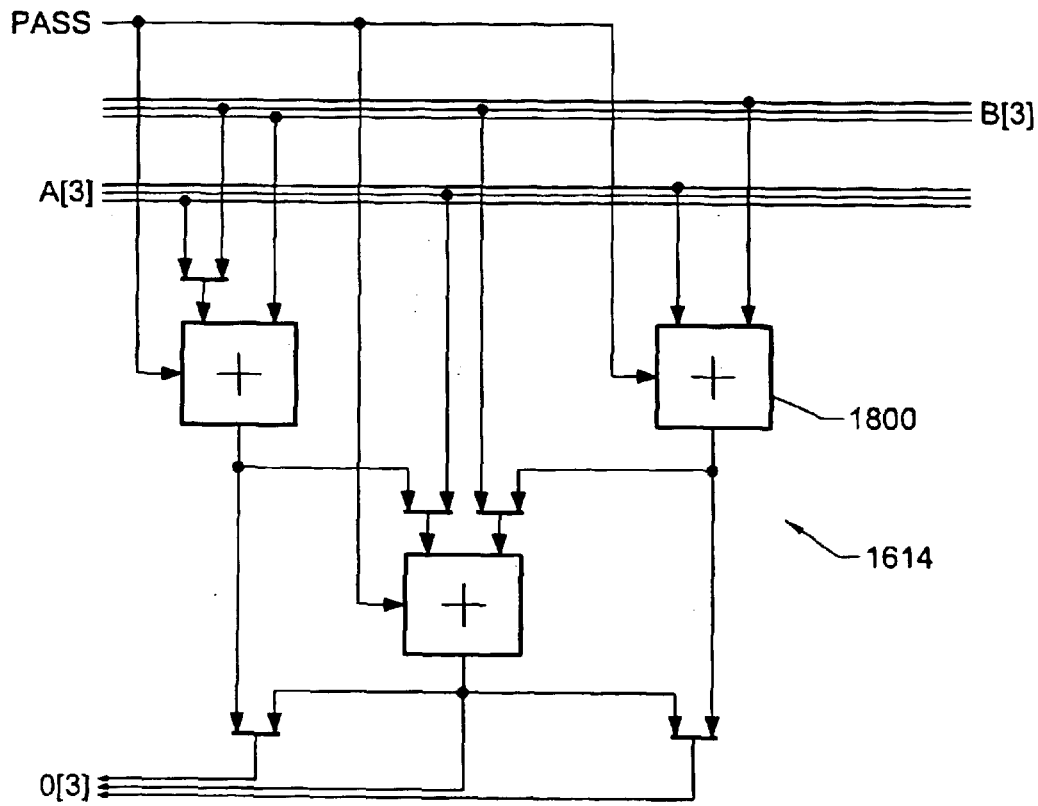
FIG. 18 is a schematic diagram of the arithmetic logic unit (ALU) of the lighting module of FIG. 16 in accordance with one embodiment of the present invention.

FIG. 18 is a schematic diagram of ALU 1614 of lighting module 54 of FIG. 16 in accordance with one embodiment of the present invention. As shown, ALU 1614 includes three adders 1800 in parallel/series. In use ALU 1614 is capable of adding two three component vectors, or passing one three component vector. Table 15 illustrates the various operations of which ALU 1614 of lighting module 54 is capable.

TABLE 15

| ZALU_ADD | o[0] = a[0]+b[0], o[1] = a[1]+b[1], o[2] = a[2]+b[2] |
| ZALU_SUM3B | o[012] = b[0] + b[1] + b[2] |
| ZALU_PASA | o[0] = a[0], o[1] = a[1], o[2] = a[2] |
| ZALU_PASB | o[0] = b[0], o[1] = b[1], o[2] = b[2] |

Table 16 illustrates the possible A and B inputs to ALU 1614 of lighting module 54.

TABLE 16

| AA_W | WBUFFER |
| AA_R | RLU[0,1] |
| AB_M | MLU |

Figure 19:
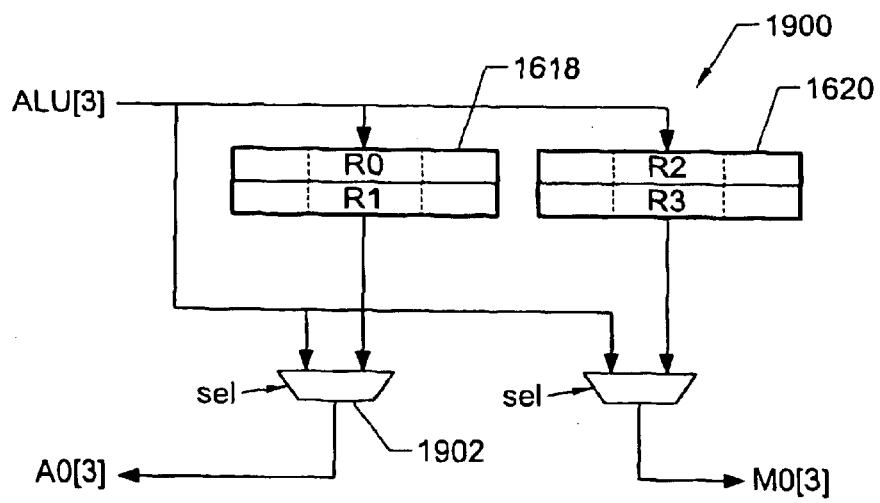
FIG. 19 is a schematic diagram of the register unit of the lighting module of FIG. 16 in accordance with one embodiment of the present invention.

FIG. 19 is a schematic diagram of register units 1618 and 1620 of lighting module 54 of FIG. 16 in accordance with one embodiment of the present invention. As shown, register units 1618 and 1620 each include two sets of registers 1900 each having an output connected to a first input of a corresponding multiplexer 1902 and an input coupled to a second input of multiplexer 1902.

Register units 1618 and 1620 of lighting module 54 are split into two registers for ALU 1614 and two registers for MLU 1610. In one embodiment, the registers are threaded. The register units 1618 and 1620 exhibit zero latency when a write address is the same as a read address due to a bypass path from the input to the outputs.

Figure 20:
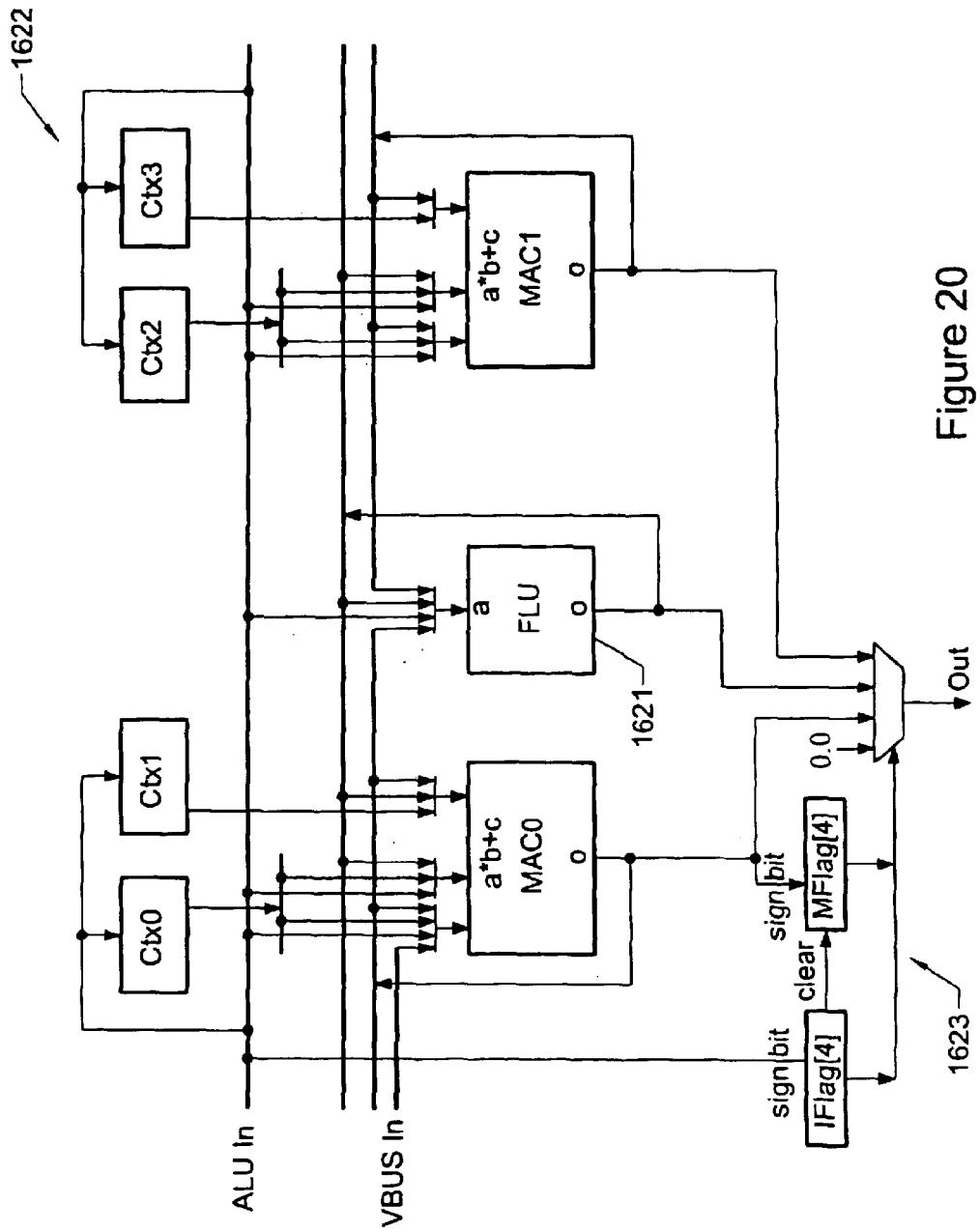
FIG. 20 is a schematic diagram of the lighting logic unit (LLU) of the lighting module of FIG. 16 in accordance with one embodiment of the present invention.

FIG. 20 is a schematic diagram of LLU 1622 of lighting module 54 of FIG. 16 in accordance with one embodiment of the present invention. LLU 1622 is the lighting unit of lighting module 54. It is a scalar block that computes lighting coefficients later used to multiply the light+material colors. LLU 1622 includes two MAC's, an inverter, four small memories, and a flag register.

The flag register is used to implement the conditional parts of the lighting equations. The outputs are an ambient, diffuse, and specular coefficient. The scalar memories contain variables used for the specular approximations and constants. The first location of each memory contains 1.0 (for ctx0 and ctx2) and 0.0 (for ctx-1 and ctx3). In one embodiment, these are hardwired and do not need to be loaded.

In use LLU 1622 fundamentally implements the equation: $(x+L)/(M*x+N)$. This equation is used to approximate a specular lighting term. The inputs to LLU 1622 are from ALU 1614 of lighting module 54 and are the dot products used in the lighting equations. As set forth earlier, with respect to FIG. 16, there is an output FIFO 1626 between LLU 1622 and MLU 1610 which buffers coefficients until MLU 1610 needs them. In one embodiment, such FIFO 1626 might be threaded along with delays 1608 and 1624, and registers 1618 and 1620. Due to possible color material processing, it is unknown when the diffuse and specular outputs are consumed by MLU 1610.

There is specially adapted hardware for dealing with the diffuse output alpha component since lighting module 54 only deals with R,G,B components. Such specially adapted hardware is capable of outputting two types of alpha components, namely vtx colorøα[Tbuffer], and stored ctx α[Ctx store]. The choice between the foregoing alpha components is governed by mode bits 202.

In operation, LLU 1622 calculates ambient (Ca), diffuse (Cde), and specular (Cs) coefficients of lighting. These coefficients are then multiplied with the ambient, diffuse, and specular colors to generate a light's contribution to the vertex color. Table 16A includes a list of inputs received by LLU 1622 and the calculations carried out to generate the ambient (Ca), diffuse (Cde), and specular (Cs) coefficients of lighting. It should be noted that any desired hardware configuration might be employed to implement LLU 1622. In one embodiment, the specific configuration shown in FIG. 20 might be employed.

TABLE 16A

Input definitions:
- n = normal vector (from transform engine)
- e = normalized eye vector (from transform engine)
- l = normalized light vector (from transform engine)
- s = spotlight vector*light vector (from transform engine)
- D = distance vector (1,d,d*d) (from transform engine)
- h = half angle vector (from lighting engine)
- K = attenuation constant vector (K0,K1,K2) (from context memory)

The LLU might receive the following scalar data in carrying out its calculations:
- n*l (from MLU/ALU)
- n*h (from MLU/ALU)
- K*D (from MLU/ALU)
- s (from transform engine)
- power0 (material exponent from ctx0–3 memory)
- power1 (spotlight exponent from ctx0–3 memory)
- range (from ctx0–3 memory)
- cutoff (from ctx0–3 memory)

Infinite Light
LLU Calculations:
  Ca = 1.0
  Cd = n*l
  Cs = (n*h)^power0

Local Light
LLU Calculations:
  att = 1.0/(K*D)
  Ca = att
  Cd = att*(n*l)
  Cs = att*((n*h)^power0)

Spot Light
LLU Calculations:
  att = (s^power1)/(K*D)
  Ca = att
  Cd = att*(n*l)
  Cs = att*((n*h)^power0)

As set forth above, the mode bits controlling the vertex sequencer might not necessarily be changed by the vertex data itself or by any results derived from vertex data. To allow vertex data to modify vertex processing, LLU 1622 employs a flag register 1623 is provided. Setting bits to TRUE in this flag register allows clamping to 0.0 of calculation results if a flag is specified in the output control of the calculation. Another use of the flag register 1623 would be in setting a write mask for register writes.

The flag register 1623 is provided in LLU 1622 for performing the if/then/else clamping to 0.0 in the lighting equations at no performance penalty. The sign bit of various operands might set the flags. Table 16B illustrates the manner in which the flags in flag register 1623 are set and the resulting clamping.

TABLE 16B

Infinite Light
LLU Calculations:

Dflag = sign bit of (n*l)
  Sflag = sign bit of (n*h)

TABLE 16B-continued

Clamp:

Ca = (0           ) ? 0 : Ca;
  Cd = (Dflag       ) ? 0 : Cd;
  Cs = (Dflag | Sflag) ? 0 : Cs;

Local Light
LLU Calculations:

Rflag = sign bit of (range-d)
  Dflag = sign bit of (n*l)
  Sflag = sign bit of (n*h)

Clamp:

Ca = (Rflag              ) ? 0 : Ca;
  Cd = (Rflag | Dflag      ) ? 0 : Cd;
  Cs = (Rflag | Dflag | Sflag) ? 0 : Cs;

Spot Light
LLU Calculations:

Cflag = sign bit of (s-cutoff)
  Rflag = sign bit of (range-d)
  Dflag = sign bit of (n*l)
  Sflag = sign bit of (n*h)

Clamp:

Ca = (Cflag | Rflag                ) ? 0 : Ca;
  Cd = (Cflag | Rflag | Dflag        ) ? 0 : Cd;
  Cs = (Cflag | Rflag | Dflag | Sflag) ? 0 : Cs;

FIG. 21 is an illustration of the organization of the flag register 1623 associated with lighting module 54 of FIG. 16 in accordance with one embodiment of the present invention. The flag register 1623 contains 8 one bit flags and are set by the sign bit of the ALU (IFLAG) or MAC0 (MFLAG) outputs.

When LLU 1622 outputs a scalar value to MLU 1610 where it gets smeared into a tri-word, it specifies a mask for the flag register. If the register & mask is true, 0.0 replaces the output. Table 17 illustrates the various flags of FIG. 21 to be used in outputting ambient, diffuse, and specular attributes.

TABLE 17

| | |
|---|---|
| Ambient Mask: | C,R, U |
| Diffuse Mask: | D, C,R, U |
| Specular Mask: | D,S,C,R,T,U |

The approximation used for the specular term can go negative where the actual cos (theta)n would go to 0.0. As a result, it is necessary to perform a clamping operation. For this, the T, U flags are used. Table 18 illustrates various operations of which a functional logic unit (FLU) 1621 of LLU 1622 is capable. Note FIG. 20**.

TABLE 18

| | | |
|---|---|---|
| ZFLU_INV | o = 1/a | (mantissa accuracy - 12 bits) |
| ZFLU_ISQ | o = 1/sqrt(a) | (mantissa accuracy - 6 bits) |
| ZFLU_PASS | o = a | |
| ZFLU_PASS1 | o = 1.0 | |
| ZFLU_MIN1 | o = (a < 1.0) ? a : 1.0 | |
| ZFLU_NOP | o = 0.0 | |

FIG. 22 is an illustration of the micro-code fields associated with lighting module 54 of FIG. 16 in accordance with one embodiment of the present invention. As shown, the micro-code of lighting module 54 is arranged into 33 fields making up a total width of 85 bits. Fields are delayed to match the data flow of the units. The MLU operations are done at a delay of zero, ALU operations are done at a delay of one, and RLU, LLU output operations are done at a delay of two. Each delay is equivalent to three cycles.

Figure 23:
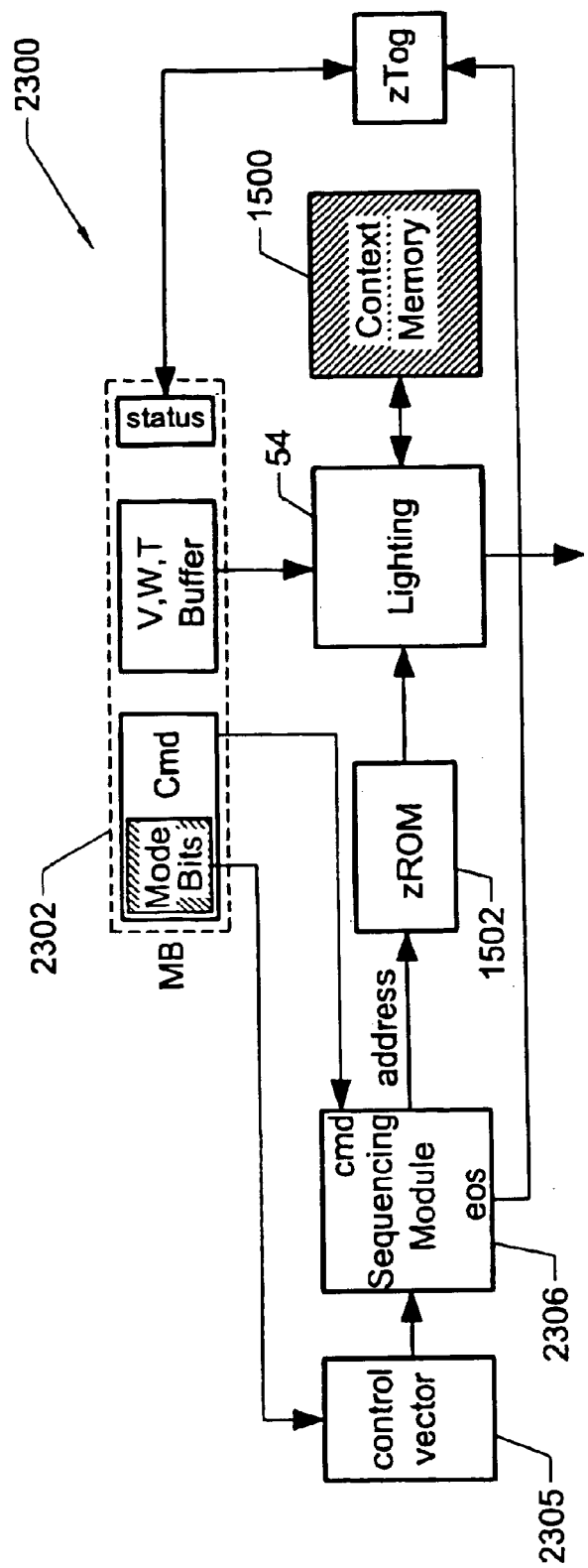
FIG. 23 is a schematic diagram of the sequencer associated with the lighting module of FIG. 16 in accordance with one embodiment of the present invention.

FIG. 23 is a schematic diagram of sequencer 2300 associated with lighting module 54 of FIG. 16 in accordance with one embodiment of the present invention. As shown, sequencer 2300 of lighting module 54 includes an input buffer 2302 adapted for receiving mode bits 202 which are indicative of the status of a plurality of modes of process operations. Also included is memory 1502 capable of storing code segments that each are adapted to carry out the process operations in accordance with the status of the modes.

A sequencing module 2306 is coupled between memory 1502 and buffer 2302 for identifying a plurality of addresses in memory 1502 based on a control vector 2305 derived from the mode bits. The sequencing module 2306 is further adapted for accessing the addresses in memory 1502 for retrieving the code segments that might be used to operate lighting module 54.

The sequencer 2300 of lighting module 54 is similar to that of transform module 52. In operation, sequencer 2300 of lighting module 54 steps through a threaded control vector that is derived from threaded mode bits 202 and executes every ROM address whose corresponding control vector bit is set to "1". The control vector has the same number of bits as the ROM has words. The sequencer 2300 can step through an arbitrary control vector at the rate of a single "1" or enabled bit per a predetermined number of cycles for every thread. Commands that do not use mode bits 202 are executed by on-the-fly micro-code generation. The main difference between sequencer 2300 of lighting module 54 and sequencer 1200 of transform module 52 is that sequencer 2300 of lighting module 54 can loop back and execute the lighting code up to eight times.

The sequencer 2300 of lighting module 54 has a light counter that starts at zero for each new vertex and increments by one at the end of the micro-code sequence. If the LIS field of mode bits 202 contains a "1" in the matching bit field, sequencer 2300 goes back and starts over at the beginning of the lighting micro-code block. This continues until a zero is found in the LIS field or eight lights have been done. Color accumulation is done by incrementing (per light) the ALU registers that store the diffuse and specular color. Automatic memory address indexing is done using the light counter to fetch the correct parameters for each light.

Figure 24:
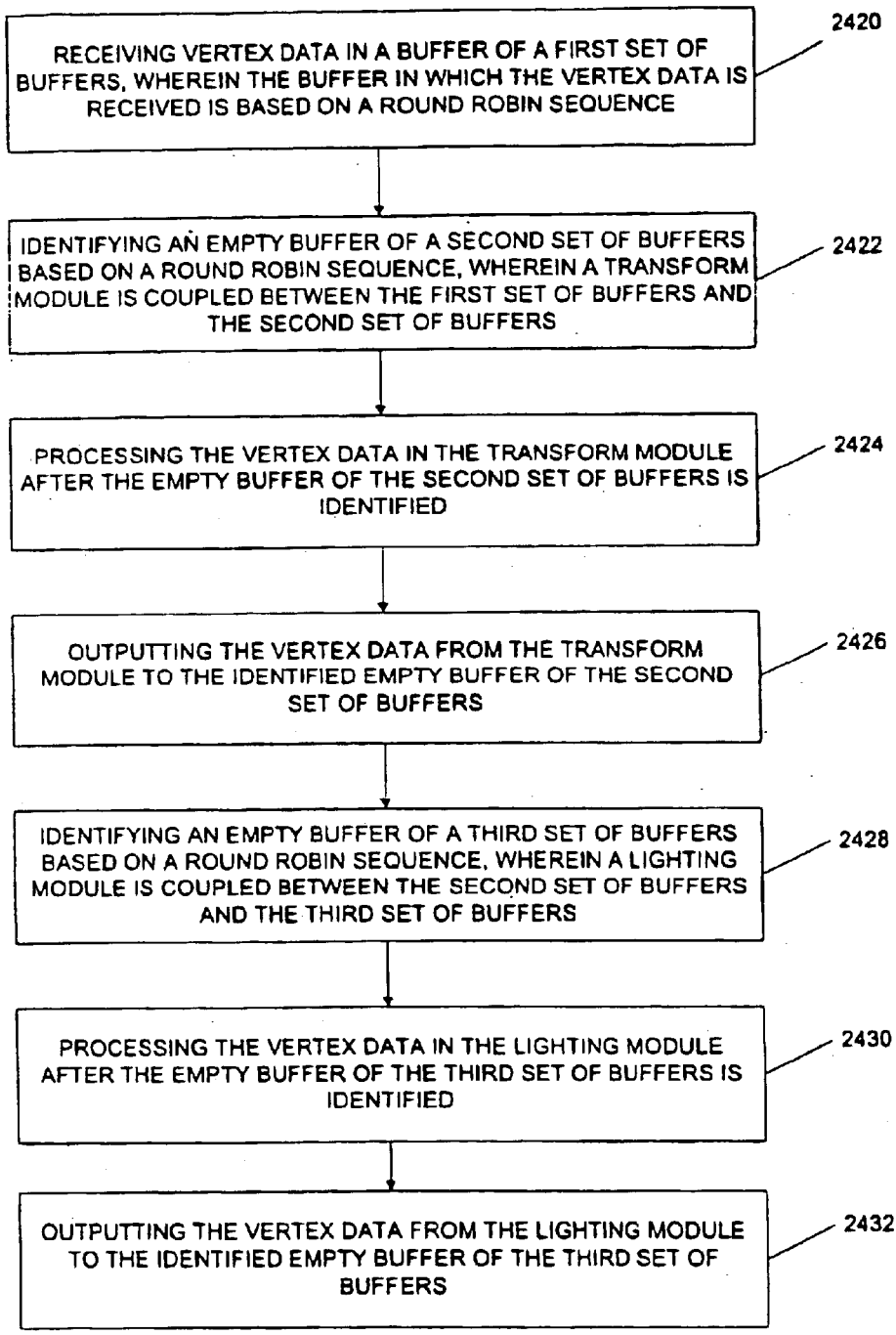
FIG. 24 is a flowchart delineating the manner in which the sequencers of the transform and lighting modules are capable of controlling the input and output of the associated buffers in accordance with one embodiment of the present invention.

FIG. 24 is a flowchart delineating the method by which the sequencers of the transform and lighting modules 52 and 54 are capable of controlling the input and output of the associated buffers in accordance with one embodiment of the present invention. As shown, vertex data is initially received in a buffer of a first set of buffers in operation 2420. The buffer in which the vertex data is received is based on a round robin sequence.

Subsequently, in operation 2422, an empty buffer of a second set of buffers is identified also based on a round robin sequence. The transform module 52 is coupled between the first set of buffers and the second set of buffers. When the empty buffer of the second set of buffers is identified, the vertex data is processed in transform module and outputted from transform module to the identified empty buffer of the second set of buffers. Note operations 2424 and 2426.

Similarly, an empty buffer of a third set of buffers, or slots or spaces in memory, are identified based on a round robin sequence in operation 2428. The lighting module 54 is coupled between the second set of buffers and the third set of buffers. When the empty buffer of the third set of buffers is identified, the vertex data is processed in the lighting module, as indicated in operation 2430. The vertex data is subsequently outputted from lighting module 52 to the identified empty buffer of the third set of buffers. See operation 2432. It should be noted that the number of buffers, or slots in memory, is flexible and might be changed.

Figure 25:
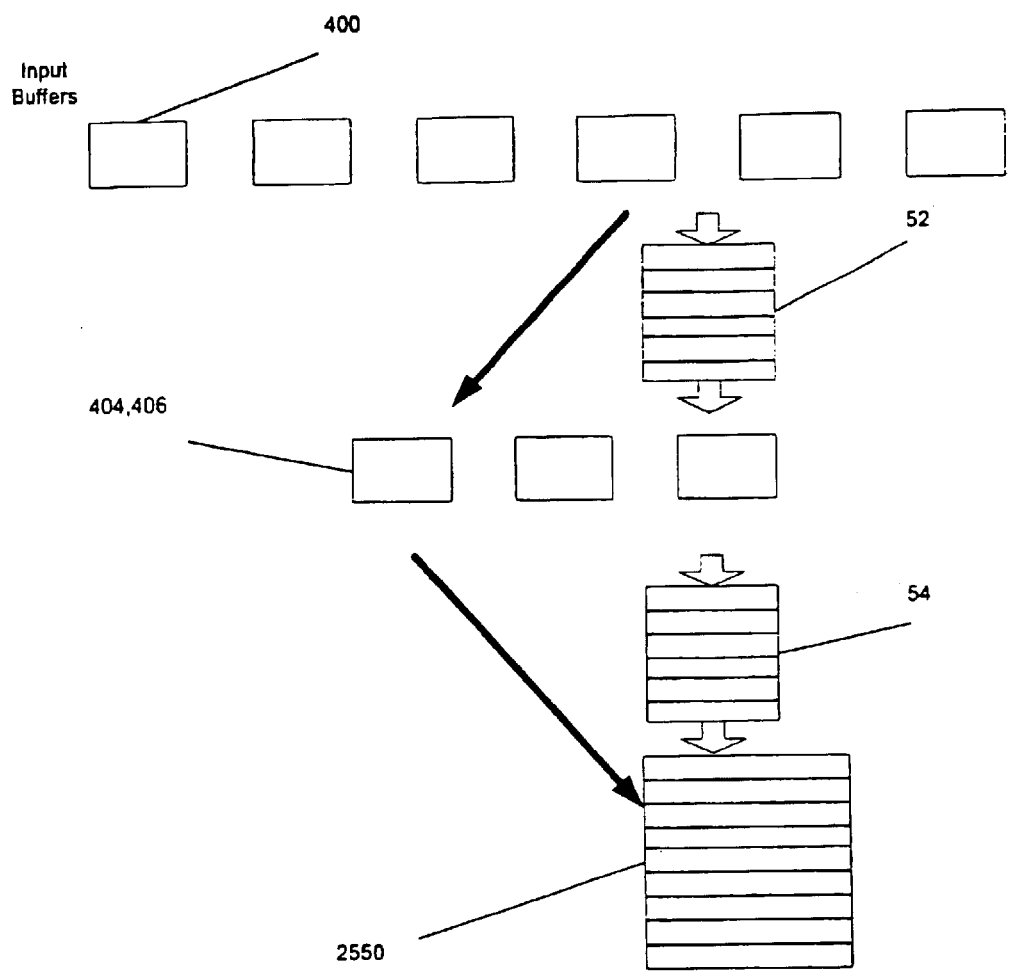
FIG. 25 is a diagram illustrating the manner in which the sequencers of the transform and lighting modules are capable of controlling the input and output of the associated buffers in accordance with the method of FIG. 24.

FIG. 25 is a diagram illustrating the method by which the sequencers of the transform and lighting modules 52 and 54 are capable of controlling the input and output of the associated buffers in accordance with the method of FIG. 24. As shown, the first set of buffers, or input buffers 400, feed transform module 52 which in turn feed the second set of buffers, or intermediate buffers 404, 406. The second set of buffers 404, 406 feed lighting module 54 that drains to memory 2550.

In order carry out the method set forth in FIG. 25, the slots of memory 2550 and the buffers of the first and second set are each assigned a unique identifier upon initially receiving vertex data. Further, a current state of each buffer is tracked. Such state might include an allocated state, a valid state, an active state, or a done state.

The allocated state indicates that a buffer/slot is already allocated to receive an output of the previous graphics-processing module, i.e. transform module or lighting module. When a write pointer is scanning the buffers/slots in the round robin sequence, a buffer/slot in the allocated state cause such write pointer to increment to the next buffer or slot.

If a buffer/slot is in the valid state, the buffer/slot is available for receiving vertex data. On the other hand, the active state indicates that a buffer/slot is currently in an execution state, or receiving vertex data. This active status is maintained until a thread is done after which a read pointer increments, thus placing the buffer/slot back in the valid state. It should be noted that the first set of buffers 400 are only capable of being in the valid state since there is no previous graphics-processing module to allocate them.

An example of a sequence of states will now be set forth. Upon receiving vertex data in one of the first set of buffers 400 and a new set of command bits 200, such buffer is placed in the valid state, after which one of the second set of buffers 402, 404 is placed in the allocated state in anticipation of the output of transform module 52.

If none of the second set of buffers 404, 406 is available for allocation, the vertex data in the buffer of the first set 400 can not be processed. Further, a check might be done to determine whether the code segments to be executed will interfere with any other code segments that are to be simultaneously run. If so, the vertex data in the buffer of the first set 400 will not be processed and a stall condition initiated.

After one of the second set of buffers 404, 406 is placed in the allocated state, the buffer of the first set 400 is placed in the active state. When transform module 52 is finished execution, the buffer of the second set 404, 406 is read and then placed in the valid state. These state changes are similarly executed during the transfer of vertex data between the second set 404, 406 and the slots of memory 2550.

Figure 25A:
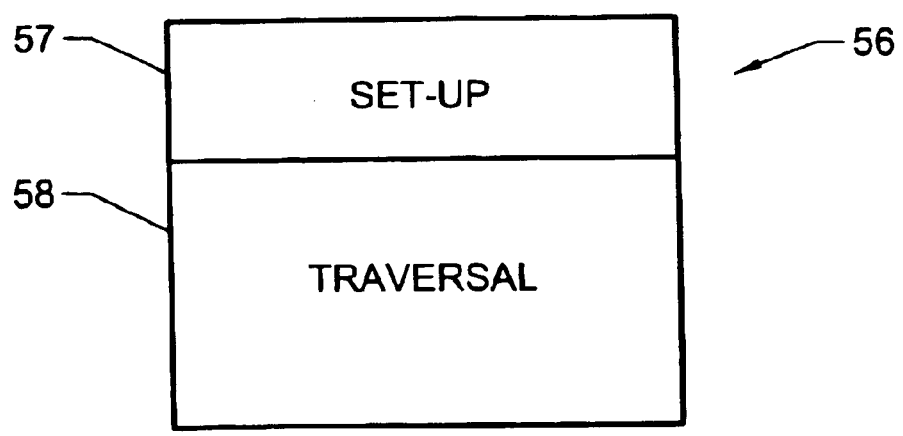
FIG. 25A is a schematic diagram of the various modules of the rasterizer of FIG. 1B.

FIG. 25A illustrates the rasterizer module 56 that comprises a set-up module 57 and a traversal module 58. The rasterizer module 56 is adapted for performing area-based rasterization in an alternating manner. In particular, a plurality of polygon-defining sense points are positioned on or near the primitive after which line equations are evaluated at the points to determine which pixels reside in the primitive. During operation, this evaluation is repeated as the points are moved in an alternating manner for efficiency purposes. Further, the rasterizer module 56 might be adapted to operate without any clipping procedure.

Figure 26:
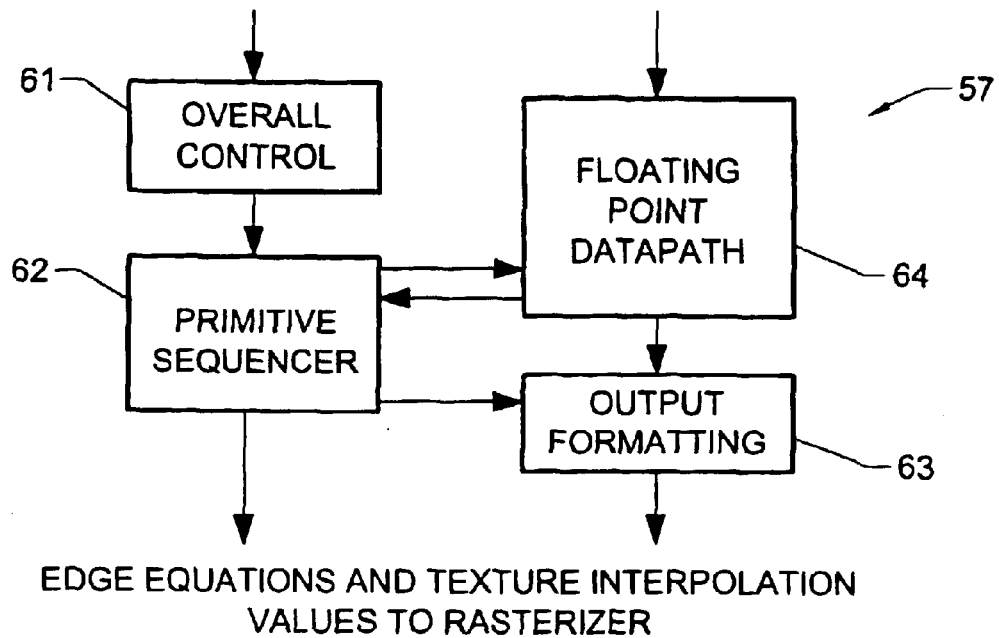
FIG. 26 illustrates a schematic of the set-up module of the rasterization module of the present invention.

FIG. 26 illustrates a schematic of the set-up module 57 of rasterization module 56. As shown, the set-up module 57 includes a control section 61 that handles routing data and control signals to their appropriate functional units in order to perform the desired floating-point calculations. The primitive sequencer 62 handles turning sequences of vertices into triangles, lines or points. Further, floating point data path section 64 includes the multiplexers and floating point computation units that perform the math required in the set-up unit.

With continuing reference to FIG. 26, output formatting section 63 handles converting the internal floating point format of edge slopes and edge values into integer formats suitable for the rasterizer since the rasterizer operates only with integer values. Of course, in alternate embodiments, the rasterizer might use a floating point thus obviating the need for output formatting section 63.

In operation, output formatting section 63 executes a block floating point conversion. As is well known, with a given number, i.e. 2.34 $e^{10}$, floating point format tracks a mantissa (2.34) and an exponent (10) thereof. Block floating point conversion essentially manipulates the decimal place of the mantissas of incoming data such that the exponents are the same. To this end, the exponent need not be handled in rasterizer module 56.

Figure 26A:
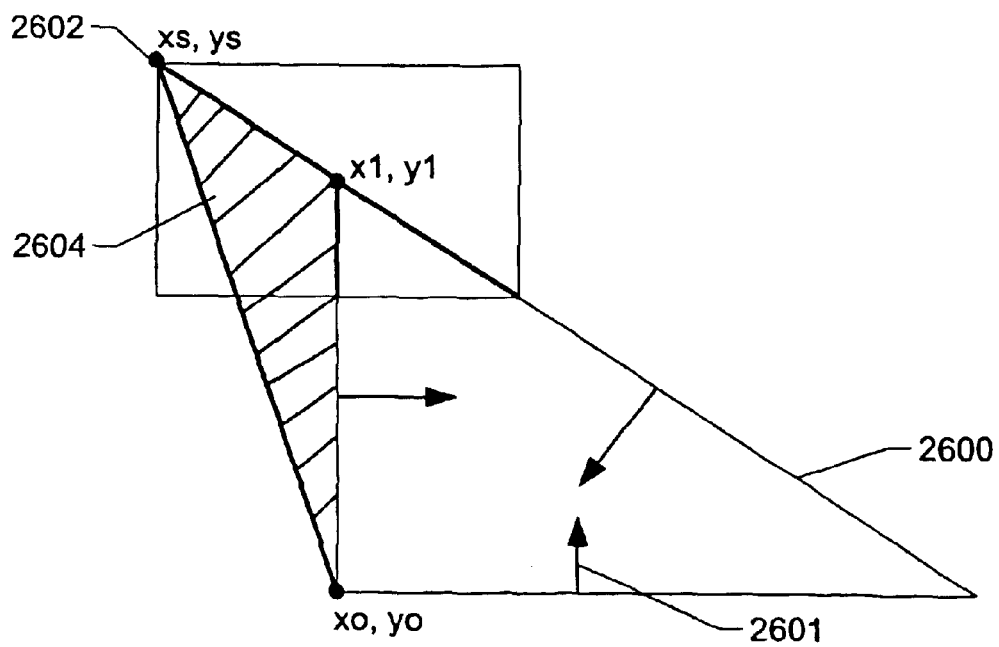
FIG. 26A is an illustration showing the various parameters calculated by the set-up module of the rasterizer of FIG. 26.

FIG. 26A is an illustration showing the various parameters calculated by set-up module 57 of rasterizer module 56 of FIG. 25A. Such parameters are required for rasterizer module 56 to perform the associated functions. Upon receipt of a primitive 2600, set-up module 57 calculates three values including slopes 2601 of the primitive 2600, a starting position 2602 and a starting value 2604.

The slopes 2601 are used to generate coefficients for line equations of the edges of the primitive 2600 to be used during rasterization. The slopes 2601 might, for example, be calculated by using equations #4 and #5 shown below.

$$slope_A = Y_0 - Y_1$$

$$slope_B = x_1 - x_0 \qquad \text{Equations \#4 and \#5}$$

where $y_0, y_1$ and $x_0, x_1$ are coordinates of vertices shown in FIG. 26A.

It should be noted that the slopes might also be calculated using the coordinates of the vertices by employing a simple rotation operation or the like.

The starting position 2602 indicates a starting point for area rasterization that will be set forth hereinafter in greater detail. The starting value 2604 is equal to the area of the shaded triangle shown in FIG. 26A and is also used during the area-based rasterization process. Such starting value 2604 is selected so that stepping the raster position about the screen while adding the slope at each step will equal zero exactly when the raster position is on the edge. Calculation of the starting value 2604 might be accomplished using Equation #6 below:

$$starting\_value = slope_A*(x_s-x_0) + slope_B*(y_s-y_0) \qquad \text{Equation \#6}$$

where $x_s, y_s$ = starting position 2602

$slope_A, slope_B$ = slopes of one of the edges based on coordinates of vertices shown in FIG. 26A $x_0, y_0$ = coordinates of one of the vertices of the edges shown in FIG. 26A It should be understood that the foregoing values might also be calculated for other types of primitives. For example, in the case of a line, an extra slope must be calculated for the four-sided bounding box. Such slope can be easily calculated by taking the reciprocal of the slope of an opposite side of the bounding box. In addition to the extra slope calculation, it is noted that another starting value needs to be calculated in the case of the line primitive.

Figure 27:
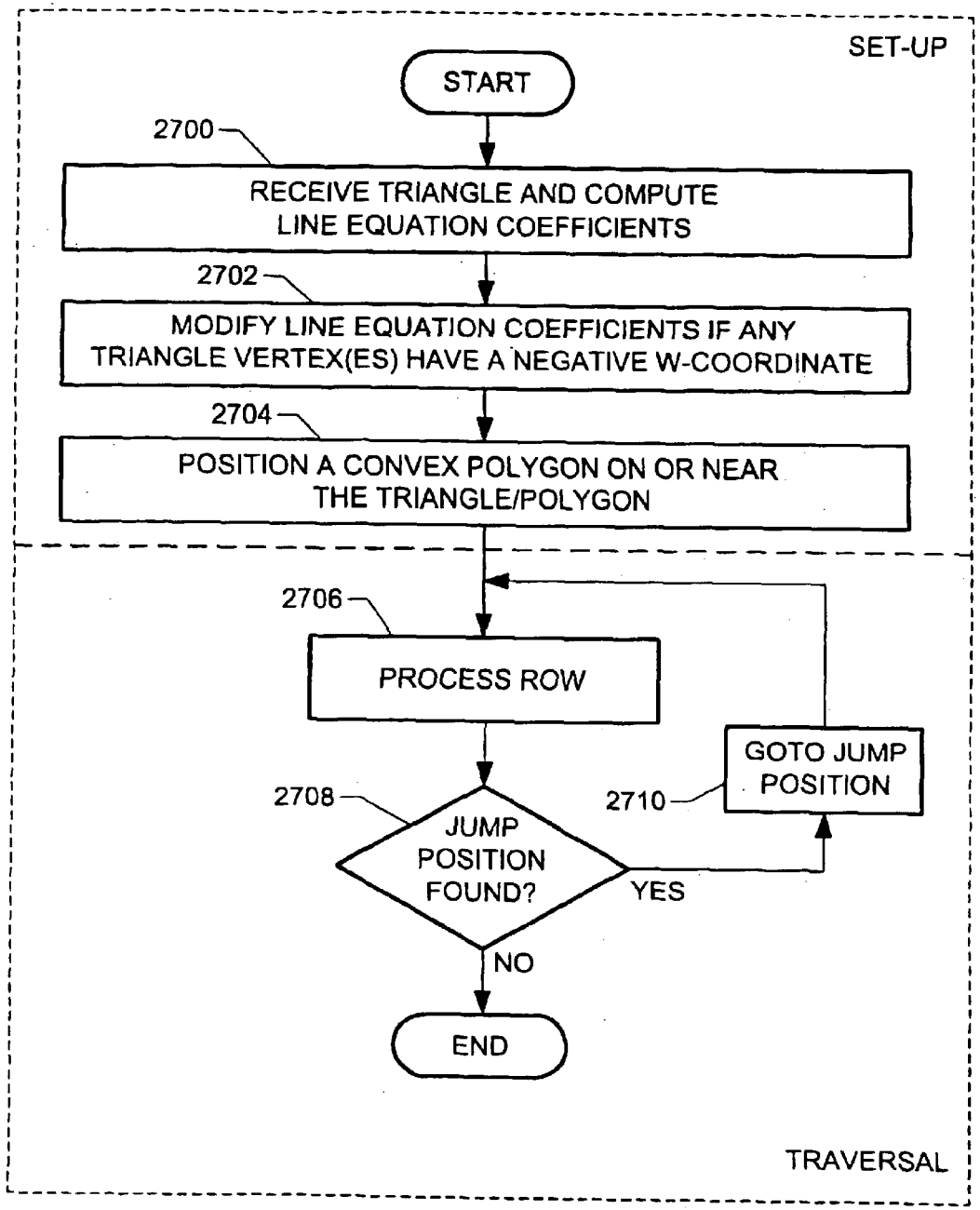
FIG. 27 is a flowchart illustrating a method of the present invention associated with the set-up and traversal modules of the rasterizer component shown in FIG. 26.

FIG. 27 illustrates the method by which rasterizer module 56 handles one of a plurality of primitives, e.g. triangles. In particular, an initial operation is first performed by set-up module 57 of rasterizer module 56. Upon receipt of a primitive, line equation coefficients of line equations are determined for lines that define the primitive in operation 2700 using slopes 2601 of FIG. 26A in a manner that is well known to those with ordinary skill in the art. As is well known, three line equations are required to define a triangle. On the other hand, a primitive such as a line is drawn as a rectangle or parallelogram with four sides and four line equations.

Thereafter, in operation 2702, the line equation coefficients are modified if any primitive vertex(es) has a negative W-coordinate. Additional information regarding this process will be set forth hereinafter in greater detail with reference to FIG. 32.

It should be noted that set-up module 57 of rasterizer module 56 also computes a bounding box of the primitive. For most triangles, the bounding box includes the minimum and maximum values of the three vertexes. For lines, the four parallelogram corners of the bounding box are calculated. For triangles or lines that have a vertex with a negative W-coordinate, an area that is to be drawn extends beyond the convex hull of the vertices.

One of the commands of OpenGL® is a scissor rectangle which defines a boundary outside of which is not to be drawn. The set-up module 57 of rasterizer module 56 calculates the intersection of the bounding box and the scissor rectangle. Since the scissor rectangle is a rectangle, four additional line equations are afforded. It should be noted that the line equations associated with the scissor rectangle have a trivial form, i.e. horizontal or vertical.

Furthermore, in 3-D space, the near plane and far plane are parallel and at right angles to the line of sight. In the case of the primitive being a triangle, three vertexes are included which define a plane that might have any orientation. The intersections of the plane of the primitive and the near and far planes include two lines with two associated line equations.

Accordingly, each primitive has a total of nine or ten line equations depending on whether it takes the form of a triangle or a line, respectively. Again, in the case of the triangle, such line equations include the three line equations which define the triangle, the four line equations defining the bounding box and the two line equations which define the intersections of the plane in which the primitive resides, and near and far planes.

Figure 27A:
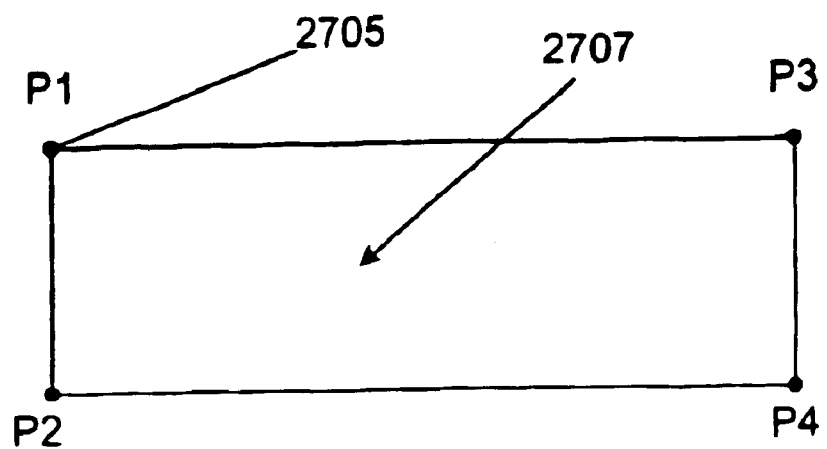
FIG. 27A illustrates sense points that enclose a convex region that is moved to identify an area in a primitive in accordance with one embodiment of the present invention.

With continuing reference to FIG. 27, the process progresses in operation 2704 by positioning a plurality of points on or near the primitive. The starting position 2602 dictates such positioning, as shown in FIG. 26A. Such points define an enclosed convex region and reside at corners of the convex region. FIG. 27A illustrates such sense points 2705 that enclose convex region 2707, e.g. a rectangle. In one embodiment, such rectangle might be 8×2 pixels in size. Further, the points might be initially positioned to enclose a top vertex of the primitive. As an option, this might be accomplished using truncation.

Once the primitive is positioned, the process is continued by traversal module 58 which begins in operation 2706 by processing rows of the primitive in a manner set forth below.

After the processing of each row, it is determined whether a jump position has been found in decision 2708. A jump position is a starting position for processing the next row and will be described hereinafter in greater detail. If it is determined in decision 2708 that a jump position has been found, the sense points that define the convex region are moved thereto in operation 2710. If, however, it is determined that a jump position has not been found, the process is ended. It should be noted that, in an alternate embodiment, columns, diagonals or any other type of string might be processed in operation 2706 instead of rows.

Figures 1, 28:
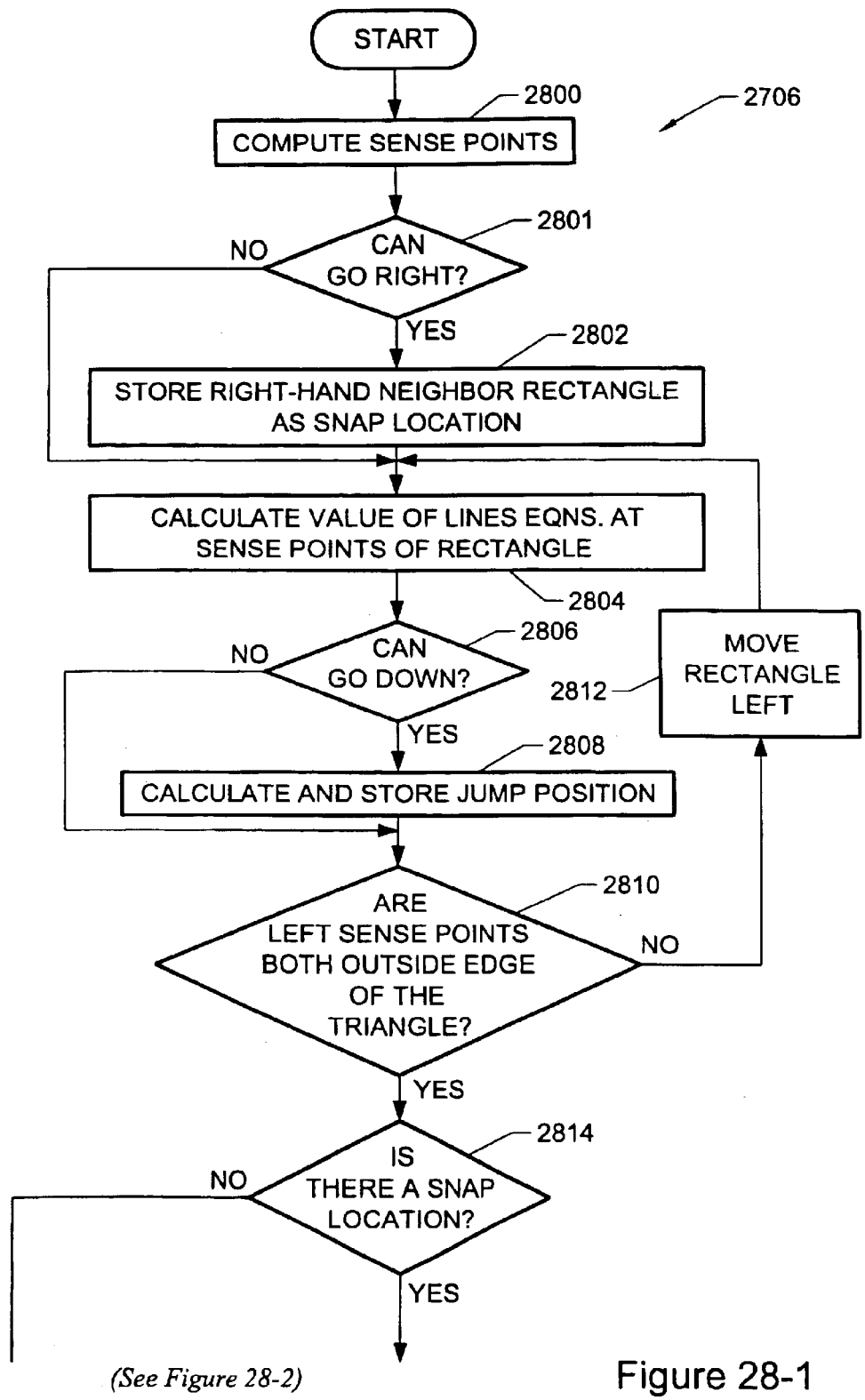
FIG. 28 is a flowchart illustrating a process of the present invention associated with the process row operation 2706 of FIG. 27.
Figures 2, 28:
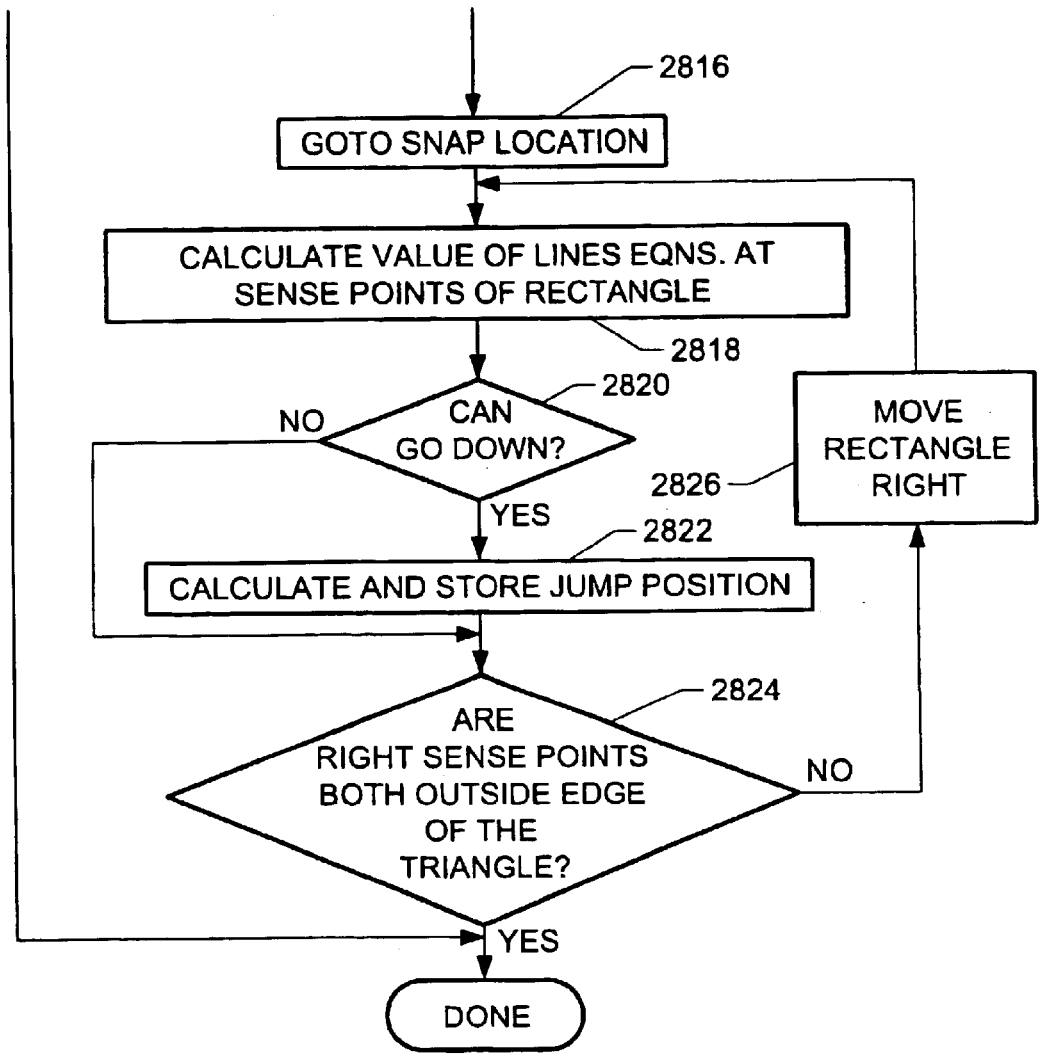

FIG. 28 is a flowchart illustrating a process of the present invention associated with the process row operation 2706 of FIG. 27. As shown, the process begins by computing the sense points in operation 2800 in order to determine whether the polygon-defining sense points might be moved right in decision 2801. Such decision is made based on the position of the rightmost sense points. If the rightmost sense points are not positioned outside the same edge or edges of the primitive, rightward movement is permitted and a position (X and Y coordinates) to the right of the current position is stored as a snap location in operation 2802. If, however, both rightmost sense points are positioned outside one or more edges of the primitive, rightward movement is not permitted and operation 2802 is skipped.

Next, the line equations are evaluated at the points of the convex region, e.g. rectangle, in operation 2804. The evaluation includes determining if the points reside in the primitive. Such determination as to whether the points reside in the primitive might include determining whether the evaluation of each of the line equations renders a positive value or a negative value at each of the sense points.

The line equations can be formulated to be positive inside the primitive and negative outside. Inclusive edges, for which pixels that lie exactly on the edge should be drawn, evaluate to zero and might be treated as positive. Exclusive edges, which should not be drawn, can be made negative by initially subtracting a value of one from the starting line equation value. Thus pixels on exclusive edges evaluate to a negative value (−1) instead of a positive zero. This permits the sense point interpretation to ignore the inclusive/ exclusive policy and just test the line equation sign.

After the line equations are evaluated at the points, it is determined whether a current position of the sense points constitutes a jump position in decision 2806. It should be noted that a jump position is stored only if the two bottom sense points are not both outside an edge. If it is determined in decision 2806 that a jump position has been found, the jump position is calculated and stored (or replaces a previously stored jump position if existent) in operation 2808. If not, however, operation 2808 is skipped.

With continuing reference to FIG. 28, it is then determined in decision 2810 whether leftmost sense points are both outside an edge of the primitive. Again, this process entails determining whether the evaluation of the line equations at both of the leftmost sense points renders positive or negative values. In particular, upon computation of the coefficients of the nine or ten edge equations at the pertinent sense points, nine or ten values are rendered that have nine or ten sign bits. To determine if the current side is completely outside any edge, for example, the present invention AND's the ten sign bits from the two sense points together. If any bit(s) survive, then both points are outside that edge.

If it is determined that the leftmost sense points are not both outside an edge of the primitive, it is concluded that there still remains further portions of the primitive to be considered in the leftward direction, and the sense points are moved left in operation 2812. If it is determined in decision 2810 that both leftmost sense points are indeed outside the edge of the primitive, it is concluded that there no longer remains further portions of the primitive to be considered in the leftward direction. Next, in decision 2814, it is determined whether there is a snap location that resulted from operation 2802.

If it is determined in decision 2814 that a snap location does not exist, the process is done. If, however, a snap location does exist, the sense points are moved to the snap location in operation 2816. Thereafter, operations similar to those of operations 2804–2812 are executed to map a right side of the primitive. This begins in operation 2818 by the line equations being evaluated at the points of the convex region.

After the line equations are evaluated at the points, it is determined whether a current position of the sense points constitutes a jump position in decision 2820. If it is determined in decision 2806 that a jump position has been found, the jump position is calculated and stored in operation 2822. If not, however, operation 2822 is skipped.

With continuing reference to FIG. 28, it is then determined in decision 2824 whether rightmost sense points are both outside an edge of the primitive. If it is determined that the rightmost sense points are not both outside an edge of the primitive, it is concluded that there still remains further portions of the primitive in the rightward direction to be considered, and the sense points are moved right in operation 2826. If it is determined in decision 2824 that both rightmost sense points are outside the edge of the primitive, it is concluded that there no longer remains further portions of the primitive to be considered in the rightward direction, and the instant process is done.

Figure 28A:
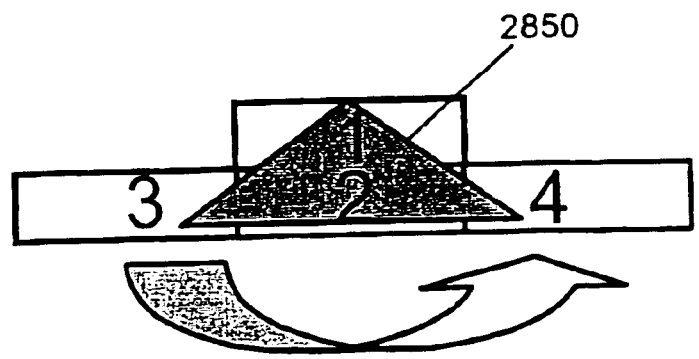
FIG. 28A is an illustration of the sequence in which the convex region of the present invention is moved about the primitive.
Figure 28B:
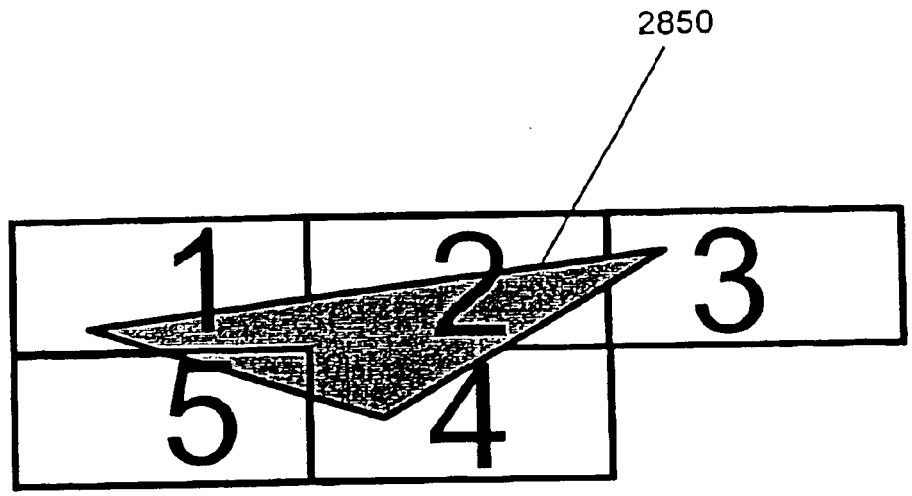
FIG. 28B illustrates another example of the sequence in which the convex region of the present invention is moved about the primitive.

FIGS. 28A and 28B are illustrations of the sequence in which the sense points of the present invention might be moved about the primitive 2850. It should be noted that various alterations might include determining whether the points can go left in decision 2800 and proceeding right initially. Further, the line equations might be defined to indicate whether the points are inside or outside the primitive in any desired way.

To avoid stepping in a repeating loop, the present invention thus employs an overall direction of movement during rasterization. The initial implementation proceeds top-down, visiting every convex region on a row before stepping down to the next. By processing rows top-down as well as never stepping right then left or left then right, loops are thus avoided.

An example of the foregoing process might be shown with reference to the polygon-defining points, P1, P2, P3 and P4 of FIG. 27A. In operation, pairs of adjacent sense points can be examined to determine whether stepping in their direction would be productive. For example, if both P3 and P4 in FIG. 27A were outside of an edge of a polygon, but P1 and/or P2 are not, then clearly the drawable inside region lies to the left, not to the right. Thus the sense points should not move right. Conversely, if both P3 and P4 are inside all the edges, then there is a drawable area just beyond P3 and P4, and stepping right is appropriate. Indeed, if P3 and P4 were not outside the same edge or edges, stepping right would be productive. This same logic applies to stepping upwards guided by P1 and P3, or stepping left guided by P1 and P2, or stepping downwards based on P2 and P4.

The foregoing process thus moves, or steps, the convex region defined by the points around the inside of the primitive, using sense points as a guide. Since the convex region defined by the points might be large, many pixels might be tested simultaneously. During use, if all sense points are inside all edges of the primitive, then all the enclosed pixels must be drawable (assuming a convex primitive). A significant advantage is afforded by testing the corners, namely the ability of proving an arbitrary area of the primitive is inside, outside or split. Only in the latter case do the individual pixels in the convex region defined by the points need to be tested. In such case, the pixels in the convex region defined by the points might be tested one-by-one or by another method in order to determine whether they reside in the primitive. Furthermore, the sense points might reduce the amount of further testing required by defining which edges(s) split the area and which do not.

Figures 1, 29:
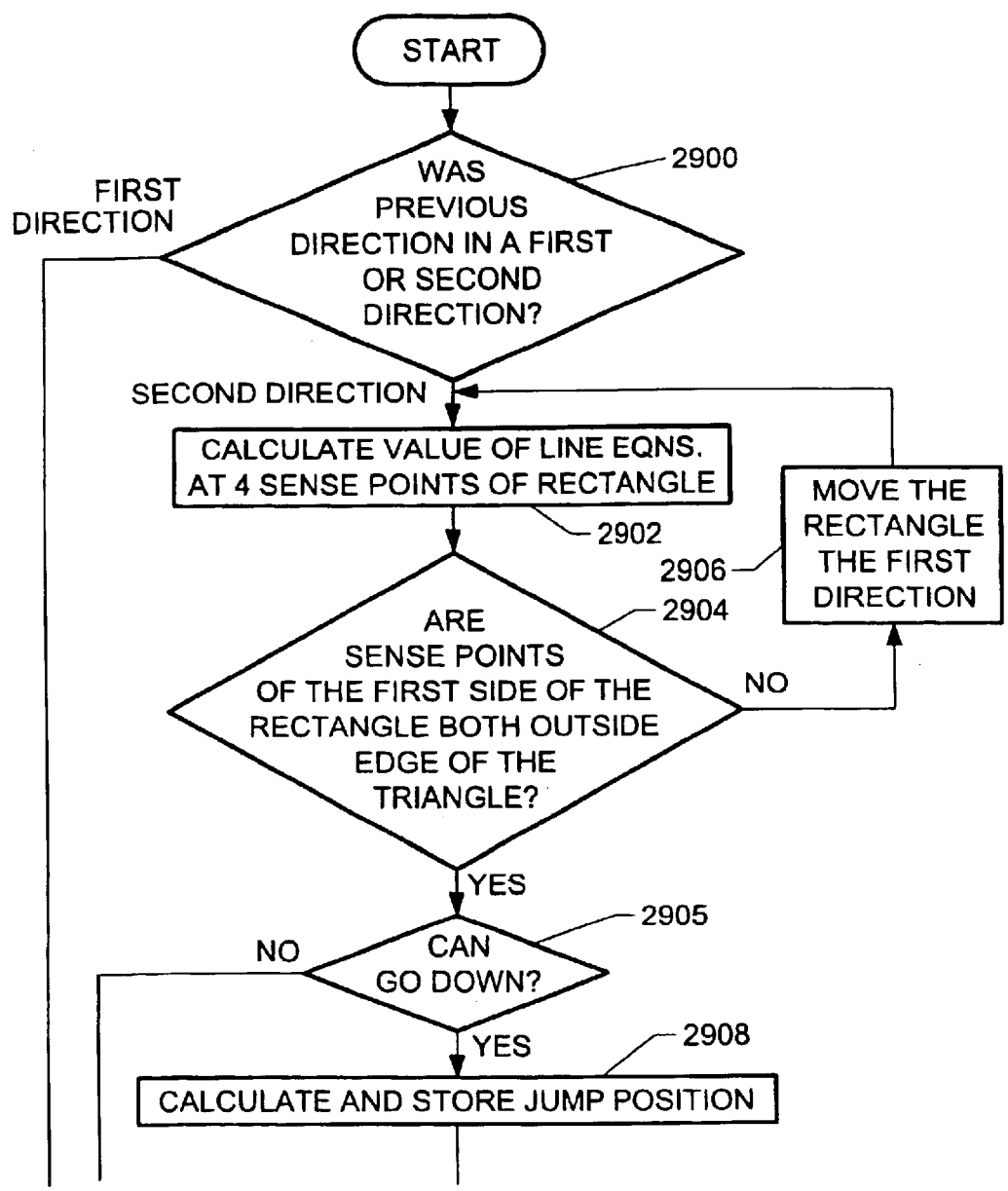
FIG. 29 is a flowchart illustrating an alternate boustrophedonic process of the present invention associated with the process row operation 2706 of FIG. 27.
Figures 2, 29:
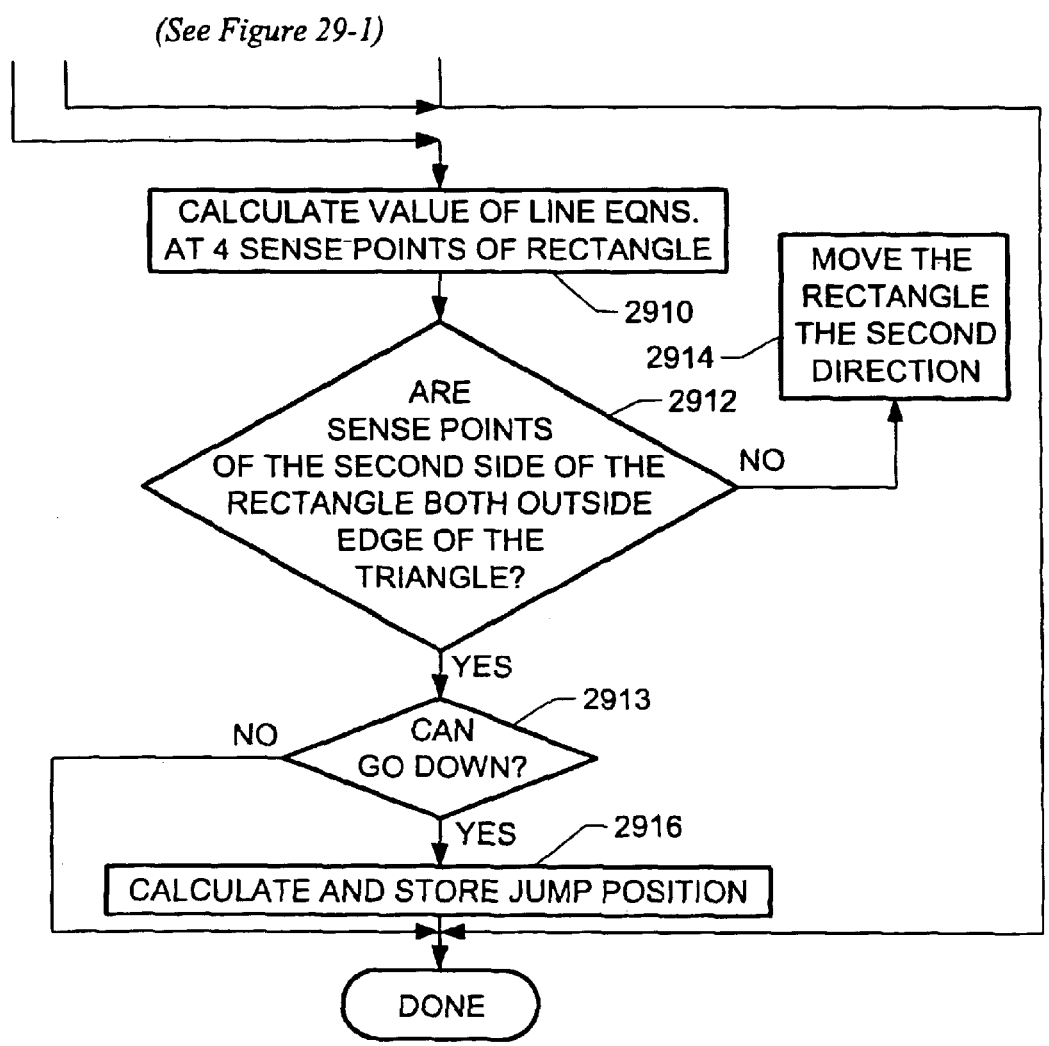

FIG. 29 is a flowchart illustrating an alternate boustrophedonic process of the present invention associated with the process row operation 2706 of FIG. 27. As shown, it is first determined in decision 2900 whether a previous movement was in a first or second direction. If there was not any actual previous movement, a default previous movement might be assumed. If it is determined in decision 2900 that the previous movement was in a second direction, the line equations are evaluated at the points of the convex region, e.g. a rectangle, in operation 2902 in a manner similar to operation 2804 of FIG. 28.

With continuing reference to FIG. 29, it is subsequently determined in decision 2904 as to whether sense points of a first side of the rectangle are both outside an edge of the primitive. If not, the sense points are moved or stepped in the first direction in operation 2906. Upon it being determined that the sense points of the first side of the rectangle are both outside an edge of the primitive, it is then determined in decision 2905 whether the points can be moved downwardly or, in other words, whether the current position constitutes a jump position. If so, a jump position is calculated and stored in operation 2908 after which the process is done.

On the other hand, if it is determined in decision 2900 that the previous movement was in a first direction, operations similar to those of operation 2902–2908 are carried out. In particular, the line equations are evaluated at the points of the convex region, e.g. a rectangle, in operation 2910. It is then determined in decision 2912 as to whether sense points of a second side of the rectangle are both outside an edge of the primitive. If not, the sense points are moved or stepped in the second direction in operation 2914. Upon it being determined that the sense points of the second side of the rectangle are both outside an edge of the primitive, it is then determined in decision 2913 whether the points can be moved downwardly or, in other words, whether the current position constitutes a jump position. If so, a jump position is calculated and stored in operation 2916 after which the process is done.

Figure 29A:
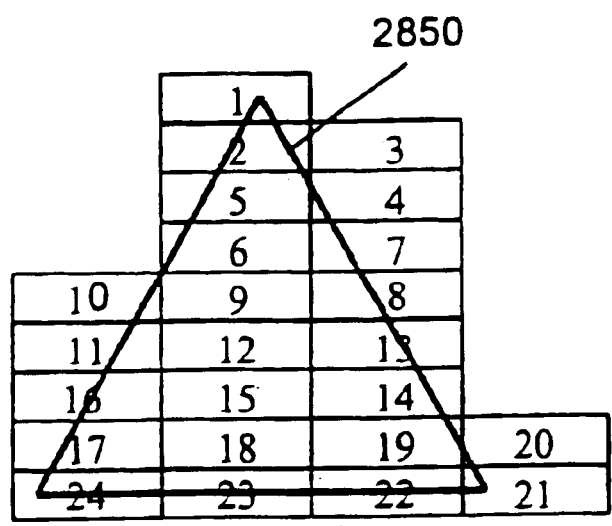
FIG. 29A is an illustration of the sequence in which the convex region of the present invention is moved about the primitive in accordance with the boustrophedonic process of FIG. 29.

FIG. 29A is an illustration of the sequence in which the sense points of the present invention are moved about the primitive in accordance with the boustrophedonic process of FIG. 29. The foregoing boustrophedonic rasterization constrains the sequence to obey certain rules that offer better performance for hardware. As shown, the boustrophedonic rasterization affords a serpentine pattern that folds back and forth. A horizontal boustrophedonic sequence, for example, might generate all the pixels within a primitive triangle that are on one row from left to right, and then generate the next row right to left, and so on. Such a folded path ensures that an average distance from a generated pixel to recently previously generated pixels is relatively small.

Generating pixels that are near recently previously generated pixels is important when recent groups of pixels and/or their corresponding texture values are kept in memories of a limited size. The boustrophedonic sequence more often finds the pixels or texture values already loaded into such memories, and therefore repeating the memory load occurs less often.

As an option, at least one boundary might be used which divides the primitive into a plurality of portions prior to rasterization. In operation, the points might be moved in each of the portions separately. Further, the points might be moved through an entirety of a first one of the portions before being moved in a second one of the portions.

Figure 30:
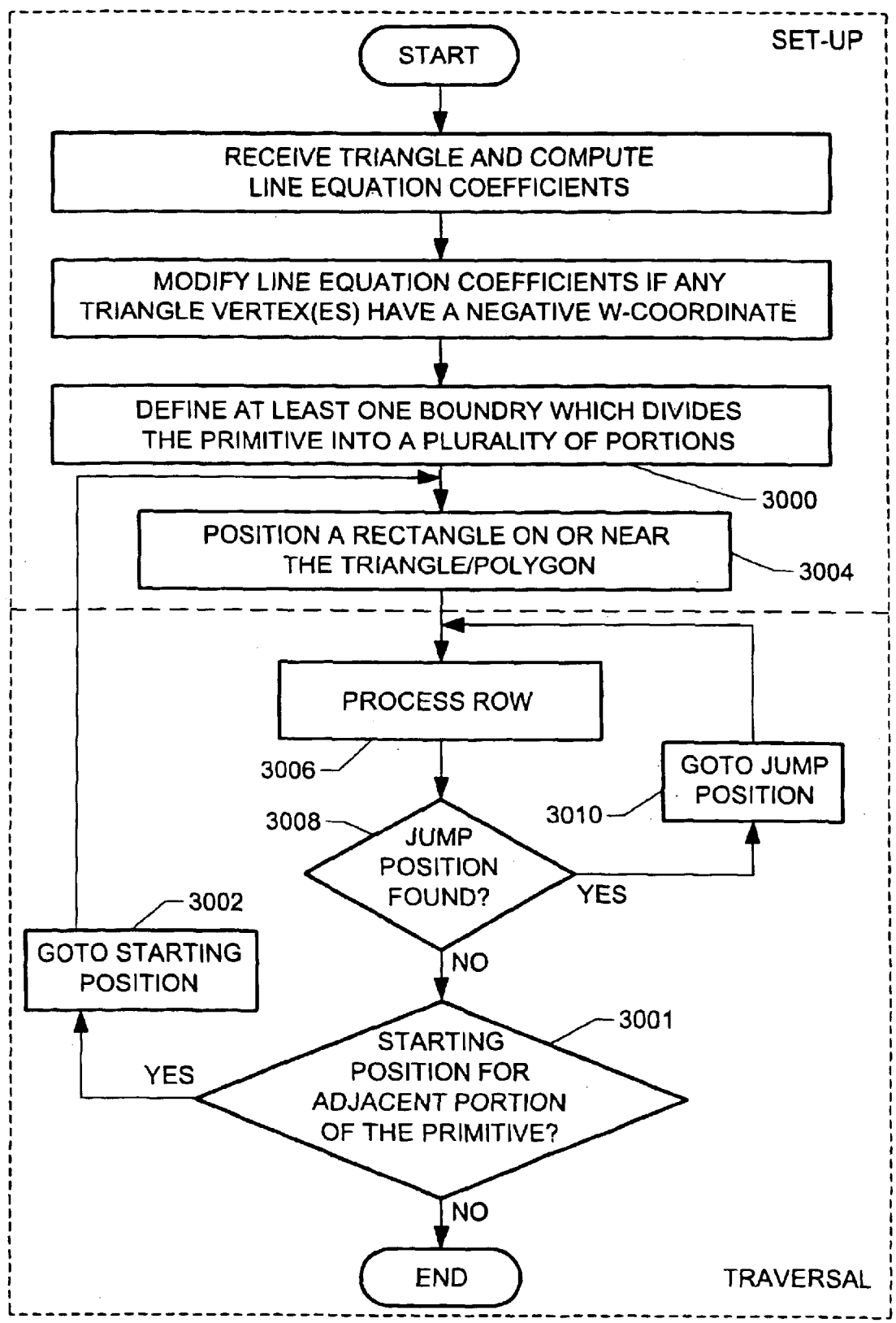
FIG. 30 is a flowchart illustrating an alternate boustrophedonic process using boundaries.

FIG. 30 is a flowchart illustrating an alternate boustrophedonic process using boundaries. As an option, the decision whether to use boundaries might be based on a size of the primitive. As shown in FIG. 30, the boustrophedonic process which handles boundaries is similar to that of FIG. 27 with the exception of an additional operation 3000 wherein at least one boundary is defined which divides the primitive into a plurality of portions or swaths.

With continuing reference to FIG. 30, an additional decision 3001 follows the completion of every portion of the primitive. In particular, it is determined in decision 3001 whether a start position of an adjacent portion was found in operation 3006. If so, the convex region defined by the sense points is moved to a start position of an adjacent portion of the primitive in operation 3002 and operations 3004–3010 are repeated for the new portion of the primitive. Further information relating to the determination of the start position in operation 3006 will be set forth in greater detail during reference to FIG. 31.

Figures 1, 31:
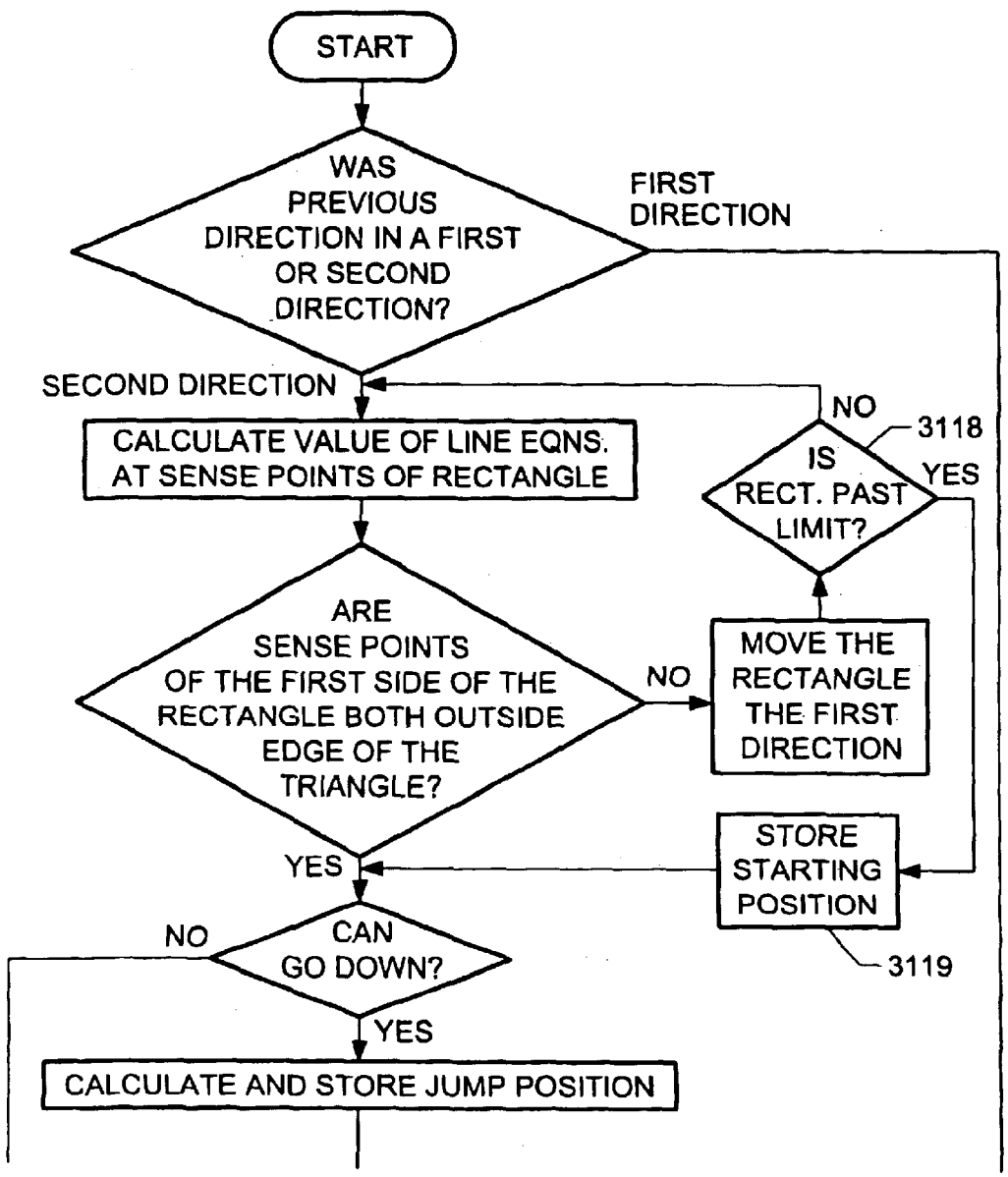
FIG. 31 is a flowchart showing the process associated with operation 3006 of FIG. 30.
Figures 2, 31:
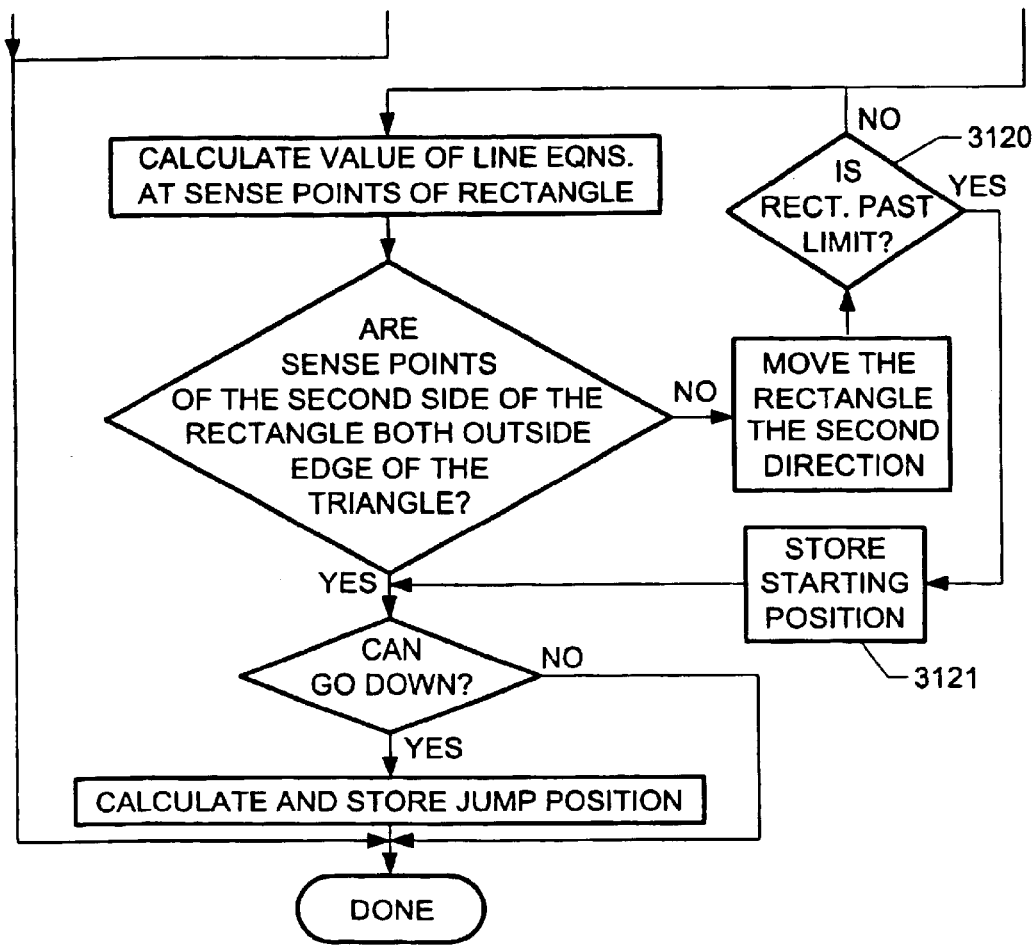
Figure 31A:
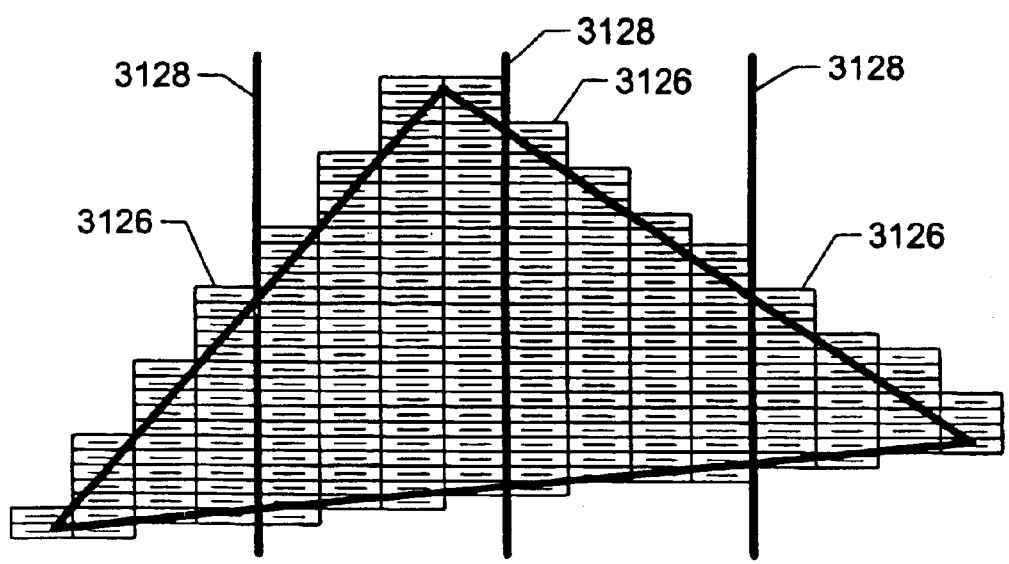
FIG. 31A is an illustration of the sequence in which the convex region of the present invention is moved about the primitive in accordance with the boundary-based boustrophedonic process of FIGS. 30 and 31.

FIG. 31A is an illustration of the process by which the convex region of the present invention is moved about the primitive in accordance with the boundary-based boustrophedonic process of FIG. 30. As shown, the first portion that is processed is that which includes the topmost vertex of the primitive. During operation, a left neighboring portion is processed after which the adjacent left neighboring portion is processed and so on. This is continued until there are no remaining left neighboring portions. Next, a neighboring portion to the right of the first portion is processed after which the adjacent right neighboring portion is processed and so on until all of the right neighboring portions are processed. It should be appreciated that other types of ordering schemes might be utilized per the desires of the user.

FIG. 31 is a flowchart showing the process associated with the process row operation 3006 of FIG. 30. Such process is similar to the boustrophedonic process of FIG. 29 with the exception of decisions 3118 through 3121. Decisions 3118 and 3120 both determine whether any of the sense points have passed any boundary. Only if it is determined that the sense points are still within the boundaries is the respective loop continued.

In operations 3119 and 3121, starting positions of adjacent portions of the primitive are sought and stored when it is determined in decisions 3118 and 3120 that any sense points of the convex region have passed any boundary, respectively. As shown in FIG. 31A, such starting positions 3126 are each defined as being the topmost point of a portion of the primitive existent beyond a boundary. By storing this position, a starting point is provided when the process is repeated for the adjacent boundary-defined portion of the primitive.

It should be noted that operations 3119 and 3121 are both performed while processing the first portion of the primitive. While not expressly shown in FIG. 31, only a first one of such operations is performed when processing portions to the left of the first portion, while only a second one of such operation is performed when processing portions to the right of the first portion. In other words, when processing portions to the left of the first portion, starting positions are only determined when a leftmost boundary of the currently processed portion has been exceeded. Similarly, when processing portions to the right of the first portion, starting positions are only determined when a rightmost boundary of the currently processed portion has been exceeded.

Using boundaries during rasterization solves a very critical problem during pipeline processing. If a primitive is very wide, the storage associated with the pixels of a single row might not fit in a limited-size memory. Rasterization with boundaries divides the triangle into limited-width rows (or columns), and generates all the pixels within such a portion before moving on to the next portion.

For example, even if a triangle is 100 pixels wide, a limited-size pixel or texture memory might only hold information for the previous 20 pixels. Constraining the pixel sequence to stay within ten-pixel-wide vertical portions allows all the pixels on the previous and current rows to fit in the memory. This means that a boustrophedonic sequence within a boundary-defined portion would always have the previous pixel on the current row (if any) in the memory, as well as the pixels in the row above (if any) in the memory as well.

Most underlying memory systems transfer blocks of data with a certain overhead per block. Small accesses to the memory system are penalized heavily by this overhead. In order to be efficient, larger accesses are employed and the rest of the block is maintained in case it might be used next. Beyond that, a cache memory system keeps a plurality of these recent blocks, increasing the probability that memory accesses can be avoided.

The boustrophedonic sequence of the present invention exploits the single-retained-block concept when it reverses and handles pixels immediately below one end of the current line. Further, the boustrophedonic sequence exploits cache when it limits rasterization to portions of a particular size. Specifically, two scanlines within a portion should fit in the cache, so throughout the second scanline, benefits might be incurred from cache storage of the first scanline.

There is no constraint on the sequence or number of boundary-defined portions. Although the present description uses the example of vertical portions and a horizontal boustrophedonic pattern, similar principles might extend to horizontal portions, vertical boustrophedonic patterns or even to diagonal portions and patterns. In one embodiment, the length of the strings (e.g. rows, columns, diagonals, etc.) might be each limited to be less than a dimension of the primitive along which the string resides.

Figure 32:
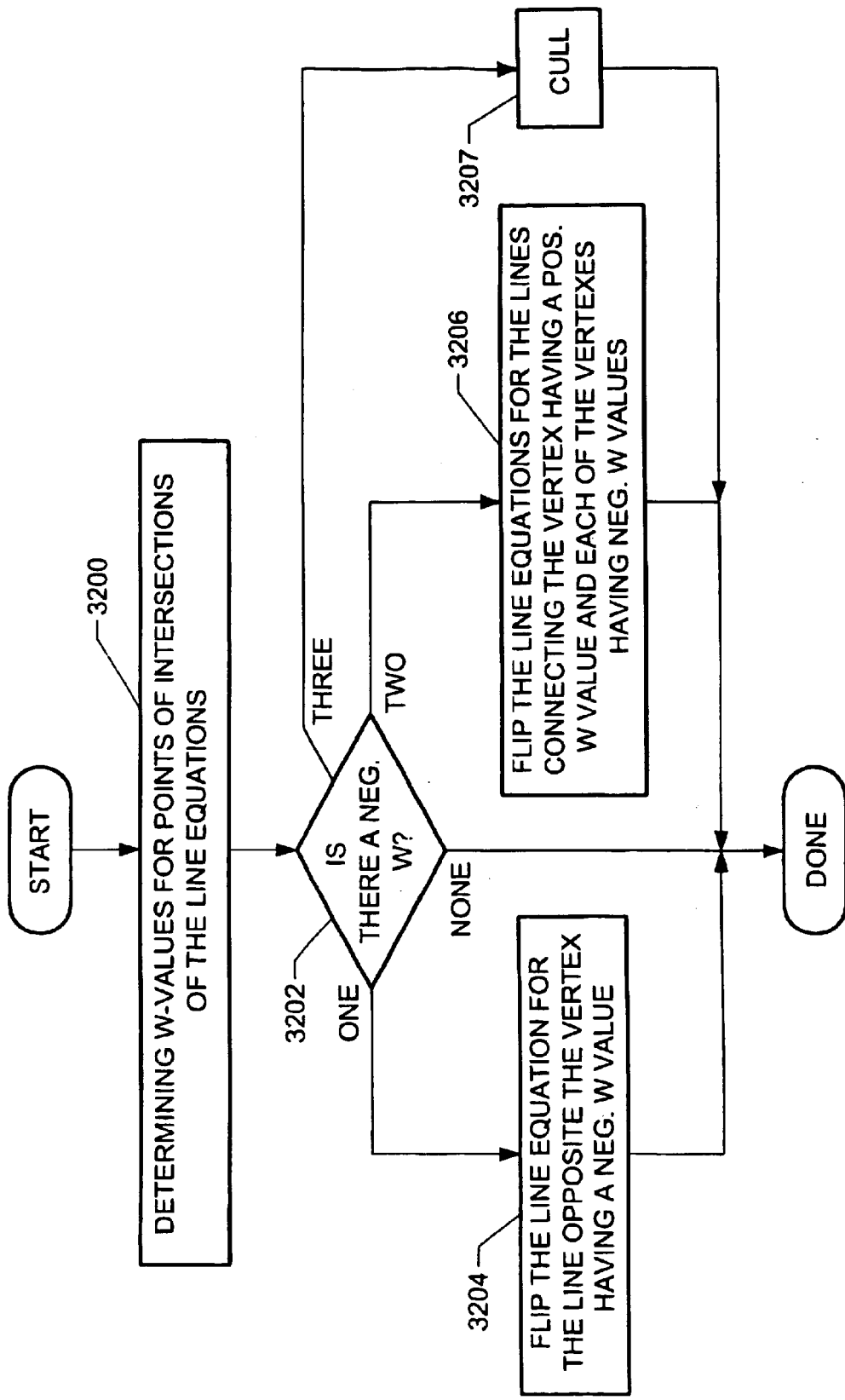
FIG. 32 is a flowchart showing the process associated with operation 2702 of FIG. 27.

FIG. 32 is a flowchart showing the process associated with operation 2702 of FIG. 27. The instant process is designed to handle a primitive with portions that reside behind the eye. These outlying portions might cause problems in subsequent rasterization operations. To accomplish this, the instant process employs a variable, W that is commonly used for projection i.e., for viewing objects in perspective. The variable W is a number that the other coordinates, X, Y and Z, are divided by in order to make nearby things larger and far things smaller. The variable W is representative of a distance between a center of projection and the corresponding vertex.

As shown in FIG. 32, a primitive is first received that is defined by a plurality of vertices. Each of such vertices includes a W-value. Upon the receipt of the primitive, the set-up module serves to define lines that characterize the primitive based on the vertices. Note operation 3200.

The W-values are then analyzed in decision 3202. As shown, if one of the W-values is negative, a line equation for a line opposite the vertex having the negative value is flipped in operation 3204. In other words, the coefficients of the line equation are multiplied by −1. Further, if two of the W-values are negative, line equations for lines connecting the vertex having a positive W-value and each of the vertexes having negative W-values are flipped in operation 3206. If three of the W-values are negative, a cull condition 3207 occurs where the present invention culls the triangle. Still yet, if none of the W-values are negative, no additional action is taken.

Figure 32A:
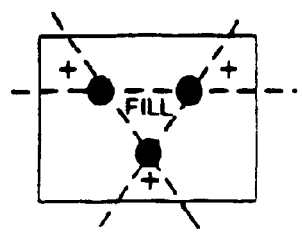
FIG. 32A is an illustration showing which area is drawn if no negative W-values are calculated in the process of FIG. 32.
Figure 33:
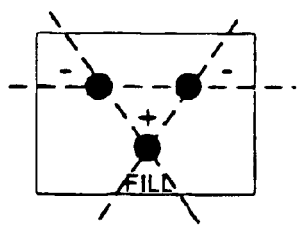
FIG. 33 is an illustration showing which area is drawn if only two negative W-values are calculated in the process of FIG. 32.

FIGS. 32A–33 illustrate the manner in which flipping line equations affects which portion of the screen is processed. FIG. 32A shows the case where none of the W-values are negative and the line equations are left unaltered. As shown, an interior portion of the primitive is filled in such case.

Figure 32B:
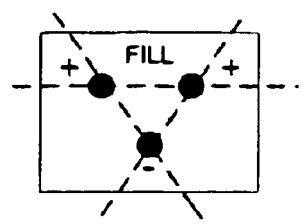
FIG. 32B is an illustration showing which area is drawn if only one negative W-value is calculated in the process of FIG. 32.

FIG. 32B shows the case where one of the W-values is negative and which of the line equations is flipped accordingly. As shown, the portion of the primitive opposite the vertex is filled in the present case. In particular, the area to be drawn is bounded by two lines that are co-linear with the two triangle sides sharing the −W vertex, and further bounded by a side of the triangle that shares the two +W vertexes.

FIG. 33 shows the case where two of the W-values are negative and which of the line equations are flipped accordingly. As shown, the portion of the primitive opposite the vertexes is filled using the methods and/or processes set forth hereinabove with reference to FIGS. 27–32. In other words, the area to be drawn is bounded by two lines that are co-linear with the two triangle sides sharing the +W vertex, and further contiguous to the +W vertex.

The present invention is thus capable of handling all three of the foregoing cases. If part of the triangle is beyond the near and/or far plane, it draws only the portion within those planes. If the triangle has one or two negative Z vertexes, only the correct +Z portion is drawn.

Even if all vertexes are off-screen, and the triangle extends from behind the eye to beyond the far plane, whatever pixels are inside the triangle and on the screen and have Z between the near and far limits. The present invention ensures that little time is wasted exploring bad pixels. This is possible because all clipping, by screen edge or the near or far plane, always results in a convex region on-screen which can be explored easily.

A problem sometimes arises when the starting point is not inside the area to be filled. This can occur if the top vertex is off-screen or is clipped by the near or far plane. In this case, the traversal stage must search for the top point of the drawn region, starting from above. It can do this efficiently by being guided by the signs of the triangle edge slopes and the Z slope. It can test the triangle line equations to discover it is outside the drawn region and why. When it knows what edge(s) and/or Z limit it is outside of, it knows what direction(s) to step that brings it closer to that edge or limit. By moving horizontally in preference to vertically (when there is a choice), searching for the drawn region guarantees it finds the top drawable pixel if there is one. This problem also occurs with external (−W) triangles that open up. In this case, the drawn area extends above all three vertexes.

In one embodiment of the present invention, traversal proceeds from top to bottom of the triangle. The starting point is the top vertex of the triangle if none have a negative W-value and the top vertex is in the scissor rectangle. Otherwise, a point on the top of the scissor rectangle is chosen. Since traversal always begins within the scissor rectangle and never ventures out of it, only the portion of the triangle within the scissor rectangle is ever drawn, even if the area enclosed by the edges extends far beyond the scissor rectangle. In, this way, simple scissor rectangle-edge clipping is effected.

Descriptions will now be set forth regarding the tessellation module 51 and other related components of FIG. 1A. Table 19 illustrates the various commands that may be outputted by the tessellation module 51 and received by the primitive assembly module 55. Of course, this list of commands set forth in Table 19 is for illustrative purposes only, and should not be construed as limiting in any manner. To this end, the tessellation module 51 controls the manner and fashion in which triangles are formed (efficiently) from the stream of vertices it produces.

TABLE 19

NO_PRIM
STRIP
FAN
LOAD
USE

In use, the tessellation module 51 of FIG. 1A is adapted to simply pass the inputted data when disabled, and output tessellated data when enabled. When tessellation commences, the NO_PRIM command is sent to the primitive assembly module 55. As such, the tessellation module 51 is capable of utilizing the vertex file 58 to temporarily store incoming vertices in vertex file locations as instructed, without producing any triangles. During operation, the tessellation module 51 may evaluate any primitive, triangle, polynomial, subdivision, etc. The outputted data is used to form triangles to approximate the primitive being tessellated by sending the NO_PRIM, STRIP, FAN, LOAD, and USE commands to the primitive assembly module 55.

Figure 34:
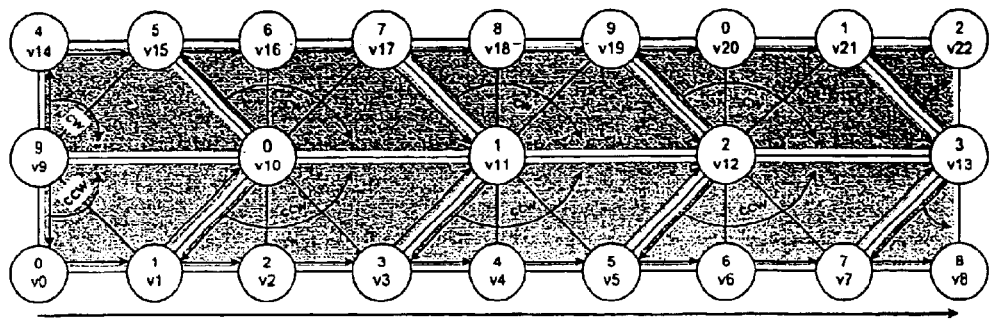
FIG. 34 illustrates exemplary data representing a string of vertices which may be processed by the tessellation module of FIG. 1A.

FIG. 34 illustrates exemplary data representing a string of vertices 3400 which may be outputted by the tessellation module 51. As shown, two rows of triangles are represented. The vertices are emitted in order from v0 . . . v22. During operation, the corresponding commands of Table 19 may be issued to the primitive assembly module 55 instructing it how to interpret the stream of vertices received from the transform and lighting modules 52 and 54.

For example, data representing a first row of vertices may be loaded into the vertex file 58 in response to the execution of the LOAD command. During the processing of the following rows, the STRIP and FAN commands may be used to form triangles from the vertices computed by the tessellation module 51, and subsequently processed by the transform and lighting modules 52 and 54. Further, various vertices stored in the vertex file 58 may be retrieved and reused using the USE command.

Logic in the tessellation module 51 thus produces a stream of commands that control the primitive assembly module 55 and cause it to form triangles from the stream of vertices produced by the tessellation module 51.

As an option, a mode bit may be used in association with the STRIP and FAN commands to indicate a clockwise or counterclockwise function. Because of the order in which the vertices are produced, it is necessary to draw both clockwise and counter-clockwise triangle fans. Note FIG. 34. The individual triangle fans are highlighted, as is the order in which the vertices are used by the primitive assembly module 55 to form triangles. The vertices are produced in a fixed order due to the characteristics of evaluation algorithms used. In general, it is important that primitive assembly module 55 be flexible in this respect. In other words, it should be able to receive vertices in an order dictated by other algorithms, e.g. tessellation algorithms.

Table 20 illustrates an exemplary set of commands that may be outputted from the tessellation module 51 to the primitive assembly module 55 for generating the data in FIG. 34.

TABLE 20 no prim
load 0 (v0)
load 1
load 2
load 3
load 4
load 5
load 6
load 7
load 8
ccwfan
load 9
use 0
use 1
ccwfan
load 0 (v10)
use 1
use 2
use 3
load 1 (v11)
ccwfan
use 1
use 3
use 4
use 5
load 2 (v12)
ccwfan
use 2
use 5
use 6
use 7
load 3 (v13)
ccwfan
use 3
use 7
use 8 cwfan
use 9
load 4 (v14)
load 5 (v15)
use 0
cwfan
use 0
use 5
load 6 (v16)
load 7 (v17)
use 1
cwfan
use 1
use 7
load 8 (v18)
load 9 (v19)
use 2
cwfan
use 2
use 9
load 0 (v20)
load 1 (v21)
use 3
cwfan
use 3
use 1
load 2 (v22)

As shown, the FAN command connects a first vertex with a plurality of other vertices that are indicated by the LOAD and USE commands. Again, the USE command may be executed whenever a vertex has already been loaded into the vertex file 58 using the LOAD command.

Figure 35:
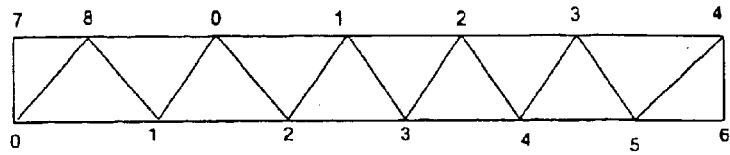
FIG. 35 illustrates the manner in which the loaded vertices are staggered to allow use of a vertex cache of a predetermined size.

FIG. 35 illustrates the manner in which the loaded vertices 3500 are staggered to allow use of a vertex cache of a predetermined size. As shown, the vertex 0 is not reloaded until staggered in the manner displayed. This ensures that data may be reused before being replaced with new incoming data. This is important since it permits two triangles to be drawn for each vertex transformed. This is twice (half) the usual for a triangle strip. For renderings that are transform limited, this significantly enhances performance.

With the foregoing integration, the combined tessellation and transform integration may afford improved quality by way of finer tessellations. At least two things make the finer tessellation possible. For example, there is reduced bandwidth from a host since the triangles are generated on-chip and don't have to travel along a bus from the host. Further, the tessellation module 51 uses the vertices very efficiently, generating more than one triangle per vertex transformed. This allows one to get more out of transform performance. Applications can thus take advantage of these and other capabilities by invoking the corresponding feature associated with the single semiconductor platform via a standard interface, as set forth earlier.

FIGS. 36–41 illustrate a first alternate embodiment of operation of the tessellation module 51 of FIG. 1A. The various features that will now be set forth are beneficial in improving the implementation of an integrated tessellator on a single semiconductor platform. It should be noted, however, that the features set forth during reference to the following Figures are optional, and may be varied per the desires of the user.

Figure 36:
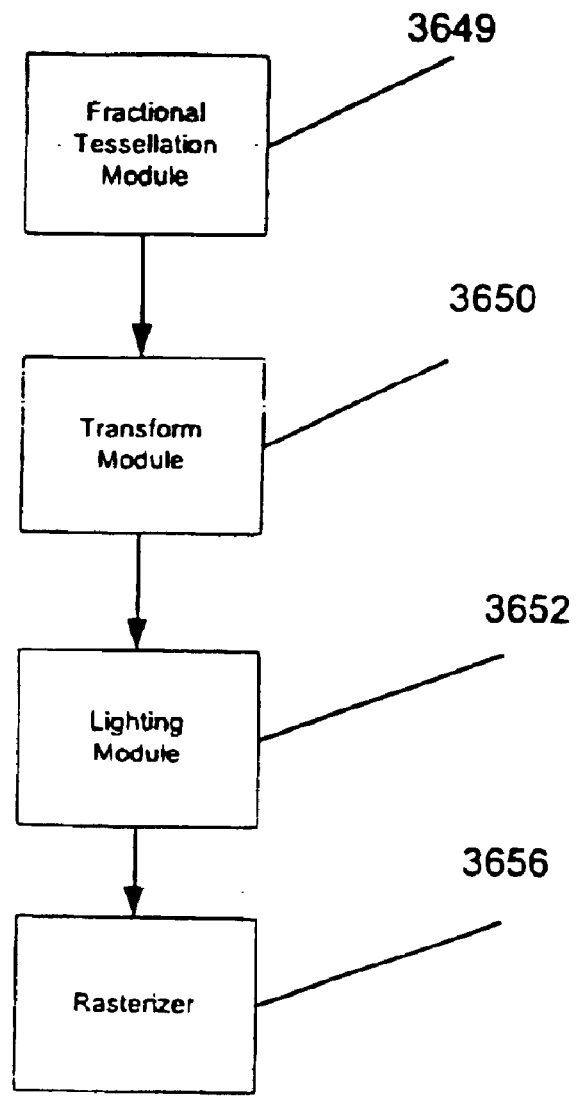
FIGS. 36–41 illustrate a first alternate embodiment of operation of the tessellation module of FIG. 1A.

FIG. 36 illustrates a hardware implementation in accordance with one embodiment of the present invention. As shown, included are a fractional tessellation module 3649, a transform module 3650, lighting module 3652, and a rasterization module 3656. During operation, the fractional tessellation module 3649 decomposes surfaces for rendering purposes during computer graphics processing. The specific manner in which this is accomplished will be set forth in greater detail during reference to the following figures. It should be noted that an exemplary operation of the remaining components was set forth hereinabove.

Figure 37:
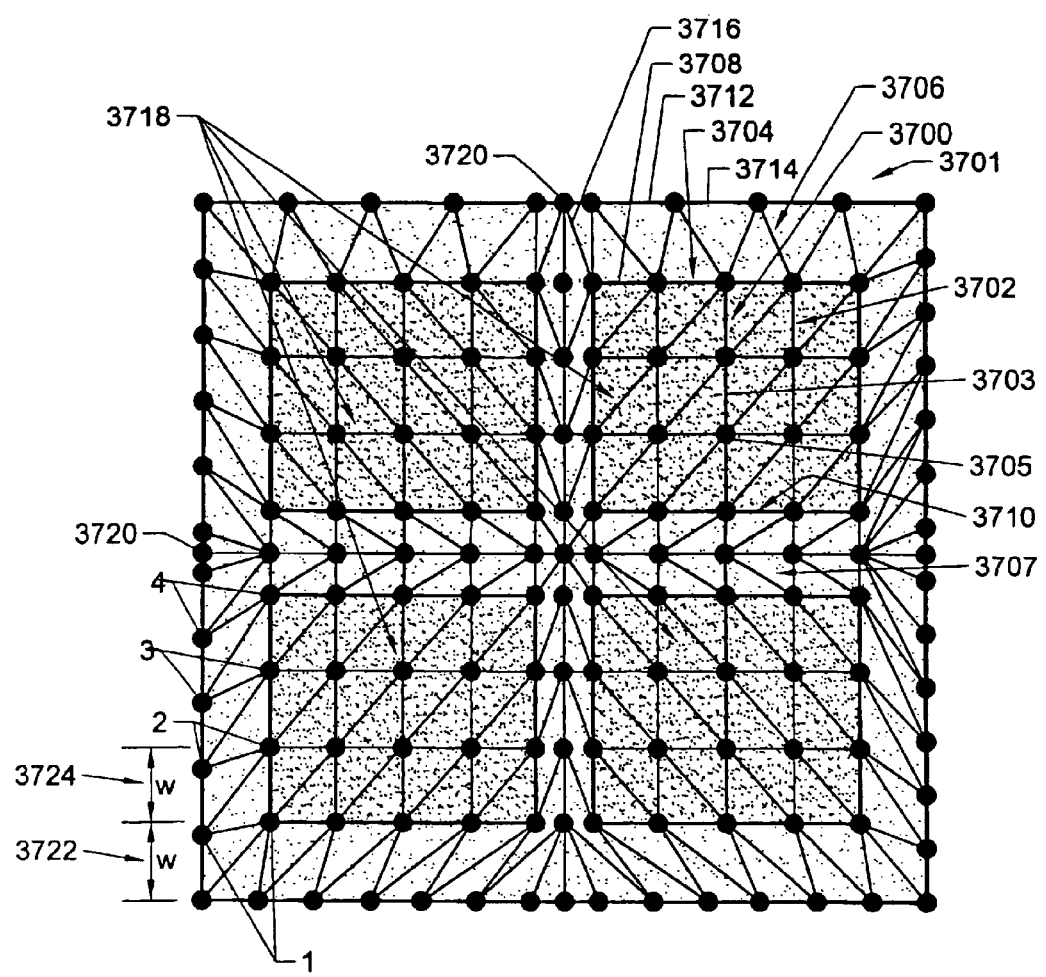

FIG. 37 is a diagram illustrating a fractional tessellation pattern configured in accordance with one embodiment of the present invention. As shown, an interior mesh 3700 of primitives is defined in a surface 3701, or "patch," to be rendered. Such interior mesh 3700 includes a plurality of strip curves 3703 which are configured to define a predetermined number of rows 3702 and columns 3704. The strip curves 3703 intersect at vertices 3705.

Circumnavigating the interior mesh 3700 is a plurality of surrounding meshes 3706 which are defined along sides of the interior mesh 3700. The surrounding meshes 3706 serve to accommodate for any change of tessellation, or discontinuity, between the interior mesh 3700 and the perimeter of the surface 3701. In addition to the surrounding mesh 3706, there are meshes 3707 crossing the interior of the patch, which also border regular mesh 3700. These meshes permit the number of rows/columns in the interior meshes 3700, to be varied (increased/decreased) without popping. The meshes 3707 are a fraction of the height/width of the rows/columns of 3700.

In one embodiment, the interior sides 3708 of the surrounding meshes 3706 each include a number of segments 3710 equal to the corresponding predetermined number of rows or columns of the interior mesh 3700. It should be noted that the segments 3710 are defined as portions of the strip curves 3703 situated between the vertices 3705. Further, the exterior sides 3712 of the surrounding meshes 3706 each include a plurality of equally sized segments 3714 and at least one fractional segment 3716 that is a fraction of the equally sized segments 3714.

With this configuration, a pattern of triangles is used that permits the number of triangles to be varied continuously from frame to frame while accommodating incremental evaluation techniques such as forward differencing. The scheme permits new vertices to be introduced (removed) at existing vertices, thus avoiding popping. Further, the independent tessellation factors permit applications to avoid cracking. Because the tessellation pattern is symmetric, no gaps can occur if equal tessellation factors are specified.

The foregoing description has been focused on a single interior mesh 3700 with four surrounding meshes 3706. In another aspect of the present invention, the interior mesh 3700 and the surrounding meshes 3706 may define one of a plurality of equally sized and shaped portions 3718 of the surface 3701. Also, the fractional segments 3716 of each of the portions 3718 may be positioned adjacent a midpoint 3720 of a side of the surface 3701. As an option, a width 3722 of the surrounding meshes 206 may be equal to a width 3724 of the rows or columns of the interior mesh 3700. Note FIG. 37.

Figure 38:
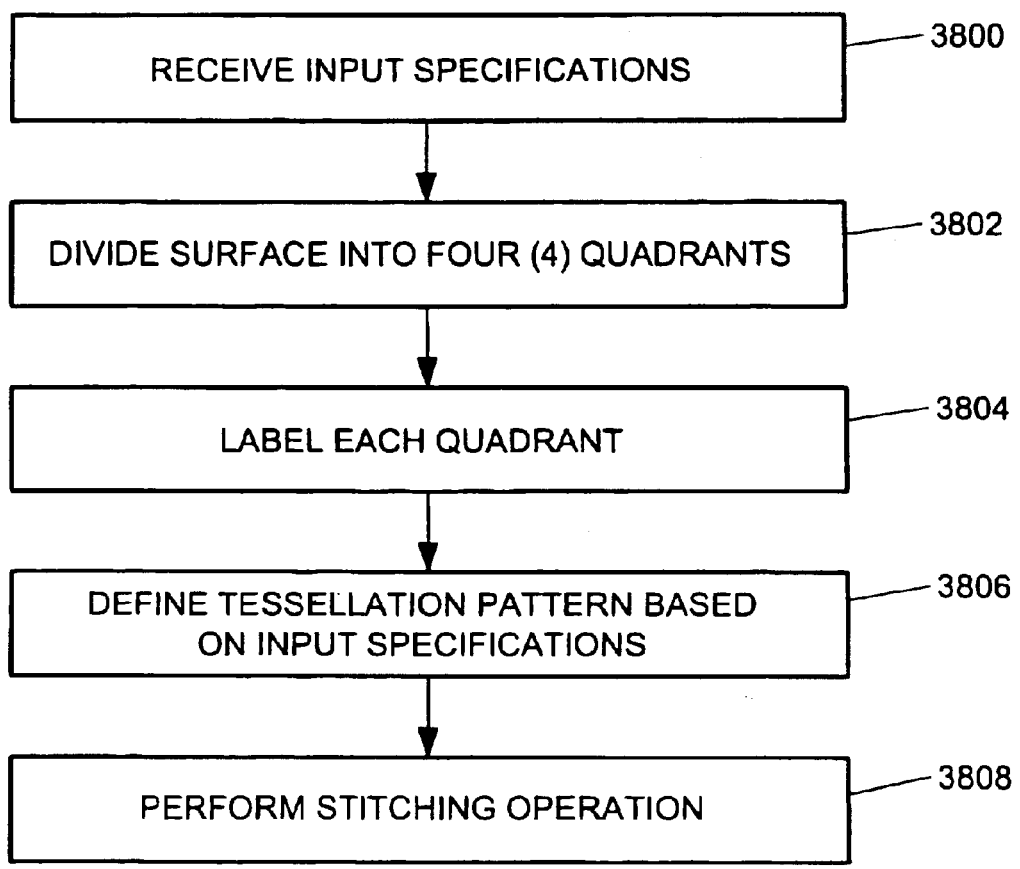

FIG. 38 is a flow diagram illustrating the various operations associated with generating the fractional tessellation set forth in FIG. 37. First, specifications are received in operation 3800. Such specifications may be provided by an application program interface, and include a specific number of segments 3710 along sides of the surface 3701. Also included are a number of rows and columns to be included in the interior mesh 3700.

Figure 38A:
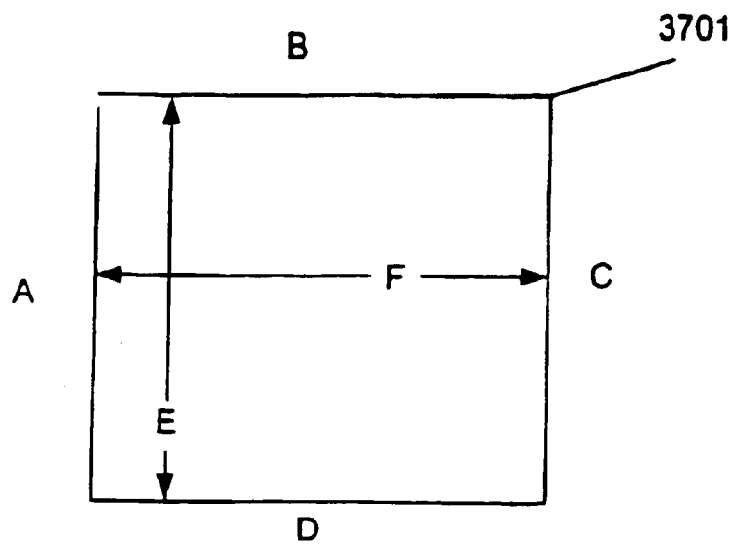
Figure 38B:
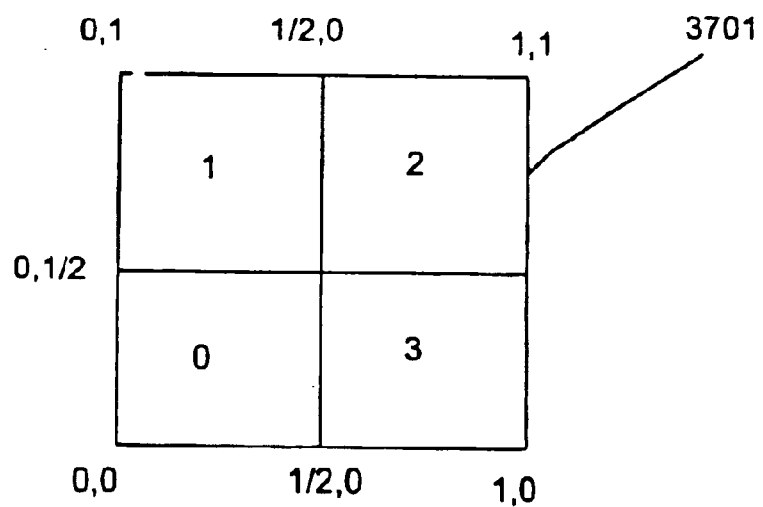

Next, in operation 3802, the surface is divided into four (4) quadrants. FIG. 38A illustrates the surface 3701 prior to being divided into quadrants in accordance with operation 3802 of FIG. 38. As shown, each of the sides of the surface 3701 is defined as A, B, C, and D; and the vertical and horizontal dimensions of the surface 3701 are defined as E and F, respectively. FIG. 38B illustrates the surface 3701 after being divided into quadrants in accordance with operation 3802 of FIG. 38. It should be noted that the surface 3701 is divided at the parametric midpoints to generate quadrants 0, 1, 2, and 3.

Figure 38C:
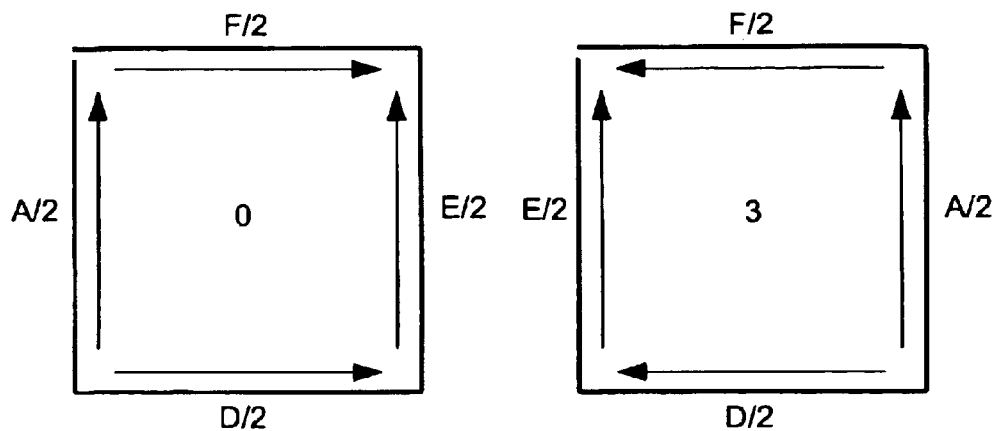

With continuing reference to FIG. 38, the quadrants defined in operation 3802 are then labeled in operation 3804. FIG. 38C illustrates the labeling of the quadrants in accordance with operation 3804 of FIG. 38. As shown, quadrant 0 includes sides designated as A/2, F/2, D/2 and E/2 which correspond to their length with respect to the corresponding sides/dimensions of the surface 3701 set forth in FIG. 38A. In a similar manner, quadrant 3 includes sides designated as E/2, F/2, D/2 and C/2. Quadrants 1 and 2 may be labeled in a similar manner. It should be noted that the direction of rendering may optionally be defined at this point. Specifically, tessellation and rendering are designated to occur along each side in a direction toward a midpoint of a side of the surface 3701 (for exterior sides A, B, C, D), or toward a center of the surface 3701 (for interior sides E, F). Note the direction of arrows in FIG. 38C.

Subsequently, in operation 3806 of FIG. 38, the tessellation pattern is defined based on the input specifications and the labeling of operation 3804. In particular, the vertex arrangement of the interior mesh 3700 is uniformly defined simply by the number of rows and columns indicated by the input specifications received in operation 3800. Further, the tessellation pattern of the sides of each quadrant is defined by determining a number of the equally sized segments 3714 and a length of the fractional segment 3716.

In the case of quadrant 0 of FIGS. 38B and 38C, the number of equally sized segments 3714 is determined by calculating an integer component of each side. For example, in the case of side A, the number of segments associated therewith is Int(A). Further, the length of the fractional segment 3716 is determined by calculating the fractional component of each side, Frac(A)=A−Int(A). Similar calculations may be made for each side of each quadrant. Also, such values may be verified by utilizing Equation #1 set forth below.

$$Int(A)*1/A+[Frac(A)]/A=1 \qquad \text{Equation \#1}$$

Figure 38D:
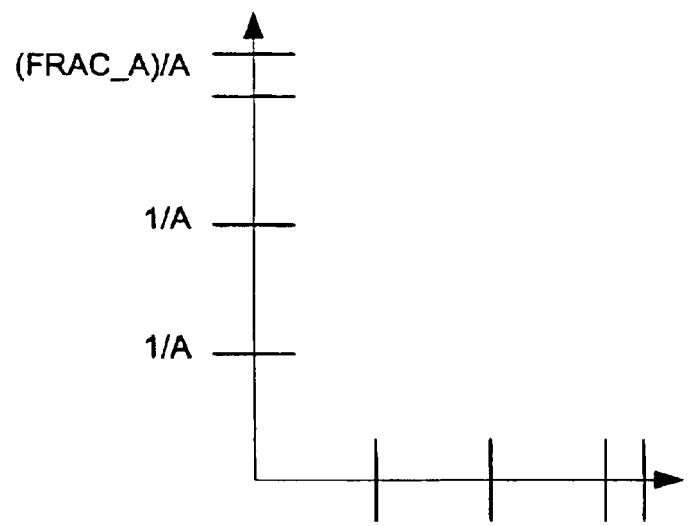

FIG. 38D illustrates the manner in which the vertices 3705 and segments 3714, 3716 are positioned along each side of the quadrants in accordance with the specified direction of rendering. As shown, the fractional segments 3716 are positioned adjacent an endpoint of the rendering.

With the vertices 3705 and segments 3714, 3716 of the interior mesh 3700 and the sides of the quadrant defined, the vertices are stitched in operation 3808 of FIG. 38. This is carried out by starting at an end vertex of a side of the interior mesh 3700, where the end vertex is situated opposite the fractional segment 3716. The vertices of the interior mesh and the exterior side of the surface 3701 are then connected, or "stitched," in a zigzag manner.

Figure 38E:
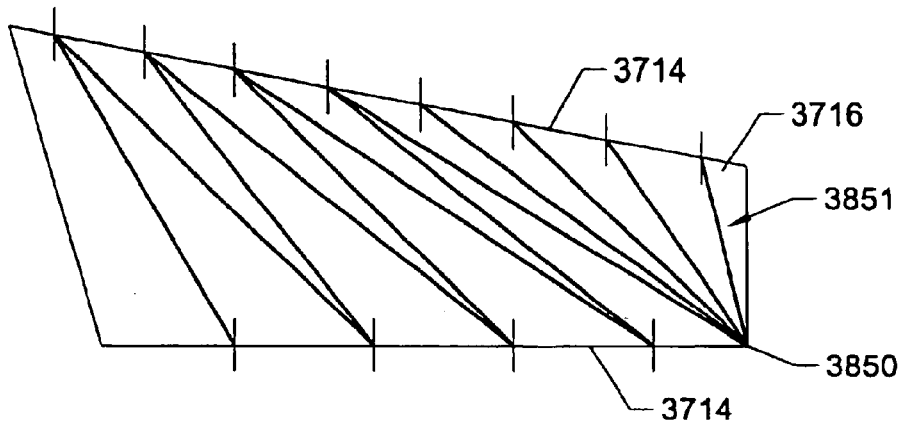
Figure 38F:
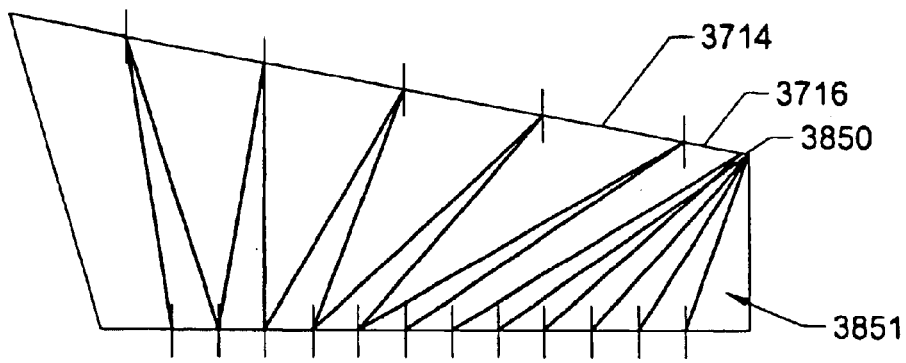
Figure 38G:
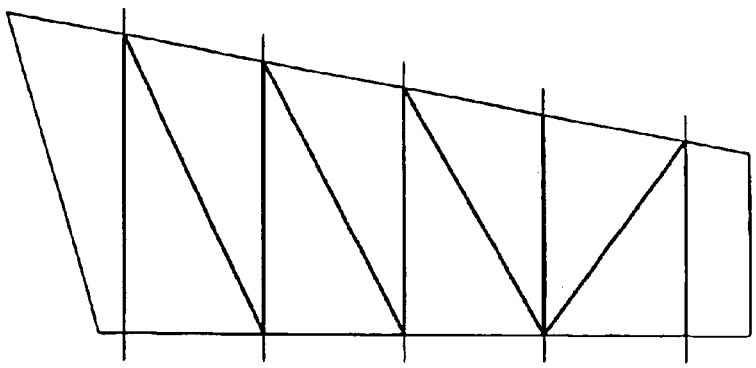

FIGS. 38E, 38F, and 38G illustrate stitching patterns for situations where the exterior sides of the surrounding meshes 3706 have a number of segments 3714, 3716 greater than, less than, or equal to the corresponding predetermined number of rows or columns of the interior mesh 3700, respectively. As shown in FIGS. 38E and 38F, upon running out of vertices, the last vertex 3850 is coupled to any remaining vertices in a "fan out" pattern 3851. As shown in FIG. 38G, such fan out pattern 3851 may not be necessary in the situation where the surrounding meshes 3706 have a number of segments 3714, 3716 equal to the corresponding predetermined number of rows or columns of the interior mesh 3700.

Figure 39:
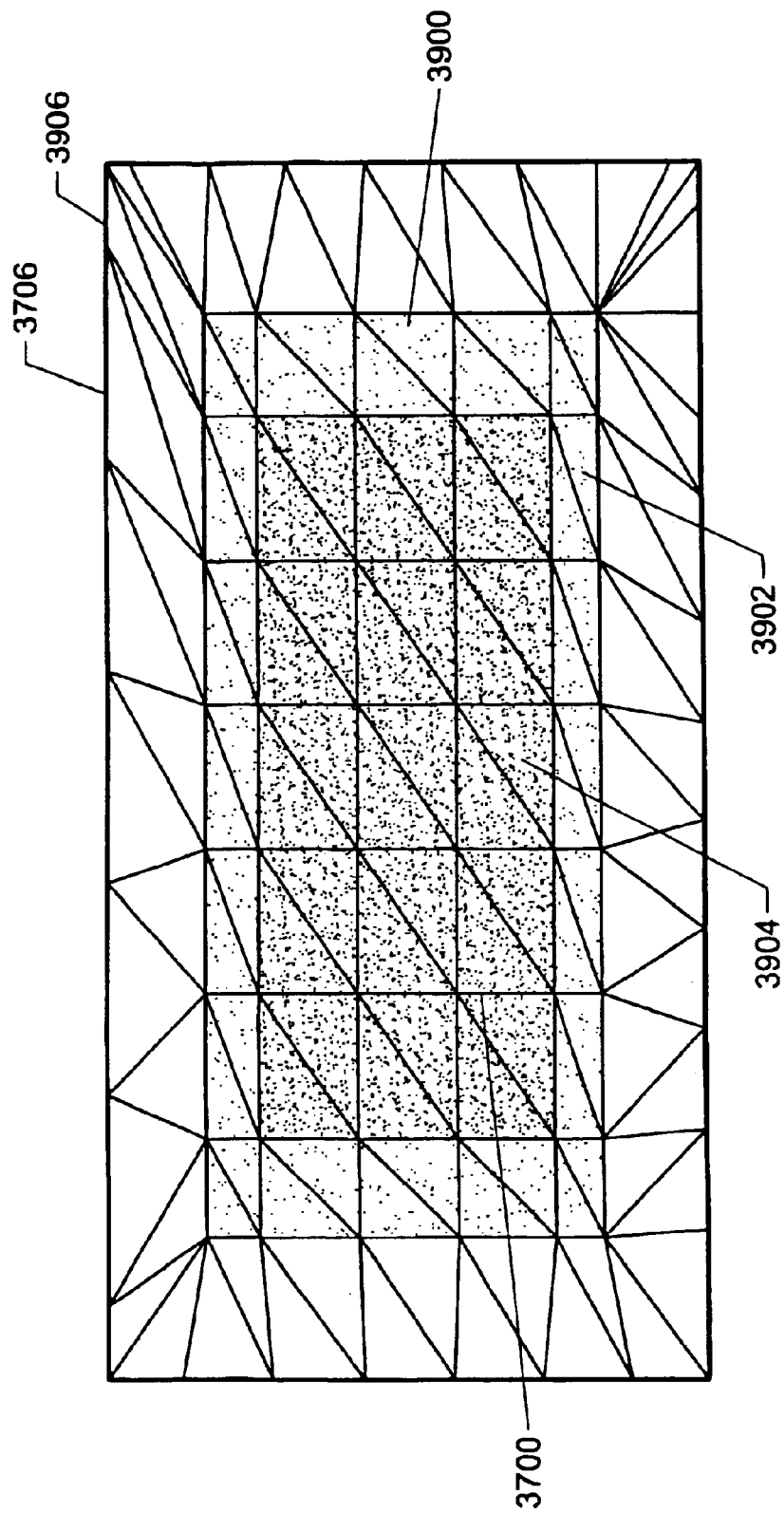

FIG. 39 illustrates an alternate configuration including a transition mesh 3900 between the interior mesh 3700 and the surrounding meshes 3706. As shown, the interior mesh 3700 may include a transition mesh 3900 situated along sides of the interior mesh 3700. Optionally, such transition mesh 3900 may have dimensions which are unequal to dimensions of the interior mesh 3700. For example, the blocks 3902 of the transition mesh 3900 may be larger or smaller than the blocks 3904 defined by the interior mesh 3700.

Further, the exterior sides of the surrounding meshes 3706 may each include two or more (preferably an even number) fractional segments 3906 that are a fraction of the equally sized segments. Unlike the previous embodiment, the fractional segments may be positioned at both ends of the exterior sides of the surrounding meshes 3706. The present embodiment thus affords one single interior mesh 3700 as opposed to the multiple interior meshes 3700 of the previous embodiment of FIG. 37. Any discrepancies are then handled by the transition mesh 3900.

Figure 40:
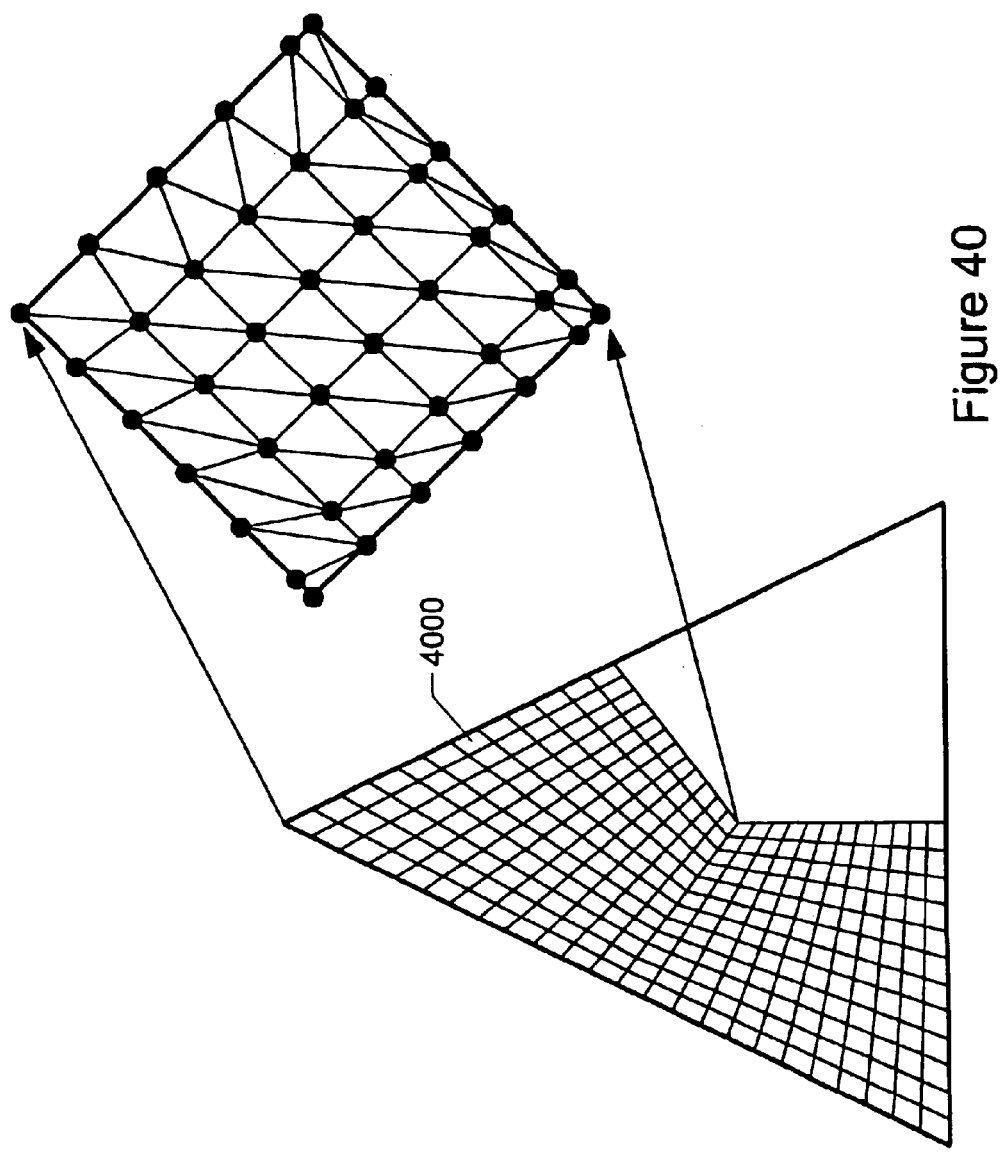

FIG. 40 illustrates the fractional tessellation patterning scheme employed for decomposing a triangular patch 4000 in accordance with one embodiment of the present invention. As shown, the triangular patch 4000 may be subdivided into a plurality of patches in a manner similar to the subdivision of the square patch of FIG. 37.

It should be noted that the present invention may be implemented in even and odd parity. By even and odd parity, it is meant that there are either always an even number of segments on an external side, or an odd number of segments. In the case of an even number the number of rows and columns of the interior mesh is fractional albeit strictly rows and columns. In the odd parity case, there is also a regular mesh on the interior, also fractional. In the even parity case, the fractional rows/columns cross the center. In the odd case the fractional rows is at the perimeter of the regular mesh.

Figure 41:
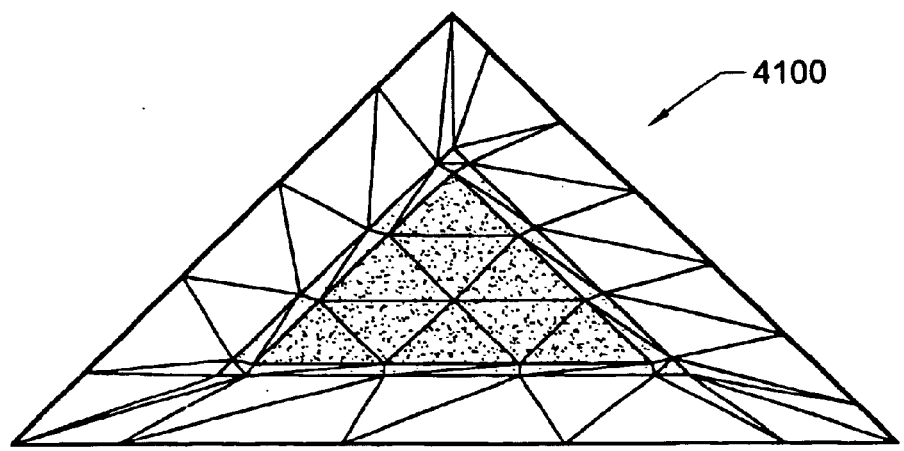

FIG. 41 illustrates a tessellation scheme 4100 for triangular patches that does not require conversion to tensor products. It should be noted that the even parity scheme requires tensor products, and the odd parity scheme uses triangular patches.

FIGS. 42–50 illustrate a second alternate embodiment of operation of the tessellation module 51 of FIG. 1A. The various features that will now be set forth are beneficial in improving the implementation of an integrated tessellator on a single semiconductor platform. It should be noted, however, that the features set forth during reference to the following Figures are optional, and may be varied per the desires of the user.

Figure 42:
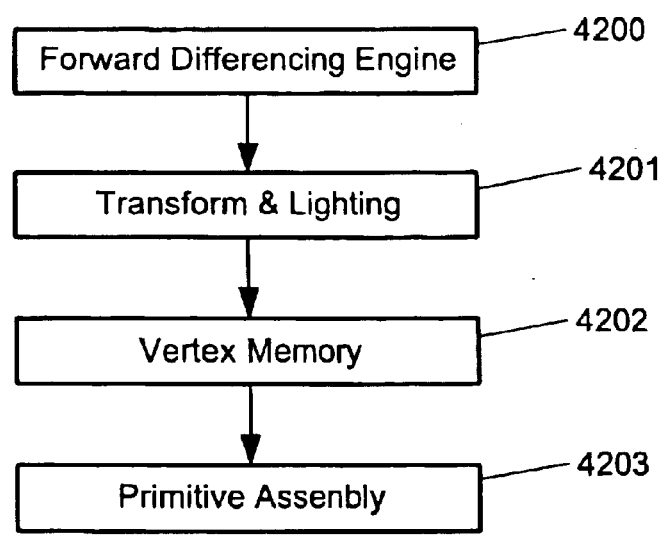
FIGS. 42–50 illustrate a second alternate embodiment of operation of the tessellation module of FIG. 1A.

FIG. 42 is a general schematic of an exemplary hardware implementation of the present invention. As shown, a forward differencing engine 4200 is included for tessellating patches for the purpose of defining primitives. Coupled to the forward differencing engine 4200 is a transform and lighting module 4201. It should be noted that an exemplary operation of the transform and lighting module 4201 was set forth hereinabove.

A vertex memory 4202 is coupled to the transform and lighting module 4201 for storing vertices of the primitives that have been processed by the transform and lighting module 4201. As is well known to those of ordinary skill, the vertex memory 4202 enables reuse of calculated or transformed vertices in order to afford accelerated operation. Coupled to the vertex memory 4202 is a primitive assembly unit 4203 that assembles the primitives in preparation for a rendering using a rasterizer (not shown).

Figure 42A:
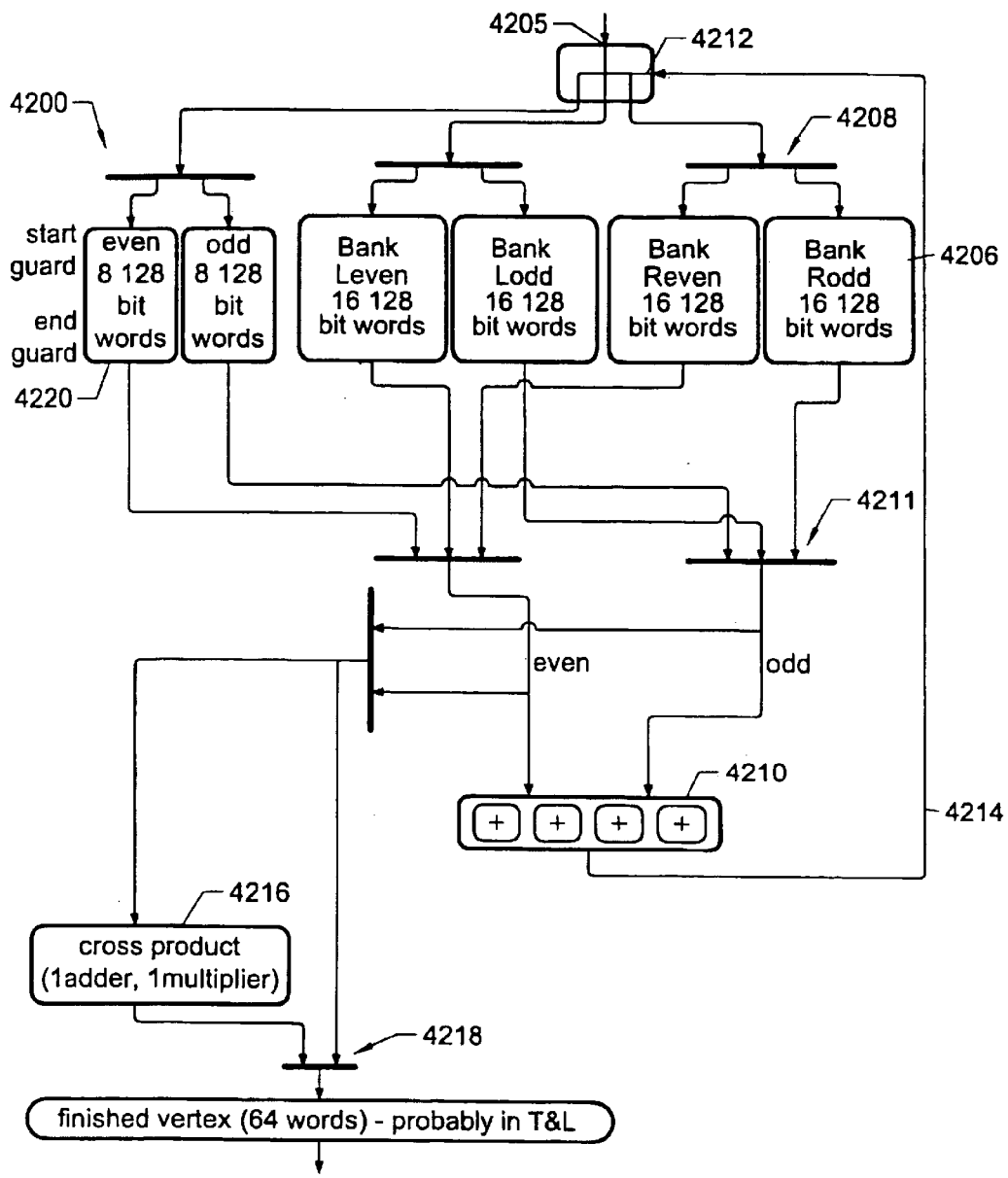

FIG. 42A is a schematic illustrating one implementation of the forward differencing engine 4200 of FIG. 42. As shown, the forward differencing engine 4200 includes an input 4205 which feeds a plurality of memory banks 4206 via a first set of multiplexers 4208. The memory banks 4206 are coupled to a plurality of, adders 4210 by way of a second set of multiplexers 4211. Coupled to the adders 4210 is a plurality of addends 4212 which are fed via a feedback loop 4214. It should be noted that a cross product module 4216 may be optionally coupled between the second set of multiplexers 4211 and an output multiplexer 4218 in the manner shown in FIG. 42.

For integrating guard curves into the forward differencing procedure, start and end guard curve memory banks 4220 are coupled between the input 4205 and the second set of multiplexers 4211. By this structure, the forward differencing engine 4200 is capable of operating on four polynomials in parallel. It should be noted that there is a polynomial for each vertex component, and there may actually be many polynomials active with the parallel adder evaluating four at a time. Normally, the four polynomials evaluated in parallel correspond to x, y, z and w position components or s, t, r and q texture components.

In operation, the forward differencing engine 4200 initiates four floating point additions every clock, and stores the result in one of the addends 4212. The next level of granularity of operation is the-evaluation of a vertex which is permitted to vary polynomially. During use, the memory banks 4206 contain the forward difference coefficients corresponding to each of vertex components that are varying. In one embodiment, a 64-bit register (not shown) may be used to program the configuration of the memory banks 4206, determine the exact method to evaluate a vertex, specify the destination of each vertex component, and determine the ultimate position of each vertex component within an output vertex (not shown).

Figure 42B:
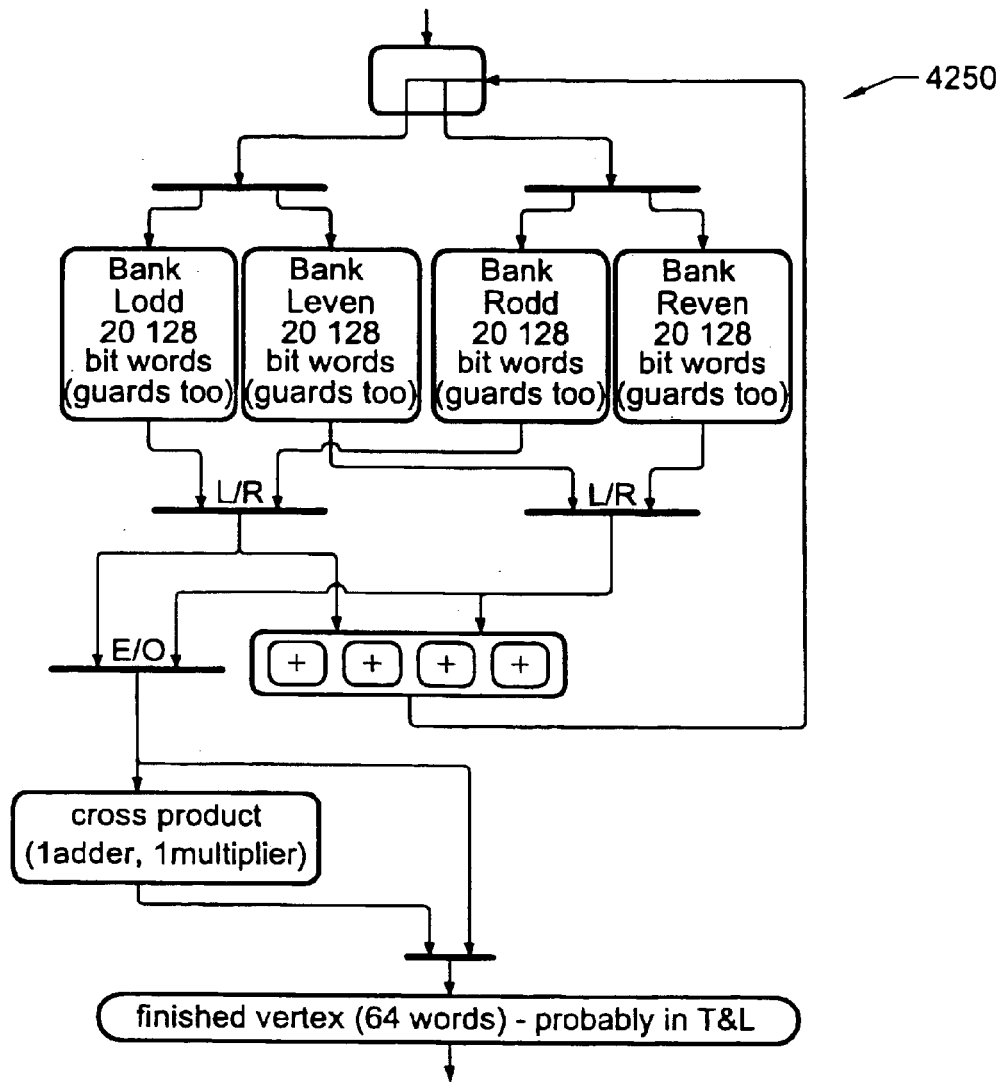

FIG. 42B is a schematic illustrating an alternate forward differencing engine 4250 which augments the memory banks 4206 in lieu of utilizing separate guard curve memory banks 4220. It should be noted that any type of hardware implementations may be used in place of those set forth in FIGS. 42 and 42A based on a desired tradeoff between memory access arbitration versus utilizing more memories. One possible modification includes the removal of the cross product module of FIG. 42B.

The forward differencing engines 4200 and 4250 of FIGS. 42A and 42B are adapted to calculate normal and position values during operation. In various alternate embodiments, other vertex component values, i.e. colors, texture, etc., may be handled by the present invention. Normal values are computed by the forward differencing engine 4200 and normalized by a transform and lighting module 4201. The normal values are computed by evaluating the parametric partial derivatives of the surface patch, and calculating a cross product thereof. Exemplary pseudo-code for vertex and normal calculation is shown in Table 21 below. It should be noted that in various alternate embodiments, partials need not necessarily be evaluated.

TABLE 21

```
ComputeVertexAndPartials () {
    coefIndex = 0;
    //is the normal present?
    if (ComputeNormal) {
        //write the current partial derivative
        CrossProductPu = Bank [coefIndex];
        For (j = 0; j < Degree[0]; j++) {
            Bank [coefIndex] += Bank[coefIndex+1];
            coefIndex++;
        }
        // step past the constant coefficient
        coeffIndex++;
        //write the other current partial
        CrossProductPv = Bank[coefIndex];
        // one lower than first
        For (j = 0; j < Degree[0] -1; j++) {
            Bank[coefIndex] += Bank[coefIndex+1]
            CoefIndex++;
        }
        // step past the constant coefficient
        coefIndex++;
        // set so next vertex component is "2nd"
        start = 1;
    } else {
        start = 0;
    }
    //for each possible vertex component
    for (i = start; i < NUMBER_OF_COMPONENTS; i++) {
        // write out the current value
        IBuff[IBuffLoc[i]] = Bank[coefIndex];
        // compute the new component
        for (j = 0; j < Degree[i]; j++) {
            Bank[coefIndex] += Bank[coefIndex+1];
            coefIndex++;
        }
        // step past the constant coefficient
        coefIndex++;
    }
}
```

Figure 43:
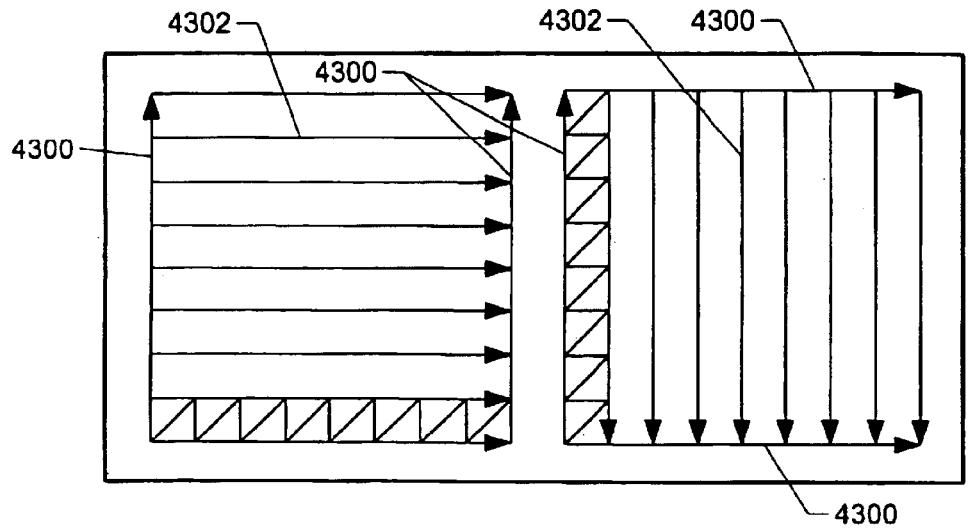

FIG. 43 illustrates the use of guard curves and reversed curves during the decomposition of surface patches in accordance with one embodiment of the present invention. As shown, guard curves 4300 are introduced among the strip curves 4302 in order to solve the problems associated with the prior art. It should be noted that the guard curves 4300 of the present invention are similar to the strip curves 4302 except that they are specifically injected to solve the problems associated with the prior art. In one embodiment, the guard curve 4300 is only used to calculate position since differences in other vertex components are generally permitted and/or are less objectionable.

As shown in FIG. 43, the guard curve 4300 along the right edge of the left-hand patch is identical to the strip curve 4302 along the left edge of the right-hand patch. When a strip is tessellated, the first and last vertex positions of the strip are overwritten by the values computed from the guard curves 4300, thus guaranteeing that adjacent tessellations match exactly.

Figure 44:
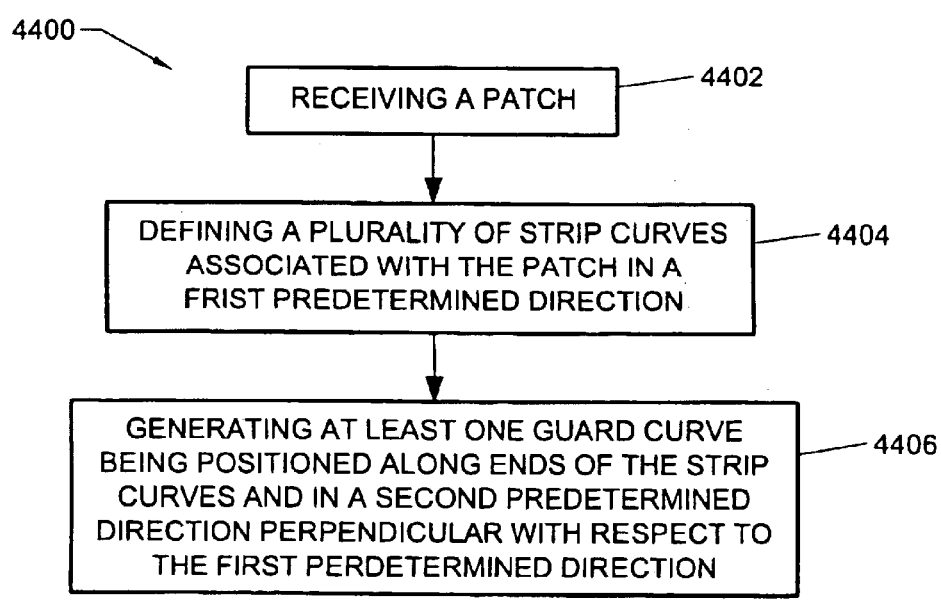

FIG. 44 is a flowchart illustrating the method 4400 in which the guard curves 4300 of FIG. 43 are generated using the exemplary hardware of FIGS. 43 and 43A. Initially, in operation 4402, a patch is received. Thereafter, a plurality of strip curves 4302 associated with the patch is defined in a first predetermined direction. Note operation 4404. Using these strip curves 4302, areas defined by the strip curves may be decomposed into a plurality of primitives for rendering purposes.

Next, at least one guard curve 4300 associated with the patch is generated in operation 4406. The guard curve 4300 is positioned along ends of the strip curves 4302 and in a second predetermined direction that is perpendicular with respect to the first predetermined direction in parameter space. Such guard curve 4300 prevents vertex mismatches when tessellating curved surfaces into triangles in the manner set forth during reference to FIG. 43. During some use, two guard curves 4300 may be consistently used for each patch, as shown in FIG. 43.

Figure 45:
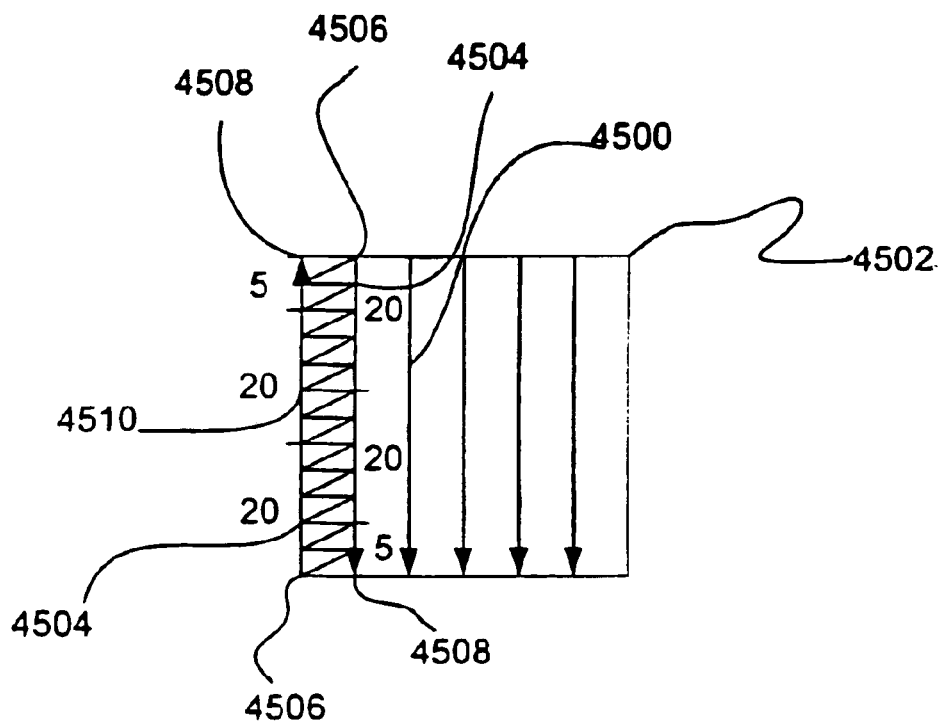

FIG. 45 illustrates a reverse stitching method used in conjunction with the guard curves. During the guard curve method set forth in FIG. 5, a reversed strip curve 4510 may be generated in a third predetermined direction parallel and opposite with respect to the first predetermined direction. This is done in order to match the direction of a guard curve or strip curve of an adjacent surface patch. See left edge of right-hand patch of FIG. 43. By doing this, an area defined by the strip curve in the first predetermined direction and the reversed strip curve 4510 may then be decomposed using reverse stitching.

As shown in FIG. 45, the reversed strip curve 4510 differs from the guard curves of FIG. 43 in that it is not perpendicular to the strip curves. While the guard curves overwrite values already computed by the strip curves, the reversed strip curves directly compute all values/vertex components and no overwriting necessarily occurs.

As shown in FIG. 45, each of the strip curves 4500 of the surface patch 4502 may be optionally broken up into a plurality of segments 4504. It should be noted that a size of the segments 4504 are determined based on a size of the vertex memory 4202 of the graphics pipeline system. For example, if the vertex memory 4202 were capable of handling 20 vertices, the strip curves 4500 would be broken up into 20 segments 4504. Further, the segments 4504 are started at a starting point 4506 of the associated evaluation direction of the strip curve 4500 such that any fractional segment 4504 is positioned adjacent an ending point 4508 of the associated evaluation direction. A similar process is executed for the guard curve 4510.

In order to afford optimum tessellation, the vertices of the strip curve 4500 adjacent to the reversed strip curve 4510 are loaded into the vertex memory 4202 differently than those of the reversed strip curve 4510. In particular, the vertices associated with each of the strip curves 4500 are each loaded in a first predetermined order 4520. In contrast, the vertices associated with the reversed strip curves 4510 are each loaded in a second predetermined order 4522. It should be understood that the position and normal values are merged with the strip curves 4500 before transform and lighting, and only a single position is transformed.

Figure 46:
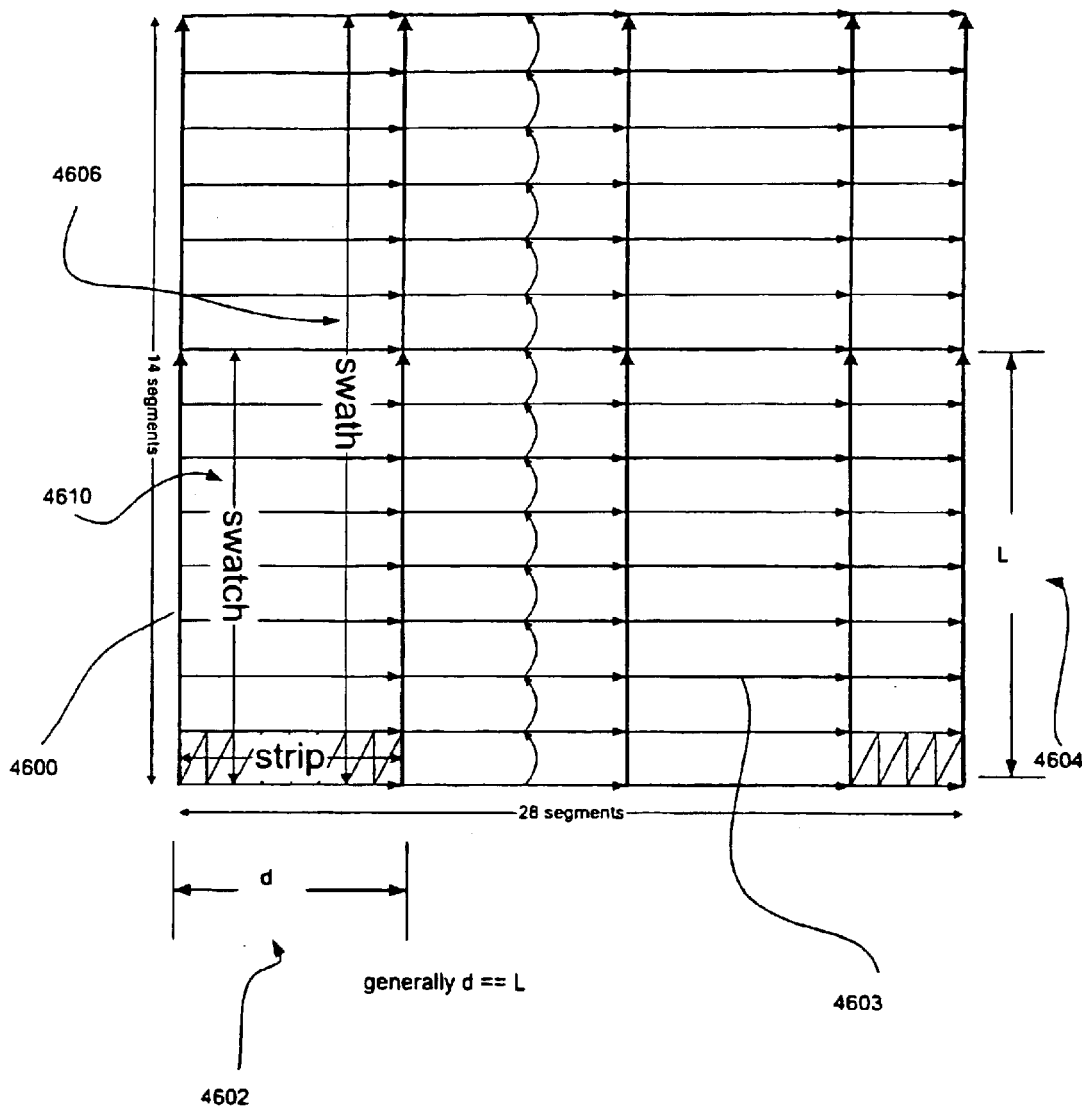

FIG. 46 illustrates the manner in which a length of the guard curves and a space there between are set based on a size of the vertex memory 4202. As shown, a plurality of guard curves 4600 are generated, and a distance 4602 between the guard curves 4600 is determined based on a size of a vertex memory 4202 into which vertices of the primitives are loaded. In particular, the distance 4602 between the guard curves 4600 is set such that each vertex of the strip curves 4603 fits within the vertex memory 4202. In summary, the strip curves 4603 are divided up by the guard curves 4600 in order to match a size of the vertex memory 4202.

Further, a length 4604 of the guard curves 4600 is determined based on a size of a vertex memory 4202 into which vertices of the primitives are loaded.

Specifically, the length 4604 of the guard curve 4600 is set such that each vertex of the guard curve 4600 fits within the vertex memory 4202. As such, the guard curves 4600 are handled in a manner similar to that of the strip curves 4603 such that a side of a surface patch may include a plurality of collinear guard curves 4600.

The technique set forth in FIG. 46 thus defines multiple "swaths" 4606 to accommodate situations where there are more vertices in a row than will fit in the vertex memory 4202. In FIG. 46, the patch is rendered in four swaths 4606. The coefficients of the strip curves 4603 are computed by the host and then evaluated by the forward differencing engine 4600. The values at the heads of the strip curves 4603 are computed as the result of iteration in the forward differencing engine 4600. The values at the tails of the strip curves 4603 are computed by the host, likely the result of iterating curve definitions one to the next.

As a result, the values at the heads of the strip curves 4603 are not equal to their logical equivalents at the tails of the next strip curve 4603. Again, the host may supply a guard curve 4600 to evaluate along the start and end of the strip curves 4603. It should also be noted that because a guard curve can correspond to a strip curve, a guard curve may only generate as many vertices as can a strip curve. It is this constraint that results in a swath 4606 being broken into multiple swatches 4610.

Figure 47:
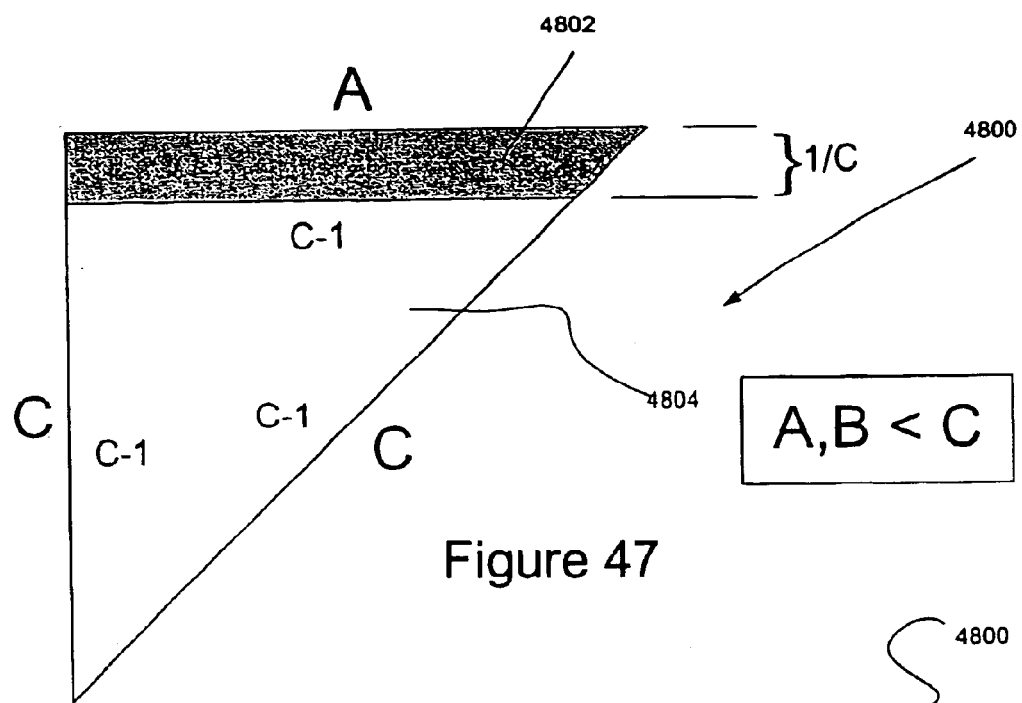
Figure 48:
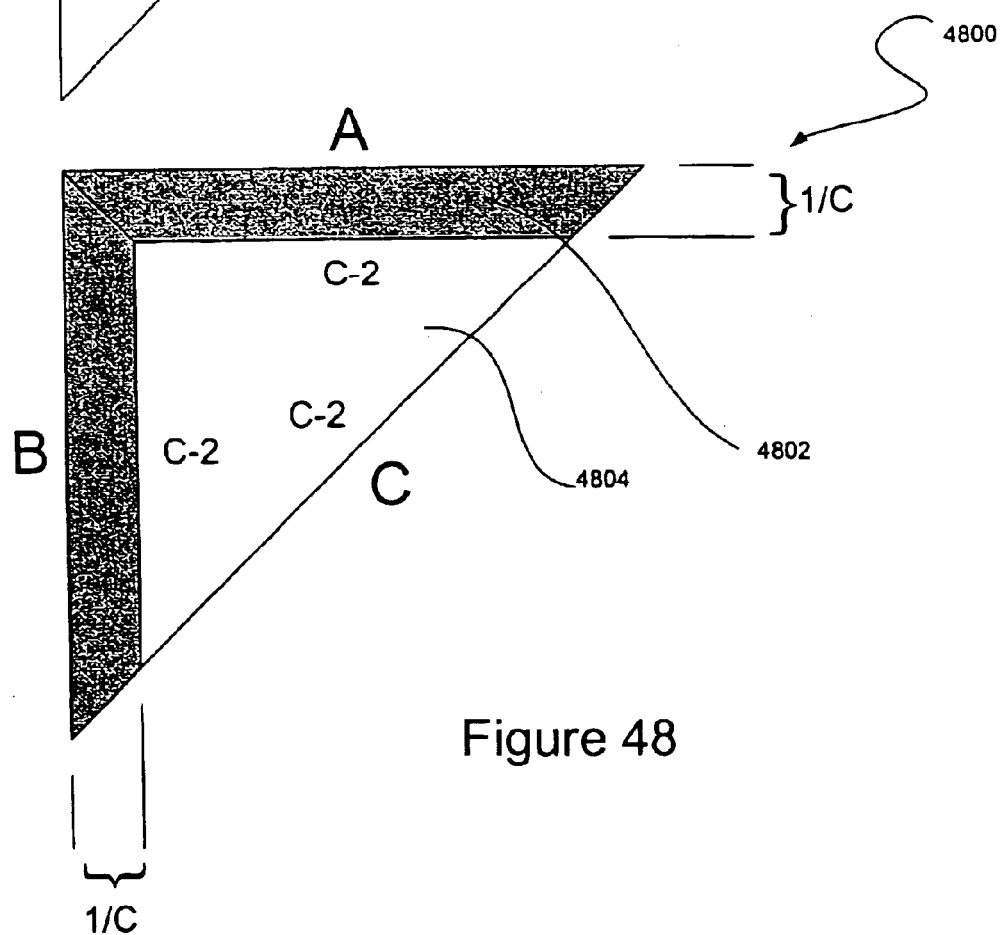

FIGS. 47–50 illustrate the manner in which triangular patches are handled in accordance with one embodiment of the present invention. As shown in FIGS. 47–48, a triangular patch 4800 to be rendered may have transition regions 4802 defined around an interior region 4804. It should be noted that such transition regions 4802 may be treated similar to the rectangular patches set forth hereinabove.

Figure 49:
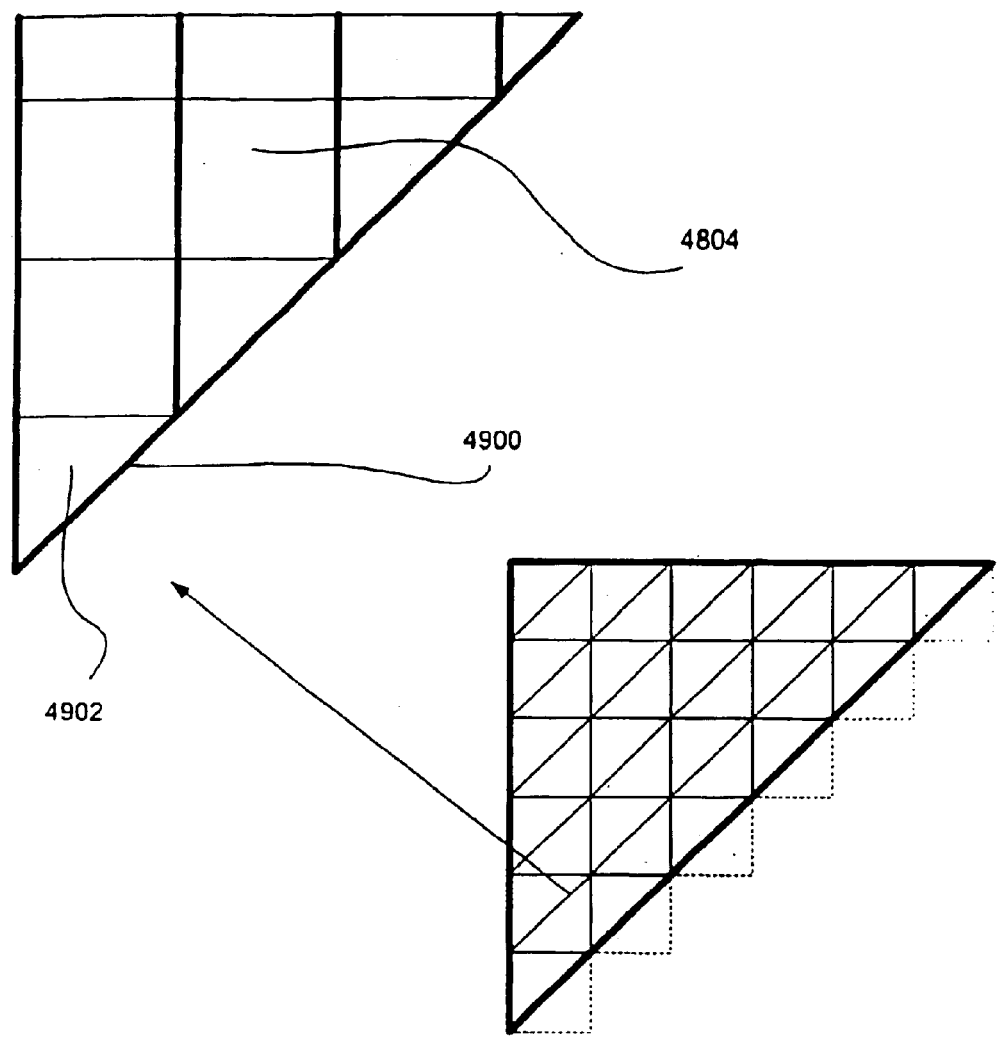
Figure 50:
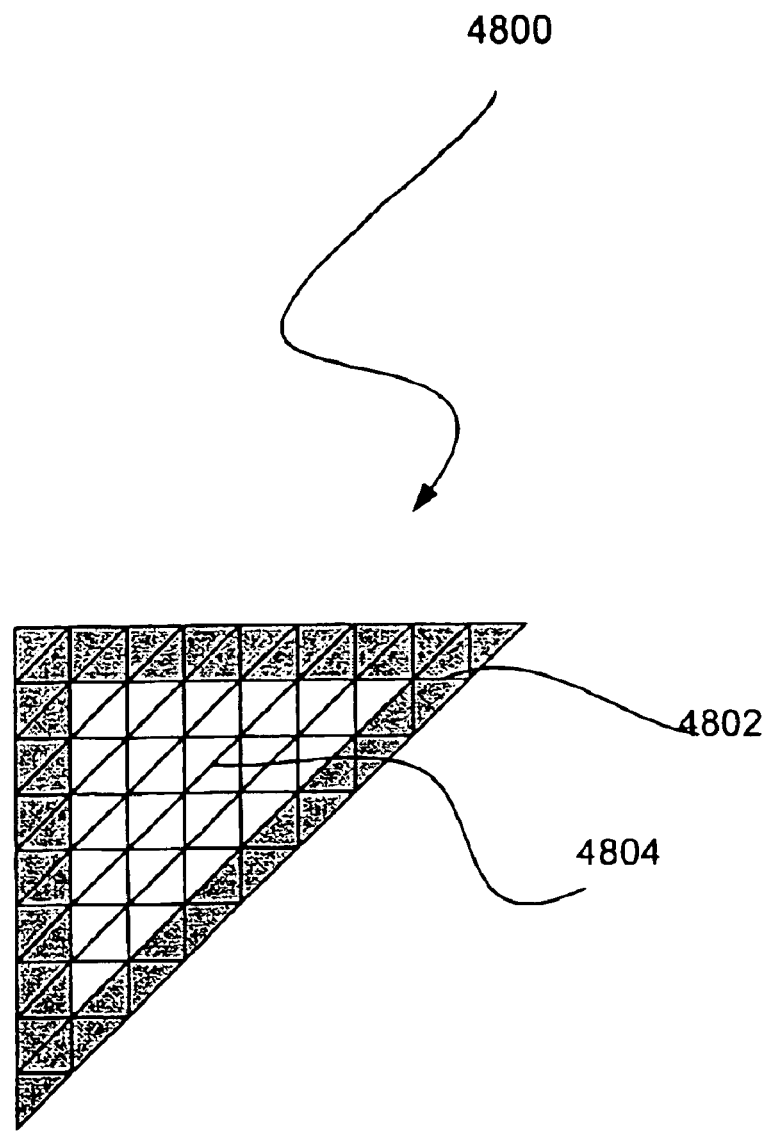

FIG. 49 illustrates the manner in which guard curves 4900 are configured in and about the inner region 4804. As shown, the first swatch in a swath is triangular, and the rest are normal. If a triangular swatch 4902 is encountered, an internal counter L is kept for a length of the strip. Such counter L is first initialized to "0." Thereafter, a predetermined number of points (L) are evaluated along the strip. A predetermined number of triangles (2*L−1) are then drawn while skipping the last lower right. An end guard curve is used for point L. The remaining guard curves are incremented a predetermined distance (L) after each strip. FIG. 50 illustrates the triangular patch 4800 after processing is complete in accordance with the present embodiment.

The present invention thus uses a consistent direction of edge traversal of a patch by performing the floating-point operations in the same order. This results in the avoidance of pixel dropouts and rendering artifacts. Consistency is required to guarantee the same values are generated for points on an edge shared by two patches that abut. The consistency requirement forces the introduction of additional commands/primitives, and transition regions in patches that would otherwise not require them; a patch with a "reversed" edge requires a transition. The direction of traversal of an edge must be determined from the edge definition itself.

The present invention thus ensures that the floating point calculations are done on the same processor. For example, an Intel® PentiumIII® will not necessarily calculate the same result as computed by the floating point adder of the present invention. In one embodiment, the host may compute forward difference curve coefficients, and the ASIC may evaluate curves and stitch them together. As such, the ASIC may have some, but little, notion of a patch. It should be understood that the calculations may be carried out on any application specific or software-governed hardware per the desires of the user.

Figure 51:
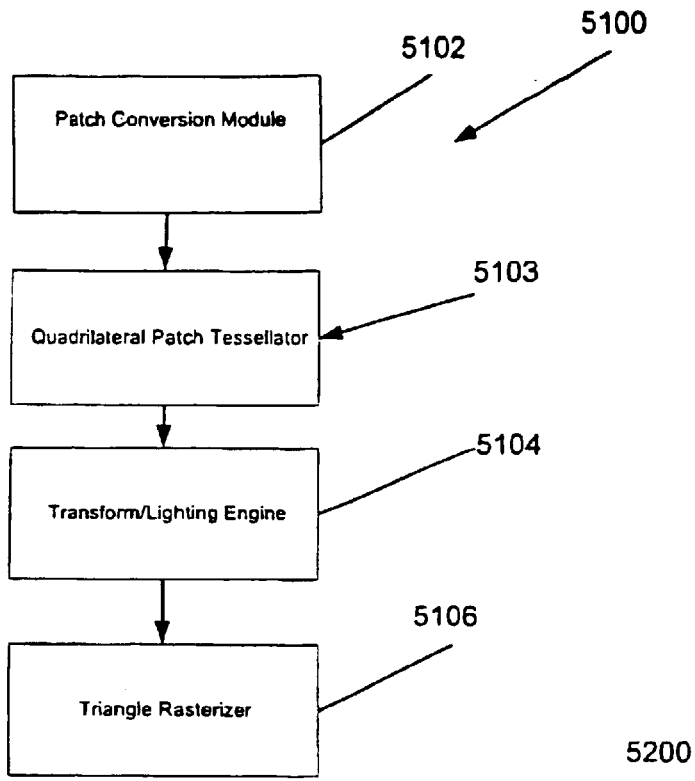
FIGS. 51–53 illustrate a third alternate embodiment of operation of the tessellation module of FIG. 1A.
Figure 52:
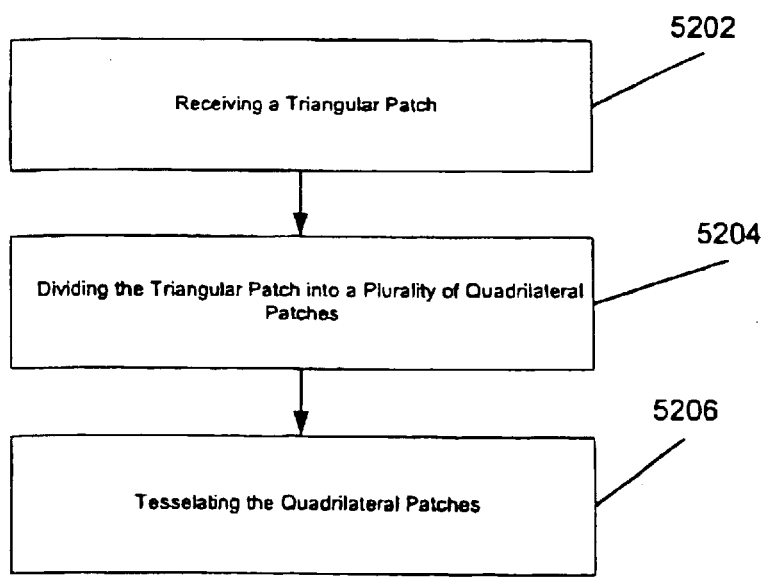
Figure 53:
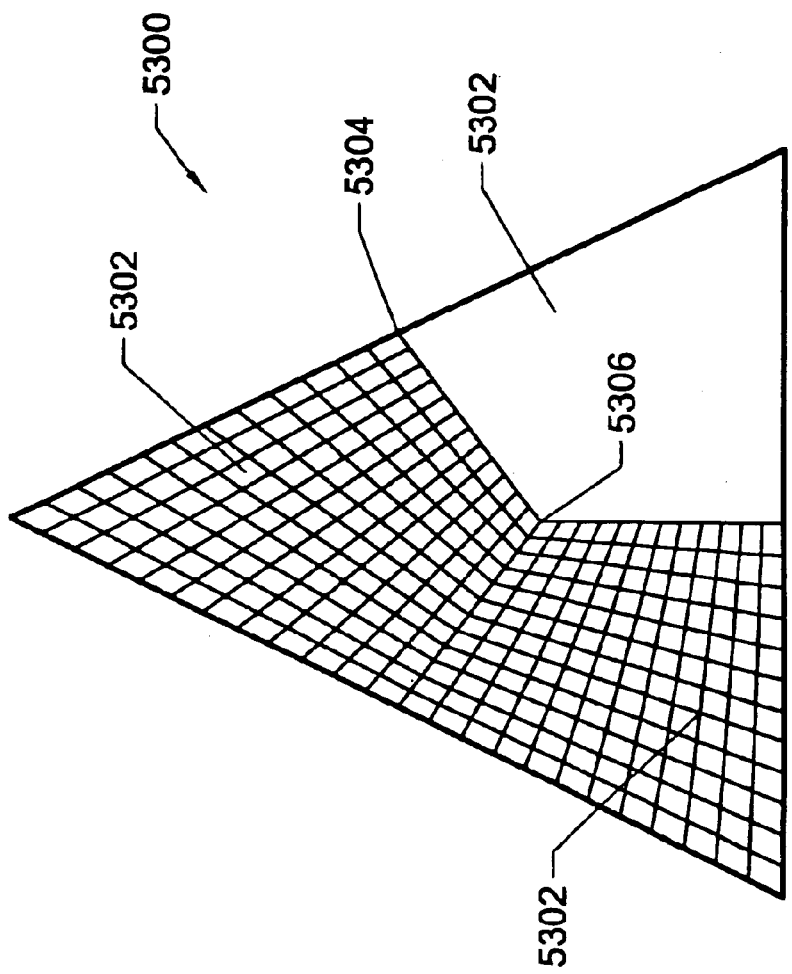

FIGS. 51–53 illustrate a third alternate embodiment of operation of the tessellation module 51 of FIG. 1A. The various features that will now be set forth are beneficial in improving the implementation of an integrated tessellator on a single semiconductor platform. It should be noted, however, that the features set forth during reference to the following Figures are optional, and may be varied per the desires of the user.

FIG. 51 is a schematic diagram of one exemplary hardware configuration 5100 constructed in accordance with the present invention. As shown, the hardware 5100 includes a patch conversion module 5102, a quadrilateral patch tesselator 5103, a transform/lighting engine 5104, and a triangle rasterizer 5106. As is well known in the art, the quadrilateral patch tessellator 5103 converts a patch into a plurality of triangles. It should be noted that the quadrilateral patch tessellator 5103 is specifically configured to handle quadrilateral patches, or tensor products. It should be noted that an exemplary operation of the transform/lighting engine 5104 and the rendering engine 5106 was set forth hereinabove.

With continuing reference to FIG. 51, coupled to the quadrilateral patch tessellator 5103 is the patch conversion module 5102. In operation, the patch conversion module 5102 is adapted for converting triangular patches into a form suitable for being rendered using a graphics pipeline adapted to render quadrilateral patches. In particular, the patch conversion module 5102 converts the triangular patches into a plurality of quadrilateral patches that the quadrilateral patch tessellator 303 is equipped to handle.

The conversion, or reparameterization, of the triangular patches is such that all of the geometric properties of the original patch are preserved. Further the reparameterization is free of the problematic singularities required by some prior art techniques. It should also be noted that the triangular patches are characterized using polynomials of various degrees. In one embodiment, the conversion may also leave the degree of the patches unchanged, i.e. it does not increase. By way of example, the reparameterization may be characterized as follows: Given a triangular patch, T(u, v), the variables u and v are replaced using the expressions:

$$u = \frac{s}{2} - \frac{st}{6} \quad v = \frac{t}{2} - \frac{st}{6}.$$

It should be noted that if the parameter value pair (0,0),(0, 1),(1,0),(1,1) are substituted for s and t, the expected parameter value pairs for u and v are as follows: (0,0),(0,1/2),(1/2,0),(1/3,1/3).

FIG. 52 is a flowchart illustrating the method 5200 by which the patch conversion module 5102 of FIG. 51 converts the triangular patches. As shown, a triangular patch is first received in operation 5202. Then, in operation 5204, the received triangular patch is divided into a plurality of quadrilateral patches. Such quadrilateral patches are then suitable for being processed by a graphics pipeline specifically equipped to render quadrilateral patches. To this end, the quadrilateral patch tessellator 5103 may then tessellate the quadrilateral patches in operation 5206.

FIG. 53 illustrates the manner in which a triangular patch is converted in accordance with the method 5200 of FIG. 52. As shown, the triangular patch 5300 is divided up to into a plurality of quadrilateral patches 5302. In one embodiment, each quadrilateral patch 5302 is convex.

As an option, one corner 5304 of each quadrilateral patch 5302 may be positioned at a midpoint of a side of the triangular patch 5300. Further, one corner of each quadrilateral patch 5302 may be positioned at a centroid 5306 of the triangular patch 5300. It should be understood that in various other embodiments, the corners may be positioned in any desired location. Further, the number of quadrilateral patches may vary per the desires of the user.

One constraint that may be imposed on the boundaries of the quadrilateral patches 5302 is that they form a convex region of four sides, each of which is a straight line in the parameter space of the triangular patch 5300. As an option, each side of the quadrilateral patches 5302 may be linear in parameter space. Further, in one embodiment, a single vertex may be situated on the interior of the triangle, and one vertex on each of the three sides of the triangular patch 5300. Note FIG. 53.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An integrated circuit disposed on a single chip and having a graphics hardware pipeline for graphics processing, the integrated circuit comprising:
   (a) a tessellation module adapted to receive data for tessellation;
   (b) a transform module for transforming data received from the tessellation module from a first space to a second space;
   (c) a lighting module for performing lighting operations on data received from the transform module; and
   (d) a rasterizer for rendering data received from the lighting module;
   wherein the integrated circuit is operable to tessellate, transform, light, and render data.

2. The integrated circuit as recited in claim 1, wherein the tessellation module is adapted for generating a plurality of commands selected from the group comprising no primitive, fan, strip, load, and use.

3. The integrated circuit as recited in claim 1, wherein the tessellation module uses memory to store the data for reuse.

4. The integrated circuit as recited in claim 1, wherein the tessellation module is adapted for decomposing surfaces using guard curves.

5. The integrated circuit as recited in claim 4, wherein the decomposition of the surfaces includes receiving a patch; defining a plurality of strip curves associated with the patch in a first predetermined direction, wherein areas defined by the strip curves are adapted for being decomposed into a plurality of primitives; and generating at least one guard curve associated with the patch, the guard curve being positioned along ends of the strip curves and in a second predetermined direction perpendicular with respect to the first predetermined direction.

6. The integrated circuit as recited in claim 1, wherein the tessellation module is adapted for decomposing surfaces using fractional tessellation.

7. The integrated circuit as recited in claim 6, wherein the decomposition of the surfaces includes defining an interior mesh of primitives in a surface to be rendered; and defining a plurality of surrounding meshes along sides of the interior mesh; wherein exterior sides of the surrounding meshes each include a plurality of equally sized segments and at least one fractional segment that is a fraction of the equally sized segments.

8. The integrated circuit as recited in claim 1, wherein the tessellation module is adapted for converting triangular patches for being rendered using a graphics pipeline adapted to render quadrilateral patches during computer graphics processing.

9. The integrated circuit as recited in claim 8, wherein the conversion of the triangular patches includes receiving a triangular patch; and dividing the triangular patch into a plurality of quadrilateral patches; wherein the quadrilateral patches are suitable for being processed by a graphics pipeline equipped to render quadrilateral patches.

10. The integrated circuit as recited in claim 1, wherein the tessellation is controlled by an interface between the integrated circuit and an application.

11. A method for graphics processing in a single integrated circuit, comprising:
   (a) tessellating data;
   (b) transforming the data from a first space to a second space;
   (c) lighting the data; and
   (d) rendering the data;
   wherein the data is tessellated, transformed, lighted, and rendered on the single integrated circuit.

12. The method as recited in claim 11, wherein the tessellating includes generating a plurality of commands selected from the group consisting of no primitive, fan, strip, load, and use.

13. The method as recited in claim 11, wherein the tessellating is carried out using a tessellation module that uses memory to store the data for reuse.

14. The method as recited in claim 11, wherein the tessellating includes decomposing surface using guard curves.

15. The method as recited in claim 14, wherein the decomposition of the surfaces includes receiving a patch; defining a plurality of strip curves associated with the patch in a first predetermined direction, wherein areas defined by the strip curves are adapted for being decomposed into a plurality of primitives; and generating at least one guard curve associated with the patch, the guard curve being positioned along ends of the strip curves and in a second predetermined direction perpendicular with respect to the first predetermined direction.

16. The method as recited in claim 11, wherein the tessellating includes decomposing surfaces using fractional tessellation.

17. The method as recited in claim 16, wherein the decomposition of the surfaces includes defining an interior mesh of primitives in a surface to be rendered; and defining a plurality of surrounding meshes along sides of the interior mesh; wherein exterior sides of the surrounding meshes each include a plurality of equally sized segments and at least one fractional segment that is a fraction of the equally sized segments.

18. The method as recited in claim 11, wherein the tessellating includes converting triangular patches for being rendered using a graphics pipeline adapted to render quadrilateral patches during computer graphics processing.

19. The method as recited in claim 18, wherein the conversion of the triangular patches includes receiving a triangular patch; and dividing the triangular patch into a plurality of quadrilateral patches; wherein the quadrilateral patches are suitable for being processed by a graphics pipeline equipped to render quadrilateral patches.

20. The method as recited in claim 11, wherein the tessellating is controlled by an interface between the integrated circuit and an application.

* * * * *